United States Patent
Wang et al.

(10) Patent No.: US 11,651,133 B2
(45) Date of Patent: May 16, 2023

(54) INTEGRATED CIRCUIT AND METHOD OF FORMING SAME

(71) Applicant: TAIWAN SEMICONDUCTOR MANUFACTURING CO., LTD., Hsinchu (TW)

(72) Inventors: Po-Sheng Wang, Hsinchu (TW); Chao Yuan Cheng, Hsinchu (TW); Chien-Chi Tien, Hsinchu (TW); Yangsyu Lin, New Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 314 days.

(21) Appl. No.: 17/031,547

(22) Filed: Sep. 24, 2020

(65) Prior Publication Data
US 2021/0279396 A1    Sep. 9, 2021

Related U.S. Application Data

(60) Provisional application No. 62/985,391, filed on Mar. 5, 2020.

(51) Int. Cl.
    *G06F 30/392*     (2020.01)
    *H01L 27/02*      (2006.01)
    (Continued)

(52) U.S. Cl.
    CPC ........ *G06F 30/392* (2020.01); *H01L 27/0207* (2013.01); *H01L 27/11807* (2013.01);
    (Continued)

(58) Field of Classification Search
    CPC ..... G06F 30/392; H01L 27/0207–0211; H01L 2027/11824
    See application file for complete search history.

(56) References Cited

U.S. PATENT DOCUMENTS

| 6,838,713 B1 | 1/2005 | Gheewala et al. |
| 7,260,442 B2 | 8/2007 | Hwang et al. |

(Continued)

FOREIGN PATENT DOCUMENTS

| KR | 20160063270 | 6/2016 |
| KR | 20180030450 | 3/2018 |

(Continued)

OTHER PUBLICATIONS

Office Action dated Jan. 11, 2022 for corresponding case No. DE 10 2020 125 839.9 (pp. 1-12).

(Continued)

*Primary Examiner* — Amar Movva
(74) *Attorney, Agent, or Firm* — Hauptman Ham, LLP

(57) ABSTRACT

A method of forming an integrated circuit includes placing a first cell layout design of the integrated circuit on a layout design, and manufacturing the integrated circuit based on the layout design. Placing the first cell layout design includes placing a first active region layout pattern adjacent to a first cell boundary, placing a second active region layout pattern adjacent to a second cell boundary, and placing a first set of active region layout patterns between the first and second active region layout patterns, according to a first set of guidelines. The first set of guidelines includes selecting transistors of a first type with a first driving strength and transistors of a second type with a second driving strength. In some embodiments, the first, second and first set of active region layout patterns extend in the first direction, and are on a first layout level.

20 Claims, 25 Drawing Sheets

(51) Int. Cl.
  *H01L 27/118* (2006.01)
  *G06F 119/18* (2020.01)
(52) U.S. Cl.
  CPC . *G06F 2119/18* (2020.01); *H01L 2027/11824* (2013.01); *H01L 2027/11881* (2013.01)

(56) References Cited

U.S. PATENT DOCUMENTS

| | | | |
|---|---|---|---|
| 9,256,709 | B2 | 2/2016 | Yu et al. |
| 9,626,472 | B2 | 4/2017 | Chiang et al. |
| 10,380,315 | B2 | 8/2019 | Zhuang et al. |
| 10,489,548 | B2 | 11/2019 | Chang et al. |
| 10,734,321 | B2 | 8/2020 | Wang et al. |
| 10,971,586 | B2 | 4/2021 | Yang et al. |
| 2011/0049575 | A1 | 3/2011 | Tanaka |
| 2013/0207199 | A1 | 8/2013 | Becker et al. |
| 2013/0313615 | A1 | 11/2013 | Tzeng et al. |
| 2014/0040838 | A1 | 2/2014 | Liu et al. |
| 2015/0270272 | A1 | 9/2015 | Merelle et al. |
| 2015/0278429 | A1 | 10/2015 | Chang |

FOREIGN PATENT DOCUMENTS

| | | |
|---|---|---|
| KR | 20180129673 | 12/2018 |
| KR | 20190037180 | 4/2019 |
| KR | 20200002001 | 1/2020 |
| TW | I599019 | 9/2017 |
| TW | 202002033 | 1/2020 |

OTHER PUBLICATIONS

Notice of Allowance dated Jun. 30, 2022 for corresponding case No. KR 10-2020-0187000. (pp. 1-6) English abstract attached on p. 1.
Office Action dated Jan. 6, 2022 for corresponding case No. TW 11120020550. (pp. 1-5).

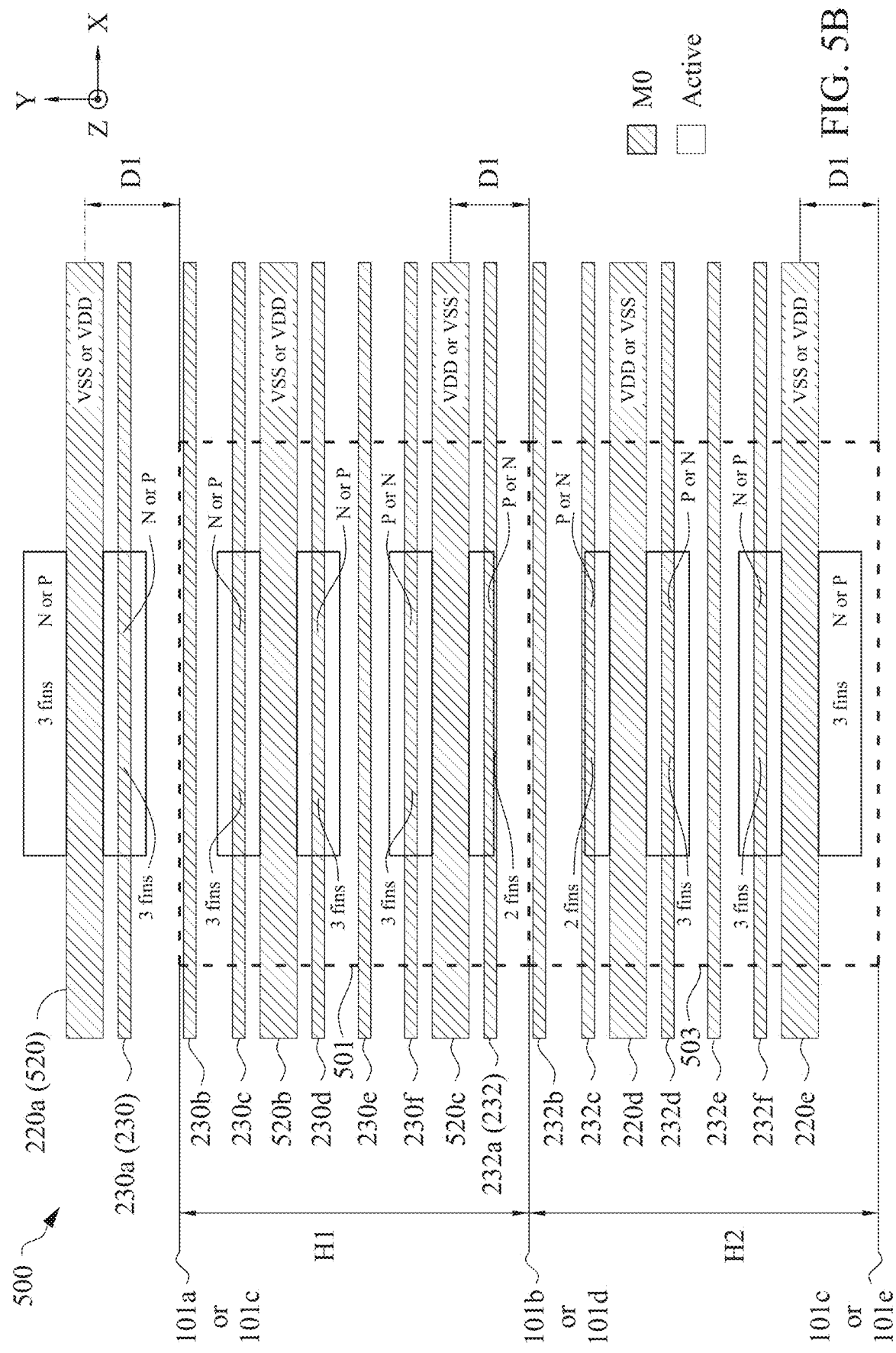

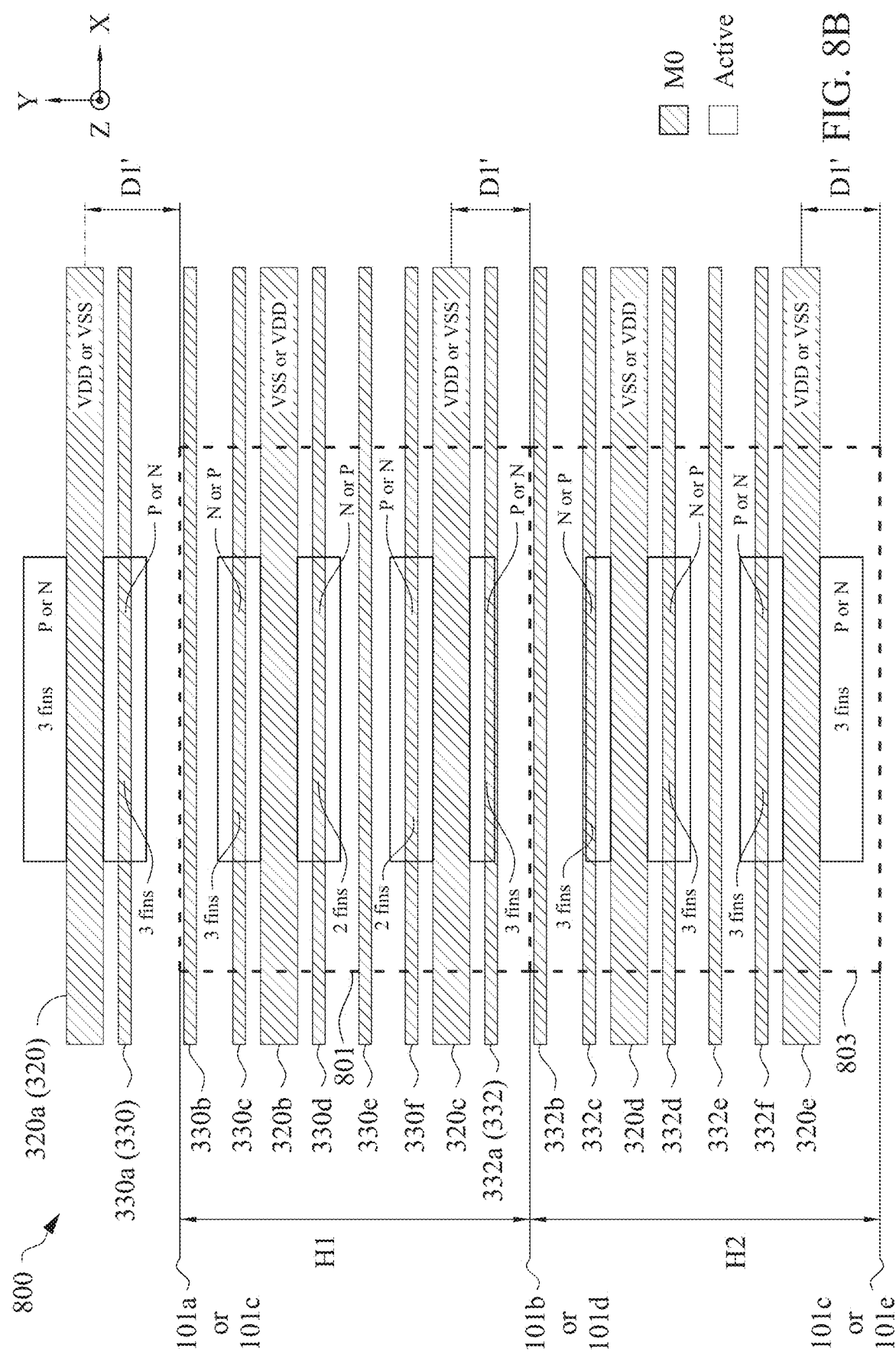

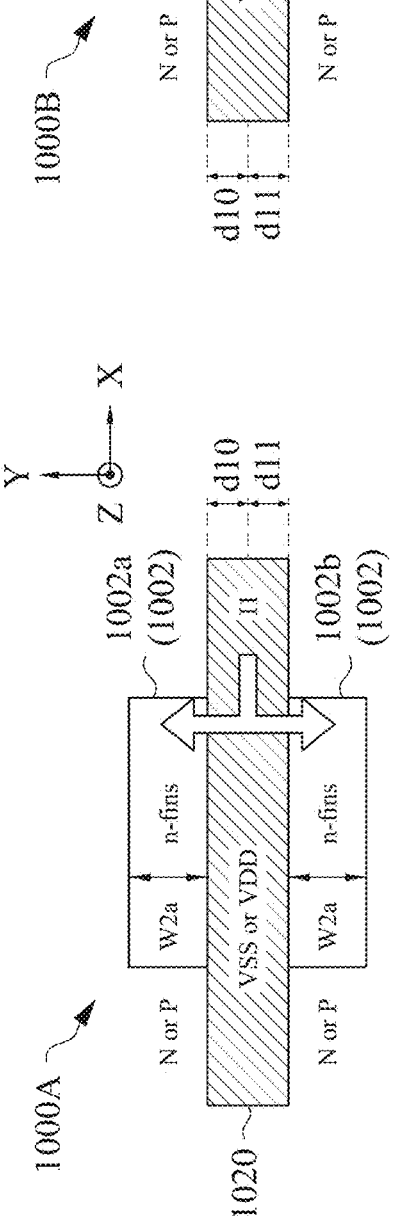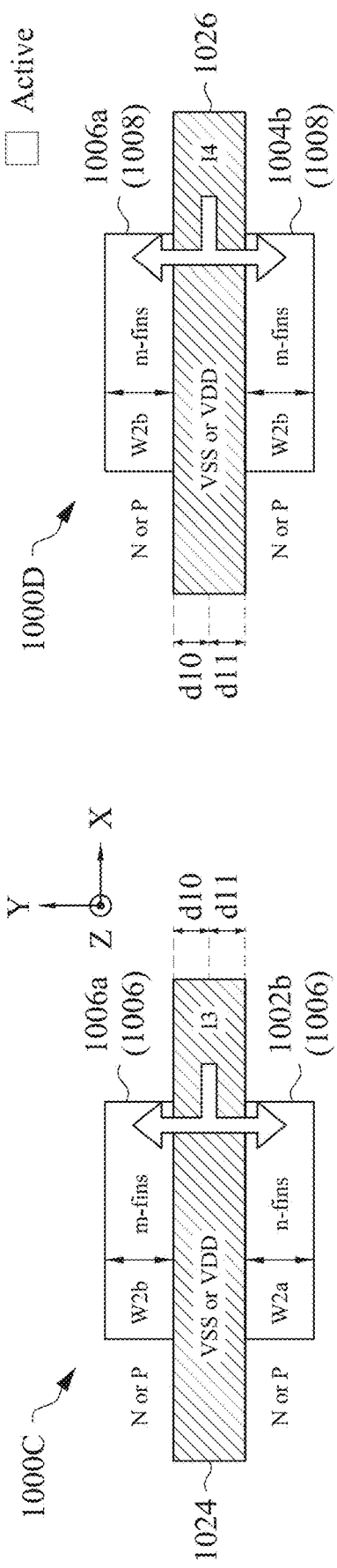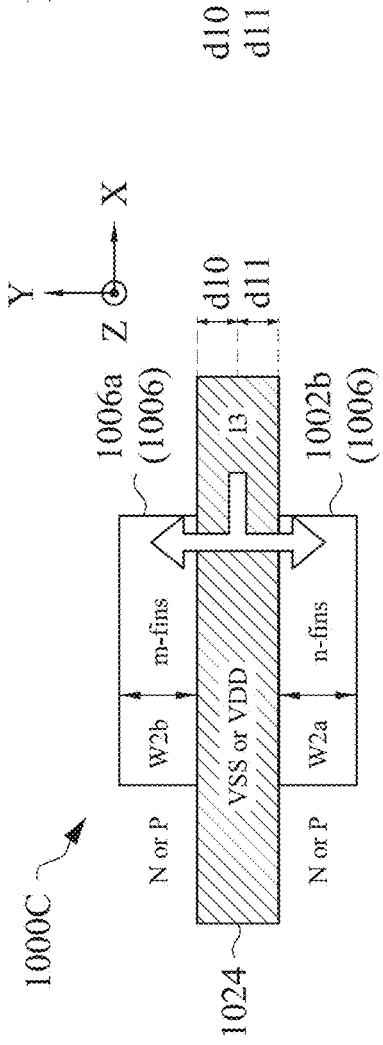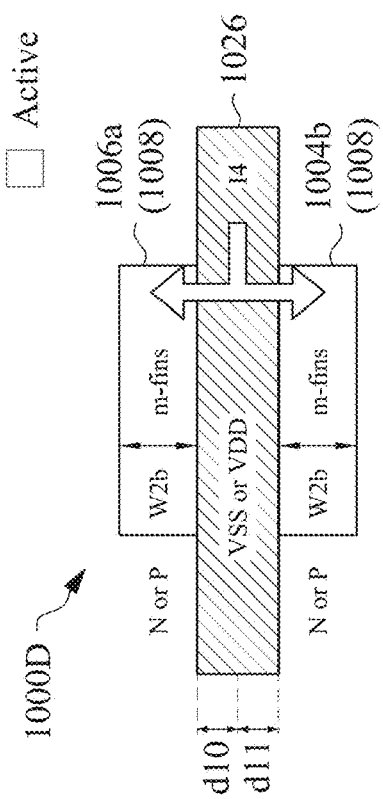
FIG. 10A
FIG. 10B
FIG. 10C
FIG. 10D

INTEGRATED CIRCUIT AND METHOD OF FORMING SAME

PRIORITY CLAIM

This application claims the benefit of U.S. Provisional Application No. 62/985,391, filed Mar. 5, 2020, which is herein incorporated by reference in its entirety.

BACKGROUND

The semiconductor integrated circuit (IC) industry has produced a wide variety of digital devices to address issues in a number of different areas. The recent trend in miniaturizing ICs has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the layout designs and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 5A-5B are diagrams of a layout design, in accordance with some embodiments.

FIGS. 8A-8B are diagrams of a top view of an integrated circuit, in accordance with some embodiments.

FIGS. 10A-10E are schematic views of layout designs of integrated circuits, in accordance with some embodiments.

DETAILED DESCRIPTION

Figure 1:
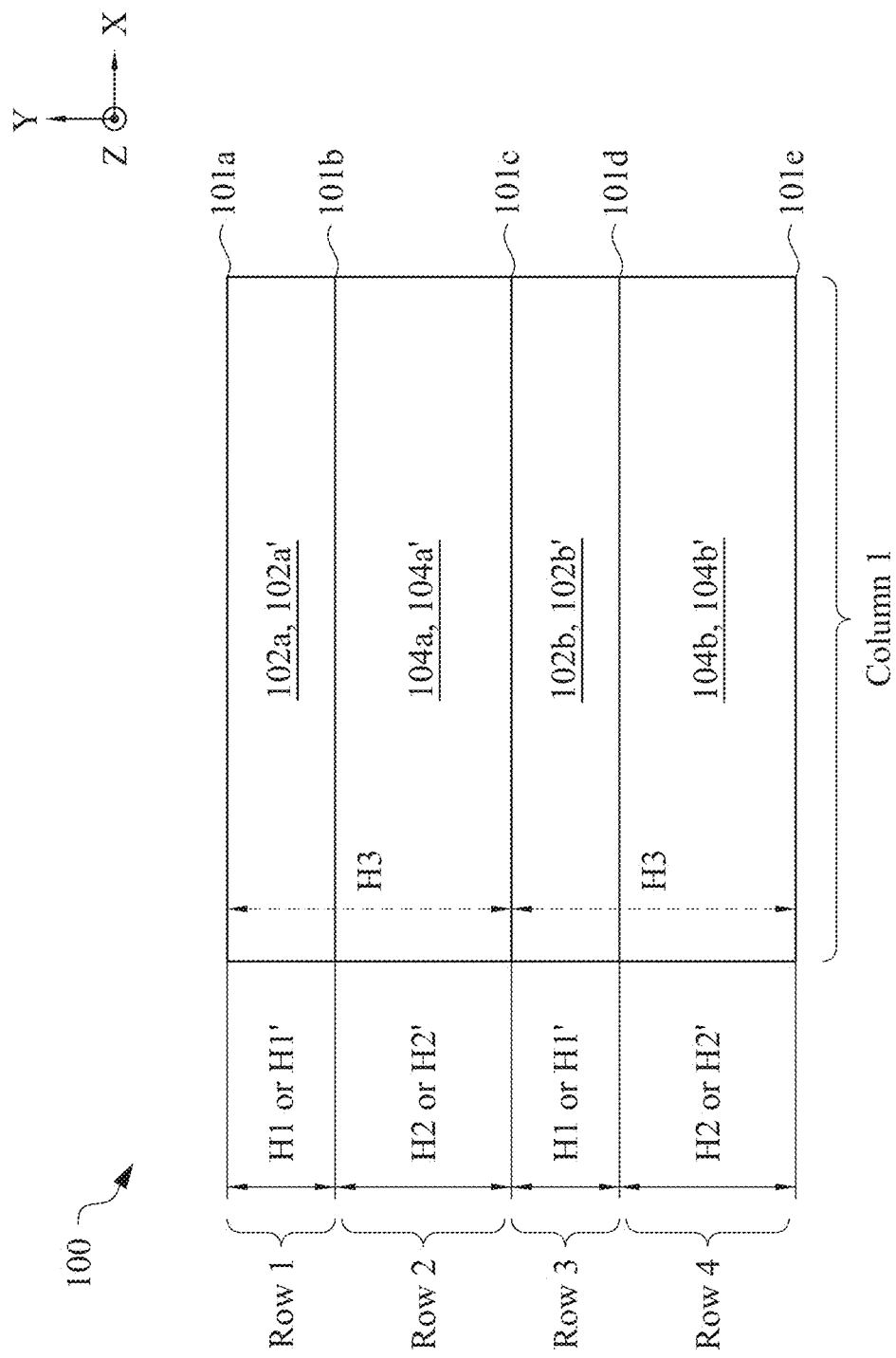
FIG. 1 is a diagram of a layout design, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a method of forming an integrated circuit (IC) includes generating a first cell layout design of the integrated circuit and manufacturing the integrated circuit based on at least the first cell layout design.

In some embodiments, generating the first cell layout design includes generating a first active region layout pattern corresponding to a first set of transistors of a first type, generating a second active region layout pattern corresponding to a second set of transistors of a second type different from the first type, generating a third active region layout pattern corresponding to a third set of transistors of the first type, and generating a fourth active region layout pattern corresponding to a fourth set of transistors of the second type. In some embodiments, the first and second active region layout patterns extend in the first direction, and are adjacent to a first cell boundary of the first cell layout design. In some embodiments, the third and fourth active region layout patterns extend in the first direction, and are adjacent to a second cell boundary of the first cell layout design.

In some embodiments, at least the first, second, third or fourth active region layout pattern satisfies a first set of design guidelines. In some embodiments, the first set of design guidelines includes balancing a first driving strength of the first and second set of transistors with a second driving strength of the third and fourth set of transistors. In some embodiments, the second driving strength is different from the first driving strength. In some embodiments, balancing the first driving strength with the second driving strength results in better circuit performance than other approaches.

In some embodiments, the first set of transistors includes a first number of fins, the second set of transistors includes a second number of fins, the third set of transistors includes a third number of fins, and the fourth set of transistors includes a fourth number of fins. In some embodiments, a sum of the third and fourth number of fins is equal to a sum of the first and second number of fins thereby balancing the first driving strength of the first and second set of transistors with the second driving strength of the third and fourth set of transistors. In some embodiments, balancing the first driving strength with the second driving strength results in better circuit performance than other approaches.

Figure 8A:
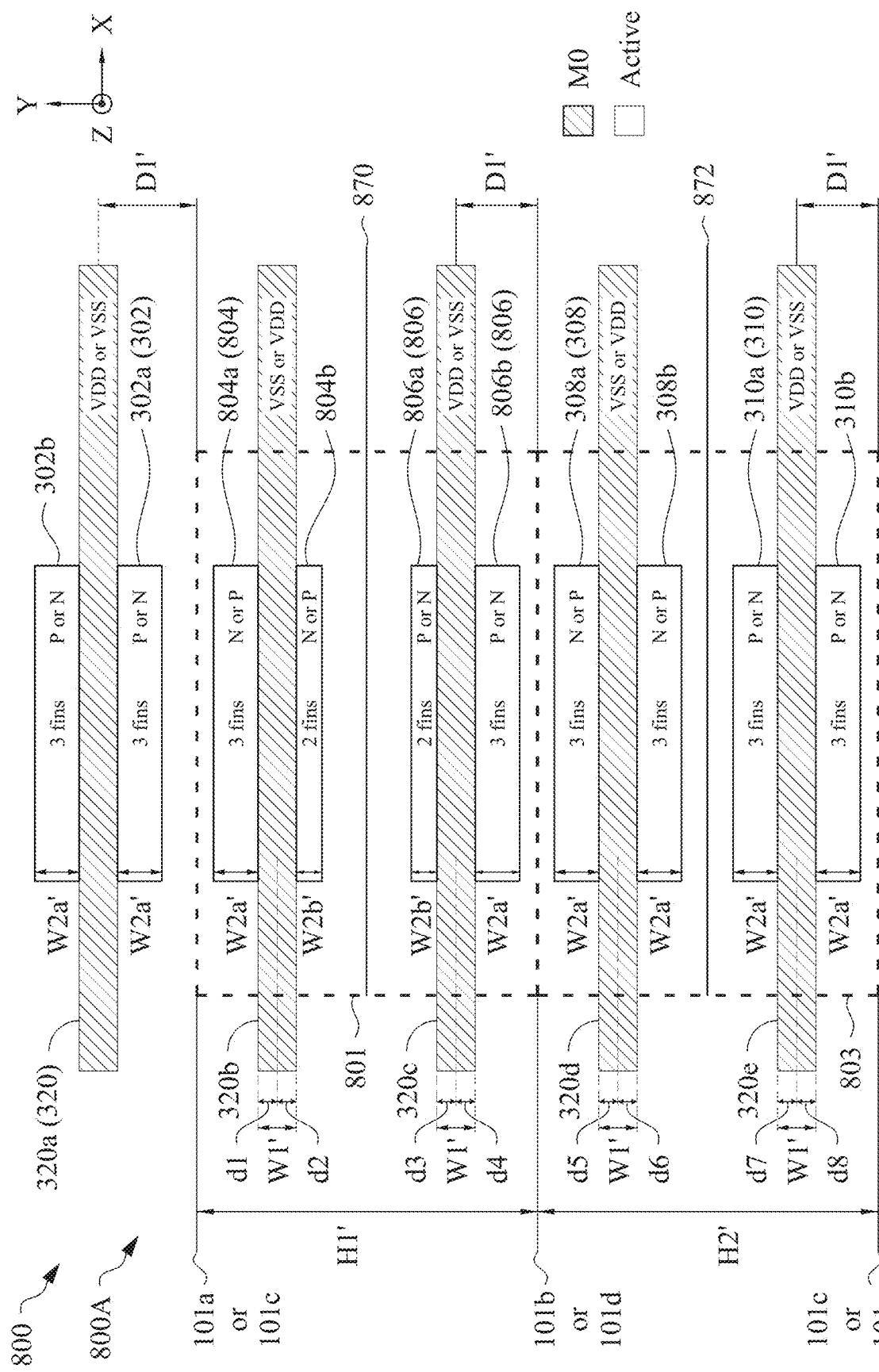

FIG. 1 is a diagram of a layout design 100, in accordance with some embodiments. Layout design 100 is a layout diagram of an integrated circuit, such as integrated circuit 300 of FIGS. 3A-3B, integrated circuit 600 of FIGS. 6A-6B, or integrated circuit 800 of FIGS. 8A-8B. In some embodiments, at least a portion of layout design 100 is usable to manufacture integrated circuit 300 (FIGS. 3A-3B), integrated circuit 600 (FIGS. 6A-6B) or integrated circuit 800 (FIGS. 8A-8B).

Components that are the same or similar to those in each of FIGS. 1, 2A-2B, 3A-3B, 4A-4B, 5A-5B, 6A-6B, 7A-7B, 8A-8B, 9A-9C, 10A-10E, 11, 12A-12B and 13-14 are given the same reference numbers, and similar detailed description thereof is thus omitted.

Layout design 100A includes layout designs 102a, 102b, 104a and 104b. In some embodiments, layout design 100A includes additional elements not shown in FIG. 1.

Figure 2A:
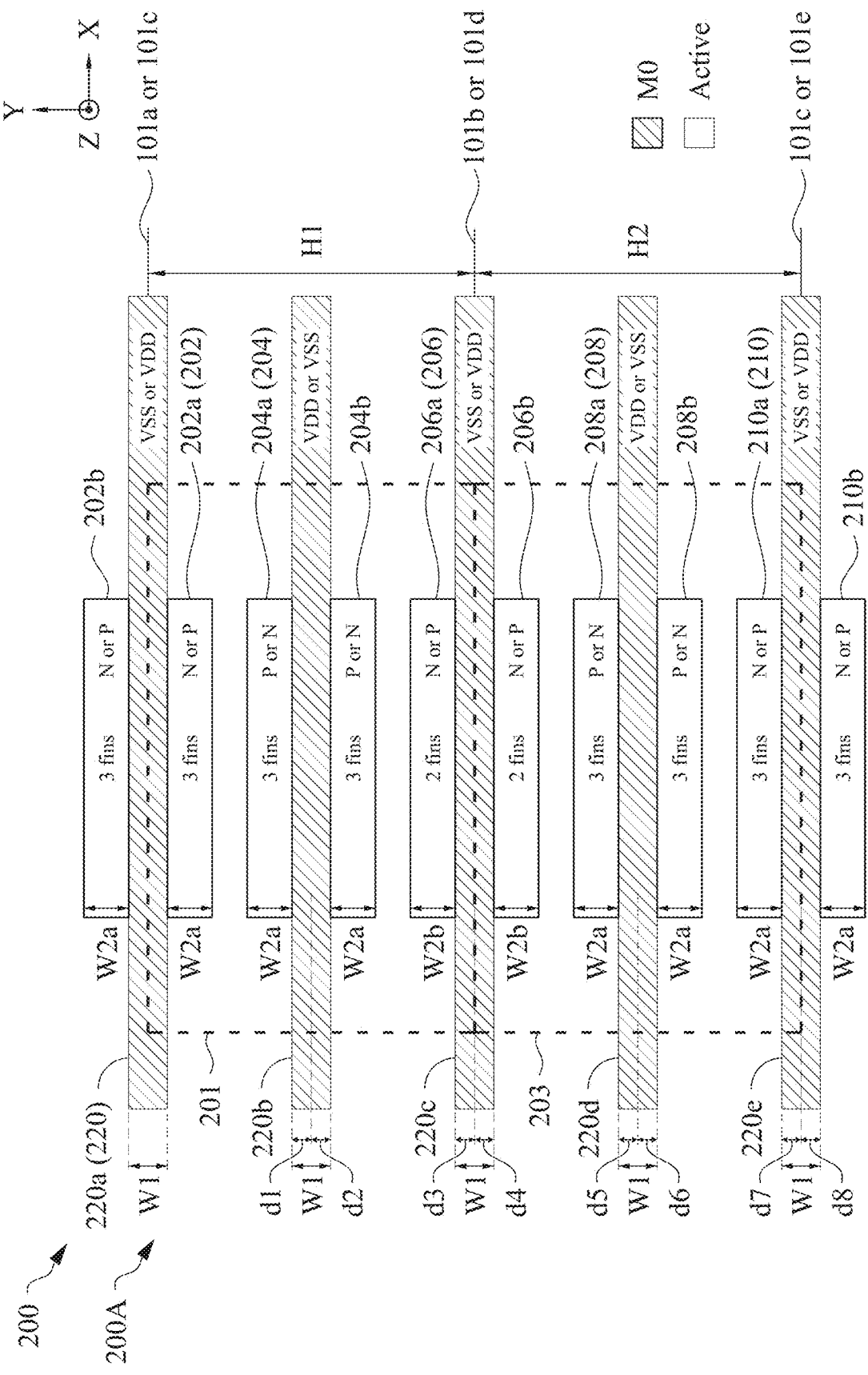
FIGS. 2A-2B are diagrams of a layout design of an integrated circuit, in accordance with some embodiments.
Figure 2B:
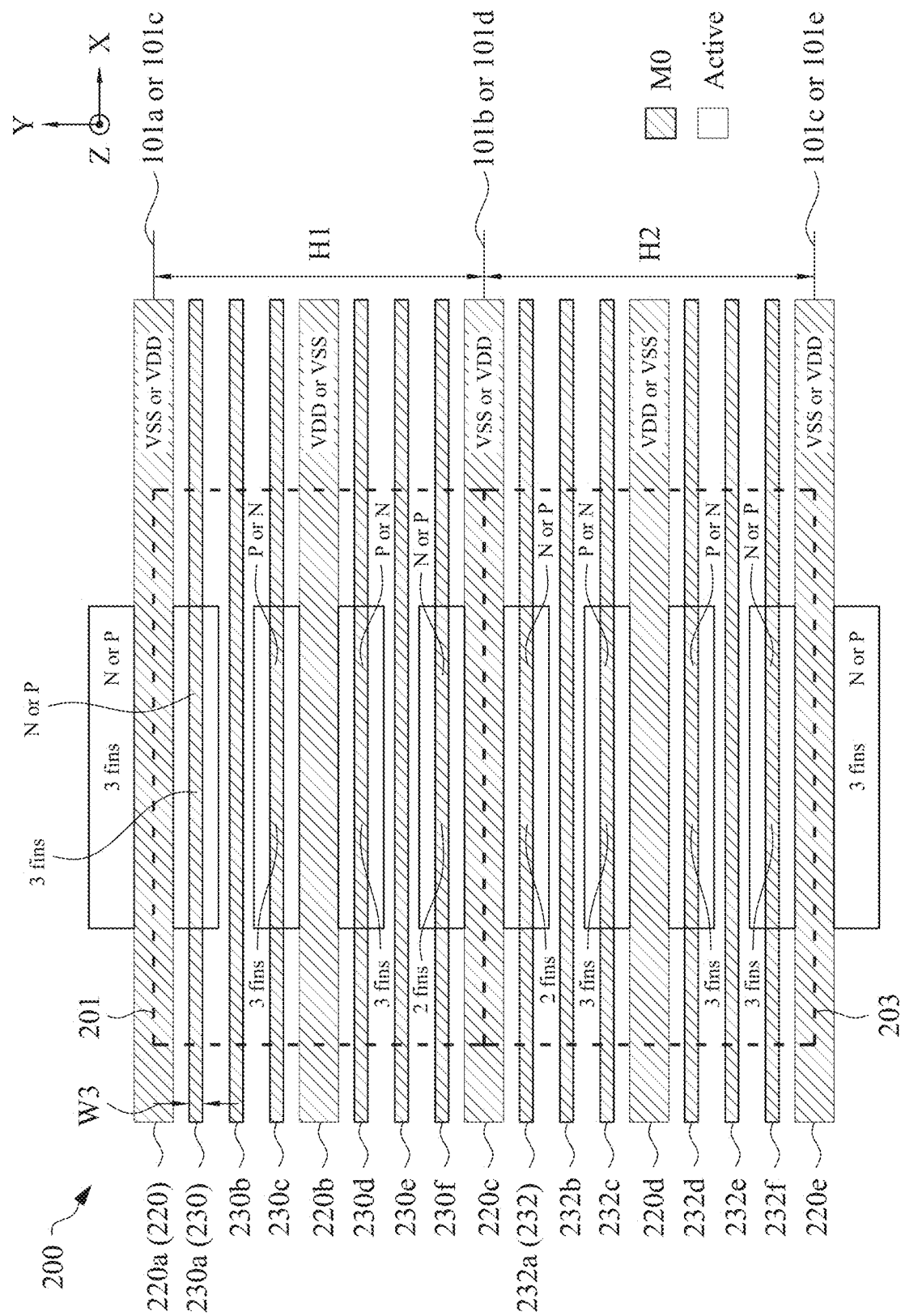
Figure 5A:
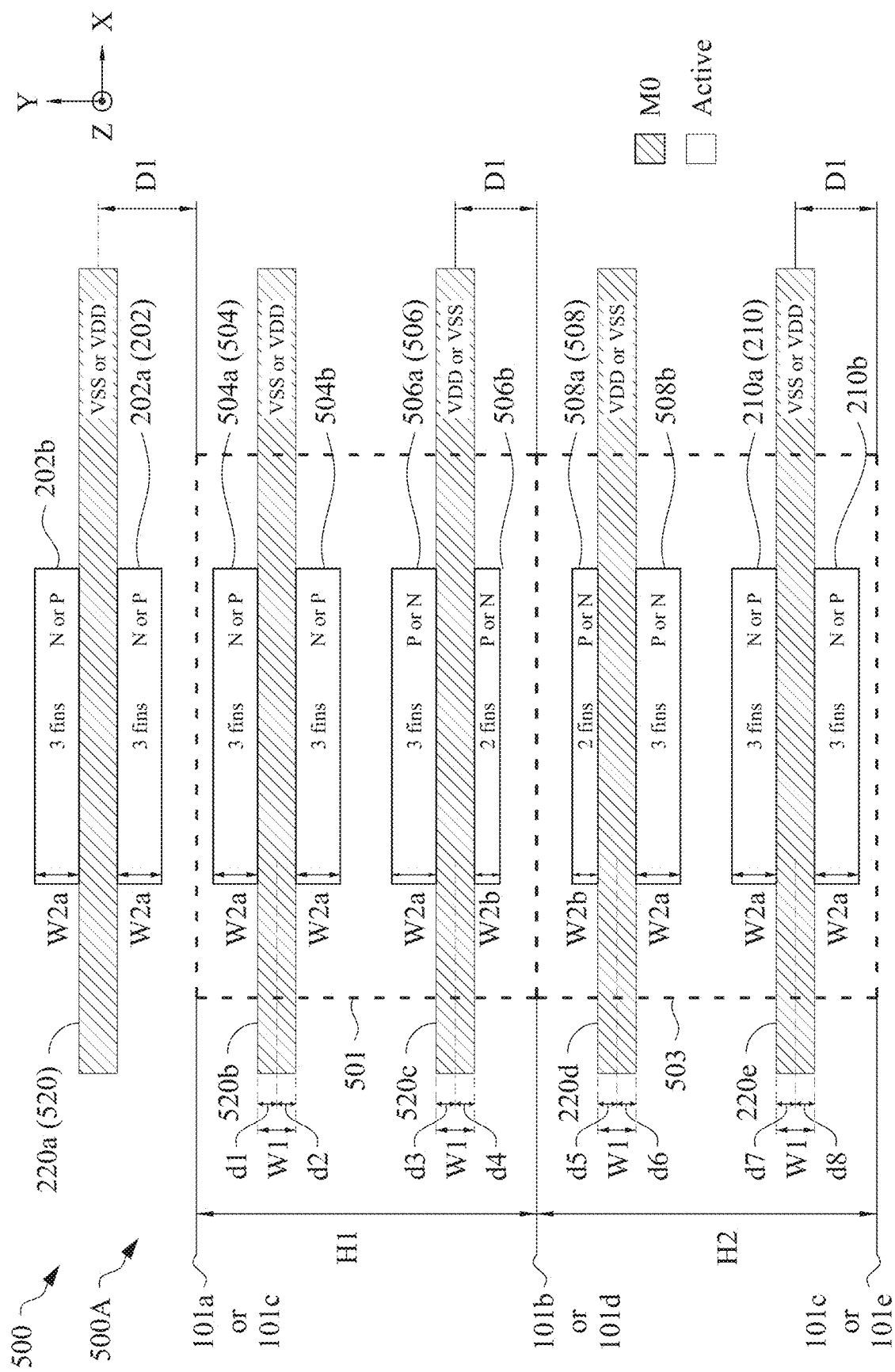
Figure 7A:
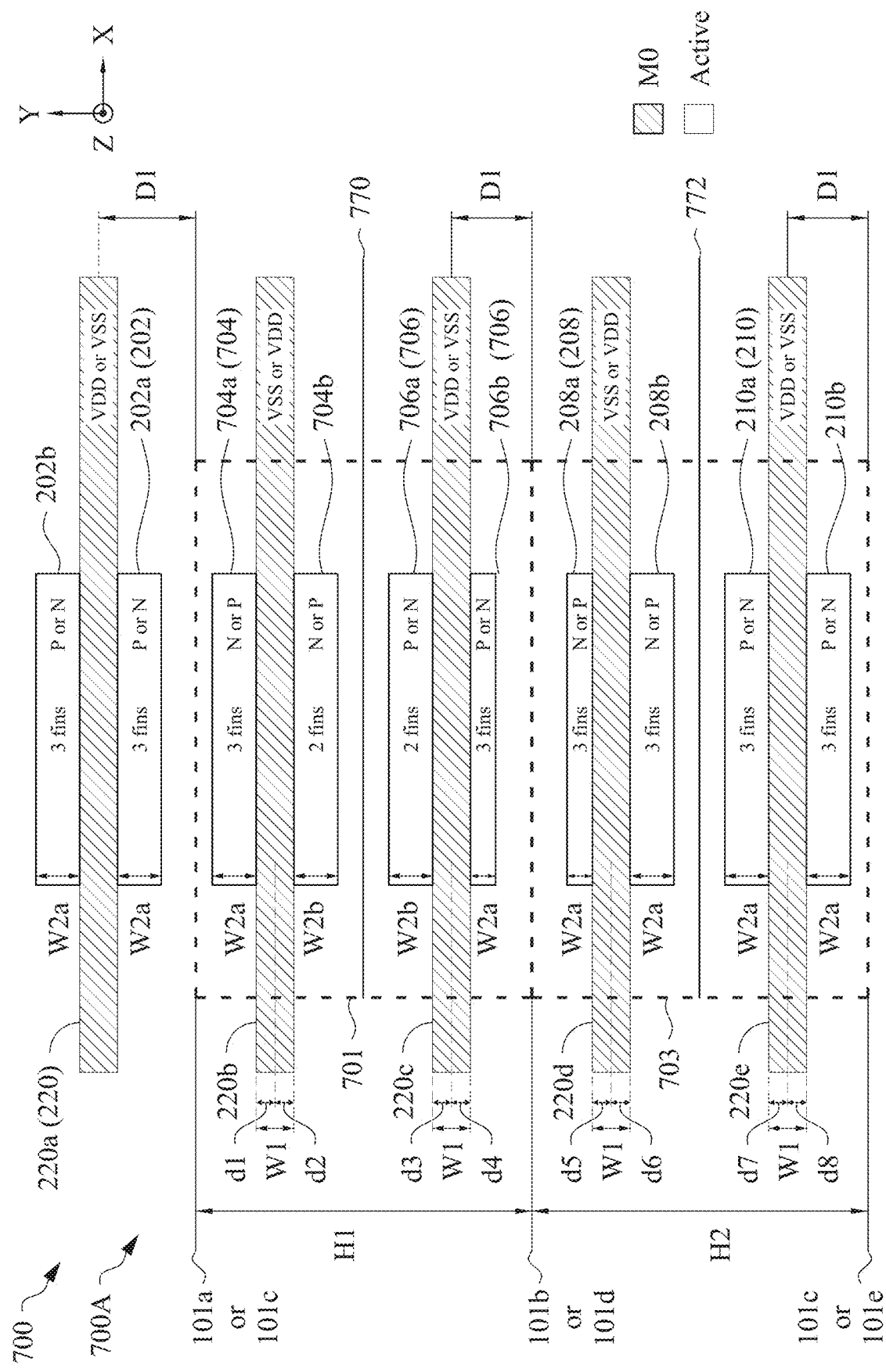
FIGS. 7A-7B are diagrams of a layout design, in accordance with some embodiments.
Figure 7B:
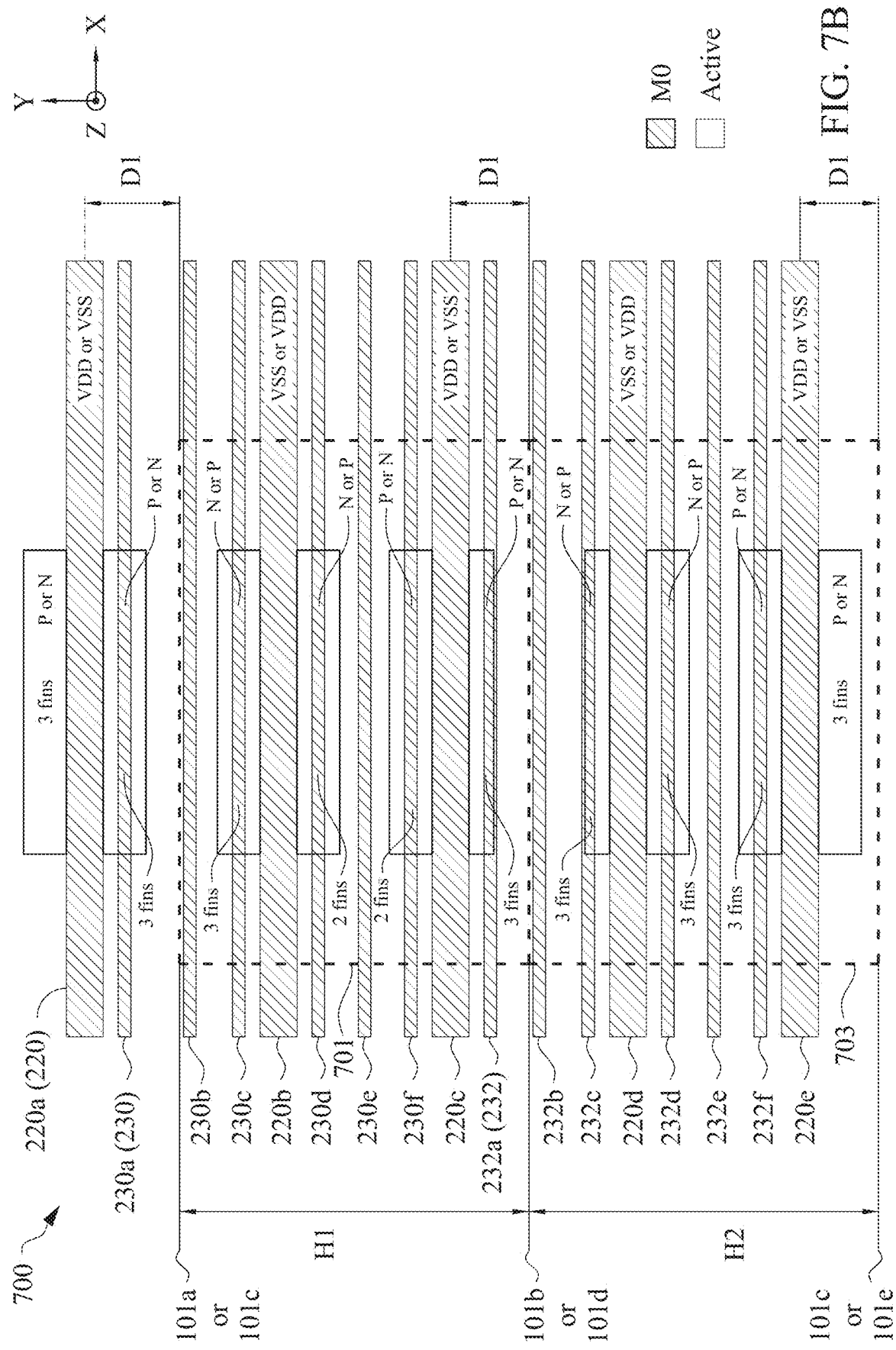

In some embodiments, layout designs 102a and 104a correspond to at least layout design 200 of FIGS. 2A-2B, layout design 500 of FIGS. 5A-5B or layout design 700 of FIGS. 7A-7B. In some embodiments, layout designs 102b and 104b correspond to at least layout design 200 of FIGS. 2A-2B, layout design 500 of FIGS. 5A-5B or layout design 700 of FIGS. 7A-7B.

In some embodiments, at least layout design 102a, 102b, 104a or 104a is referred to as a cell, and is standard cell-like. In some embodiments, standard cell-like includes a cell that is not a standard cell, but exhibits some similarities to a standard cell.

Each of layout designs 102a, 102b, 104a and 104b extend in at least a first direction X. Each of layout designs 102a, 102b, 104a and 104b are separated from another of layout designs 102a, 102b, 104a and 104b in a second direction Y. The second direction Y is different from the first direction X. In some embodiments, the second direction Y is the same as the first direction X.

Layout design 102a has a cell boundary 101a that extends in a first direction X. In some embodiments, layout design 102a is adjacent in the first direction along the cell boundary 101a to other layout designs (not shown for ease of illustration).

Layout design 102a is adjacent to layout design 104a in the first direction X along a cell boundary 101b. Layout design 104a is adjacent to layout design 102b in the first direction X along a cell boundary 101c. Layout design 102b is adjacent to layout design 104b in the first direction X along cell boundary 101d.

Layout design 104b has a cell boundary 101e that extends in the first direction X. In some embodiments, layout design 104b is adjacent in the first direction along the cell boundary 101e to other layout designs (not shown for ease of illustration).

Other configurations or quantities of layout designs 102a, 102b, 104a and 104b are within the scope of the present disclosure. For example, layout design 100 of FIG. 1 includes one column (Column 1) and four rows (Rows 1-4) of cells (e.g., layout designs 102a, 102b, 104a and 104b). Other numbers of rows and/or columns in layout design 100 are within the scope of the present disclosure. For example, in some embodiments, layout design 100 includes at least an additional column of cells, similar to column 1, and being adjacent to column 1. For example, in some embodiments, layout design 100 includes additional rows of cells, similar to rows 3 and 4, adjacent to row 1 along cell boundary 101a.

For example, in some embodiments, layout design 100 includes additional rows of cells, similar to rows 1 and 2, adjacent to row 4 along cell boundary 101e. For example, in some embodiments, layout design 100 includes at least an additional row of cells, similar to row 3, adjacent to row 4 along corresponding cell boundary 101e. In some embodiments, layout designs 102a and 104a alternate with layout designs 102b or 104b in the second direction Y.

Each of layout designs 102a and 102b have a height H1 in the second direction Y. Layout designs 102a and 102b are a same layout design as each other. In some embodiments, layout designs 102a and 102b are a different layout design from each other.

Each of layout designs 104a and 104b have a height H2 in the second direction Y. Height H2 is different from height H1. Layout designs 104a and 104b are a same layout design as each other. In some embodiments, layout designs 104a and 104b are a different layout design from each other.

In some embodiments, layout designs 102a and 104a have a height H3 in the second direction Y equal to the sum of height H1 and height H2. In some embodiments, layout designs 102b and 104b have a height H3 in the second direction Y equal to the sum of height H1 and height H2.

Figure 3A:
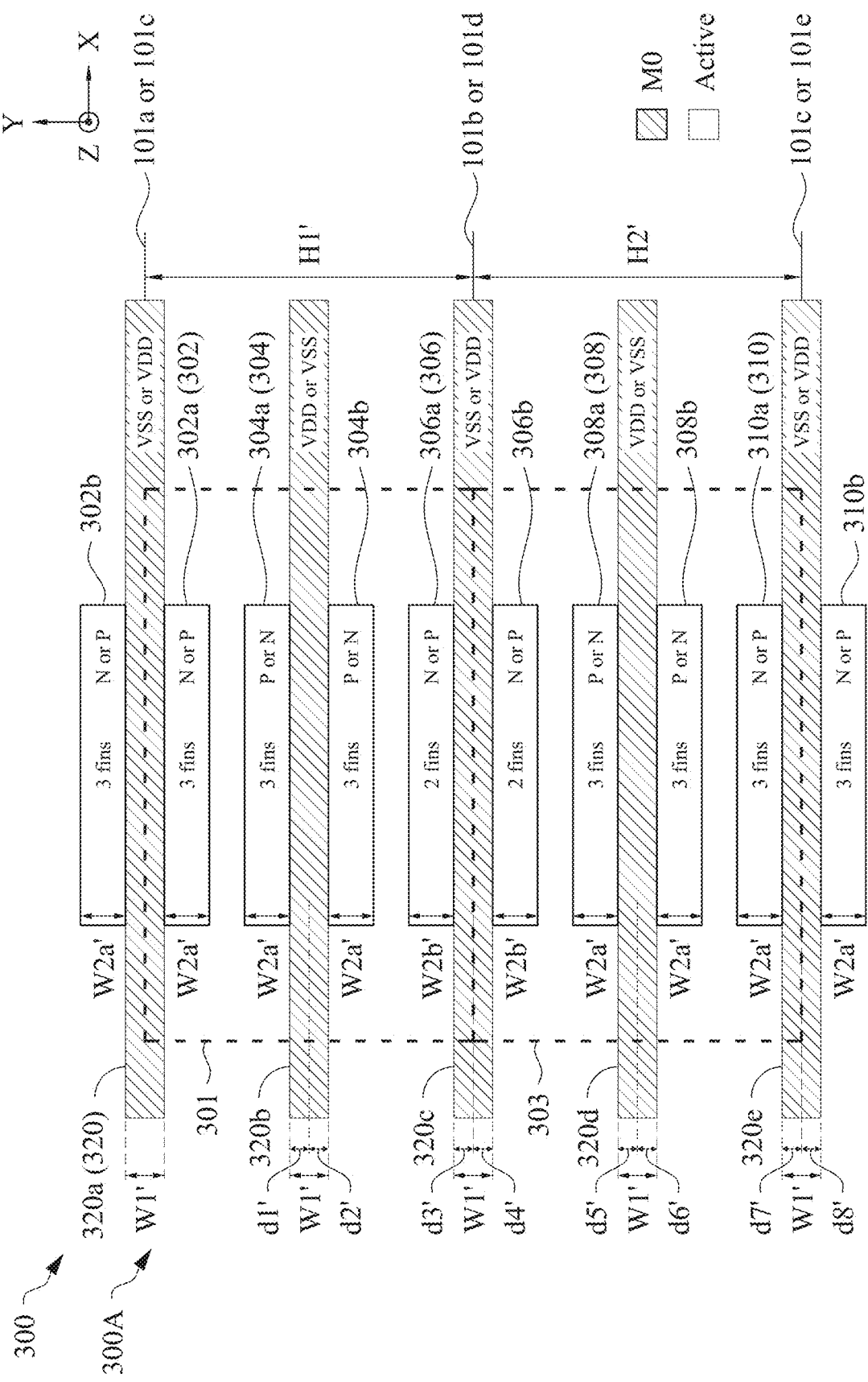
FIGS. 3A-3B are diagrams of a top view of an integrated circuit, in accordance with some embodiments.
Figure 3B:
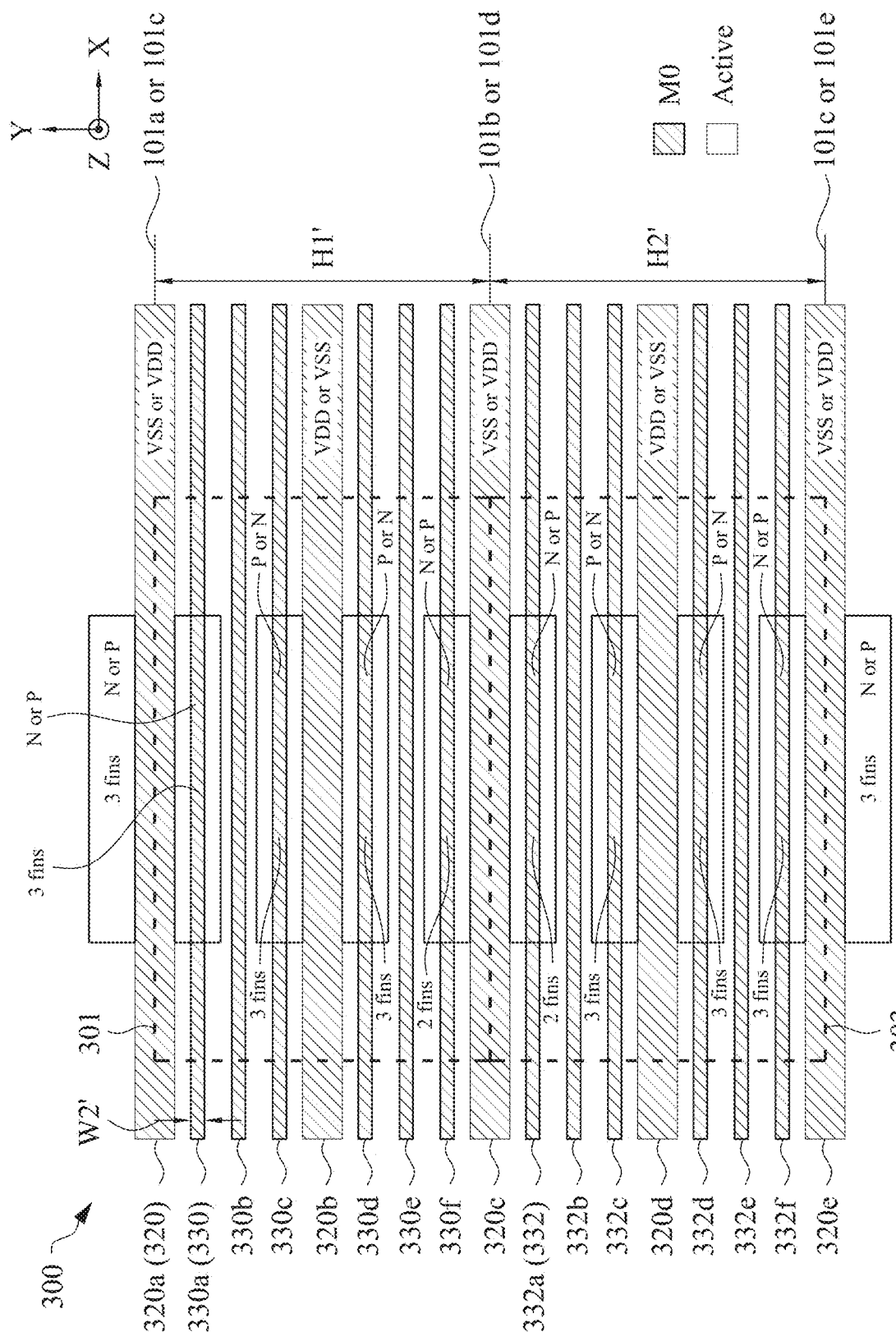
Figure 6A:
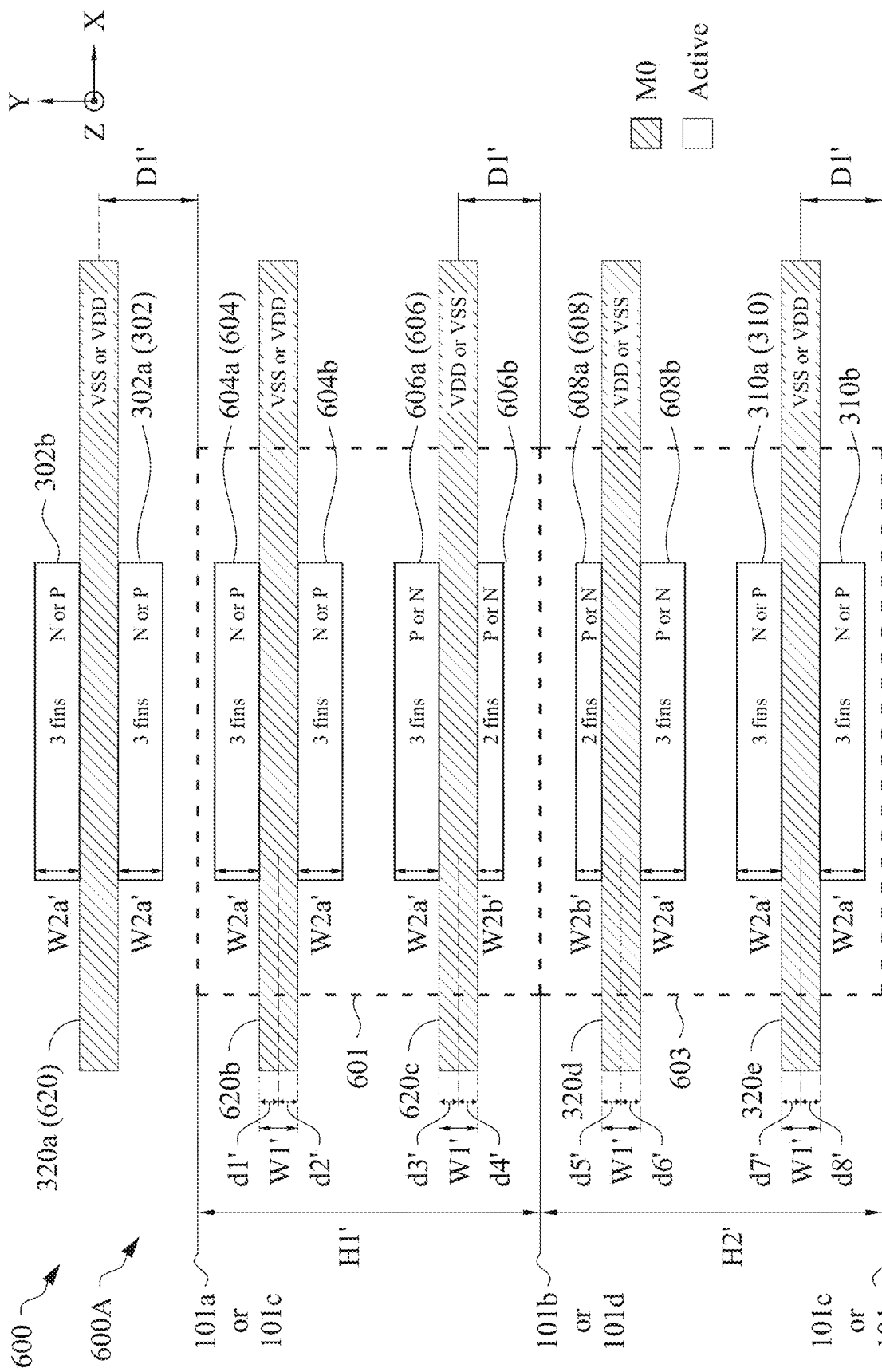
FIGS. 6A-6B are diagrams of a top view of an integrated circuit, in accordance with some embodiments.
Figure 6B:
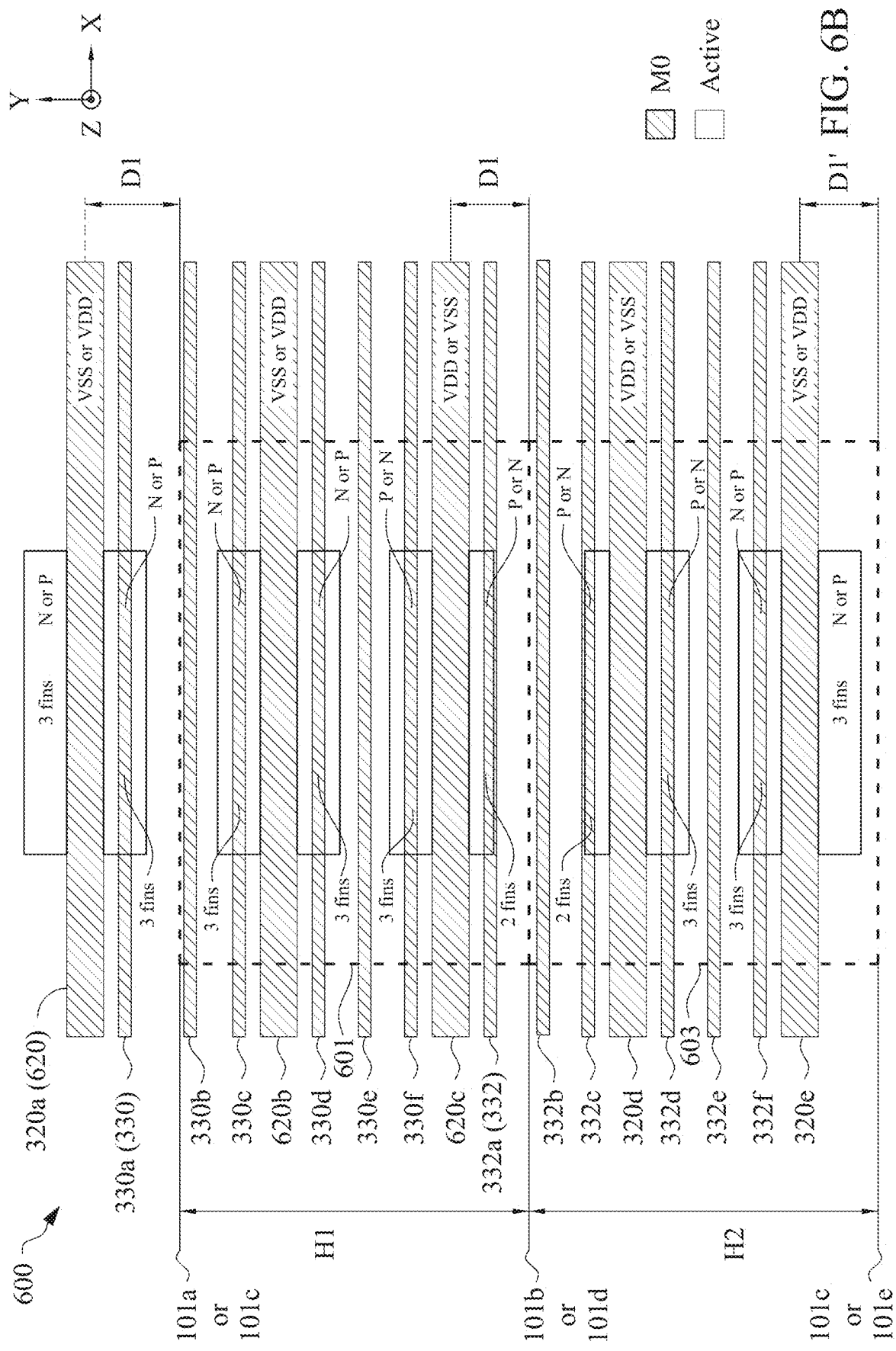

At least layout design 102a or 102b is useable to manufacture cell 301 of FIGS. 3A-3B, cell 601 of FIGS. 6A-6B and cell 801 of FIGS. 8A-8B. At least layout design 104a or 104b is useable to manufacture cell 303 of FIGS. 3A-3B, cell 603 of FIGS. 6A-6B and cell 803 of FIGS. 8A-8B.

In some embodiments, one or more of layout designs 102a, 102b, 104a or 104b is a layout design of a logic gate cell. In some embodiments, a logic gate cell includes an AND, OR, NAND, NOR, XOR, INV, AND-OR-Invert (AOI), OR-AND-Invert (OAI), MUX, Flip-flop, BUFF, Latch, delay, or clock cells. In some embodiments, one or more of layout designs 102a, 102b, 104a or 104b is a layout design of a memory cell. In some embodiments, a memory cell includes a static random access memory (SRAM), a dynamic RAM (DRAM), a resistive RAM (RRAM), a magnetoresistive RAM (MRAM) or read only memory (ROM). In some embodiments, one or more of layout designs 102a, 102b, 104a or 1084b includes layout designs of one or more active or passive elements. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), finFETs, and planar MOS transistors with raised source/drain. Examples of passive elements include, but are not limited to, capacitors, inductors, fuses, and resistors.

FIGS. 2A-2B are diagrams of a layout design, in accordance with some embodiments.

FIGS. 2A-2B are diagrams of a layout design 200 of an integrated circuit 300 of FIGS. 3A-3B, in accordance with some embodiments.

Layout design 200 is an embodiment of layout designs 102a and 104a of FIG. 1 or layout designs 102b and 104b of FIG. 1.

Layout design 200 is usable to manufacture integrated circuit 300.

For ease of illustration, some of the labeled elements of FIG. 2A-2B, 3A-3B, 5A-5B, 6A-6B, 7A-7B or 8A-8B are not labelled in at least FIG. 2A-2B, 3A-3B, 5A-5B, 6A-6B, 7A-7B or 8A-8B. In some embodiments, FIG. 2A-2B, 3A-3B, 5A-5B, 6A-6B, 7A-7B or 8A-8B includes additional elements that are not shown.

FIG. 2A is a diagram of a portion 200A of layout design 200 of FIGS. 2A-2B, simplified for ease of illustration. For example, in comparison with FIG. 2B, portion 200A of FIG. 2A does not show a set of conductive feature layout patterns 230 and 232 of FIG. 2B for ease of illustration.

Layout design 200 has a height H3 in the second direction Y. Layout design 200 includes a cell layout design 201 and a cell layout design 203. Cell layout design 201 has a height H1 in the second direction Y, and cell layout design 203 has a height H2 in the second direction Y.

Cell layout design 201 is an embodiment of layout design 102a or 104a of FIG. 1. Cell layout design 203 is an embodiment of layout design 102b or 104b of FIG. 1. Cell layout design 201 or 203 is a layout design of corresponding cell 301 or 303 (FIGS. 3A-3B), in accordance with some embodiments. Cell layout design 201 or 203 is usable to manufacture corresponding cell 301 or 303 (FIGS. 3A-3B), in accordance with some embodiments.

Figure 4A:
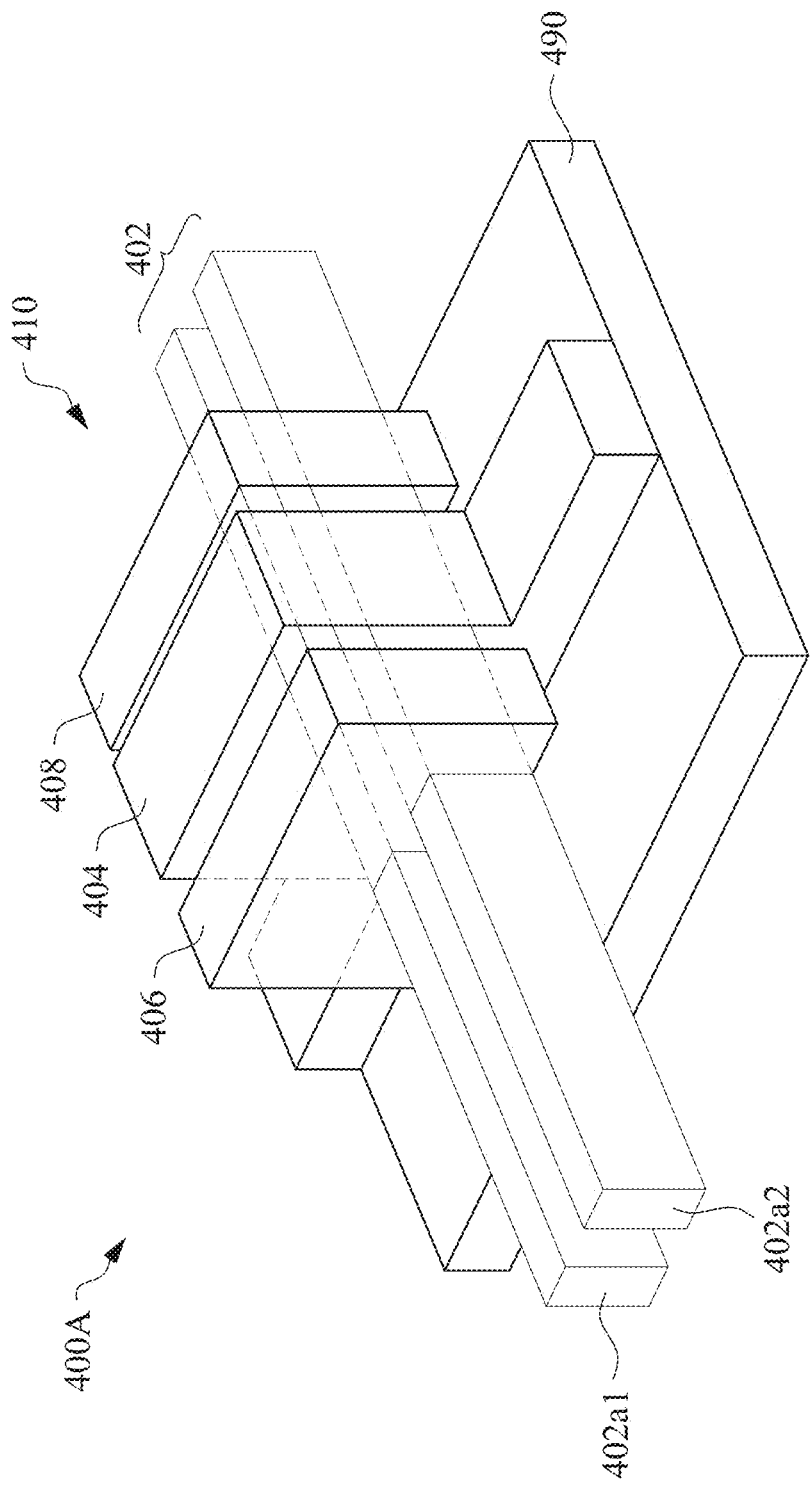
FIGS. 4A-4B are perspective views of finFETs, in accordance with some embodiments.
Figure 4B:
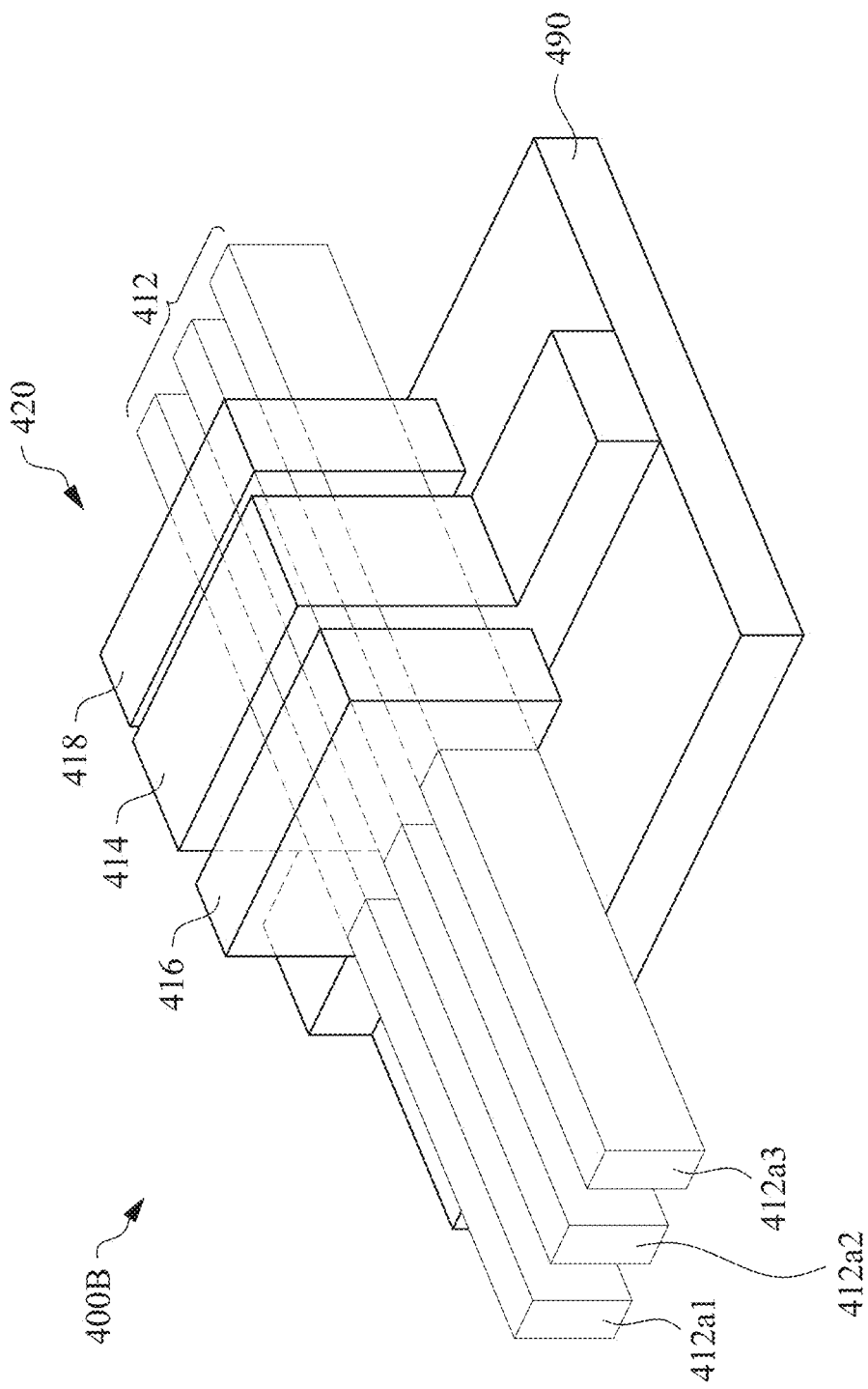

Layout design 200 further includes active region layout patterns 202a and 202b (collectively referred to as a "set of active region layout patterns 202") extending in the first direction X. Active region layout patterns 202a and 202b of the set of active region layout patterns 202 are separated from one another in the second direction Y. Active region layout pattern 202a or 202b is usable to manufacture corresponding active region 302a or 302b of a set of active regions 302 (FIGS. 3A-3B). In some embodiments, the set of active region layout patterns 202 is referred to as an oxide diffusion (OD) region which defines source or drain diffusion regions of an integrated circuit 400B (FIG. 4B). In some embodiments, active region layout pattern 202a or 202b is usable to manufacture an active region 412 (FIG. 4B) of integrated circuit 400B.

Layout design 200 further includes active region layout patterns 204a and 204b (collectively referred to as a "set of active region layout patterns 204") extending in the first direction X. Active region layout patterns 204a and 204b of the set of active region layout patterns 204 are separated from one another in the second direction Y. Active region layout pattern 204a or 204b is usable to manufacture corresponding active region 304a or 304b of a set of active regions 304 (FIGS. 3A-3B). In some embodiments, the set of active region layout patterns 204 defines source or drain diffusion regions of integrated circuit 400B (FIG. 4B). In some embodiments, active region layout pattern 204a or 204b is usable to manufacture active region 412 (FIG. 4B) of integrated circuit 400B.

Layout design 200 further includes active region layout patterns 206a and 206b (collectively referred to as a "set of active region layout patterns 206") extending in the first direction X. Active region layout patterns 206a and 206b of the set of active region layout patterns 206 are separated from one another in the second direction Y. Active region layout pattern 206a or 206b is usable to manufacture corresponding active region 306a or 306b of a set of active regions 306 (FIGS. 3A-3B). In some embodiments, the set of active region layout patterns 206 defines source or drain diffusion regions of an integrated circuit 400A (FIG. 4A). In some embodiments, active region layout pattern 206a or 206b is usable to manufacture an active region 402 (FIG. 4A) of integrated circuit 400A.

Layout design 200 further includes active region layout patterns 208a and 208b (collectively referred to as a "set of active region layout patterns 208") extending in the first direction X. Active region layout patterns 208a and 208b of the set of active region layout patterns 208 are separated from one another in the second direction Y. Active region layout pattern 208a or 208b is usable to manufacture corresponding active region 308a or 308b of a set of active regions 308 (FIGS. 3A-3B). In some embodiments, the set of active region layout patterns 208 defines source or drain diffusion regions of integrated circuit 400B (FIG. 4B). In some embodiments, active region layout pattern 208a or 208b is usable to manufacture active region 412 (FIG. 4B) of integrated circuit 400B.

Layout design 200 further includes active region layout patterns 210a and 210b (collectively referred to as a "set of active region layout patterns 210") extending in the first direction X. Active region layout patterns 210a and 210b of the set of active region layout patterns 210 are separated from one another in the second direction Y. Active region layout pattern 210a or 210b is usable to manufacture corresponding active region 310a or 310b of a set of active regions 310 (FIGS. 3A-3B). In some embodiments, the set of active region layout patterns 210 defines source or drain diffusion regions of an integrated circuit 400B (FIG. 4B). In some embodiments, active region layout pattern 210a or 210b is usable to manufacture active region 412 (FIG. 4B) of integrated circuit 400B.

In some embodiments, active region layout patterns 202a, 204a, 204b and 206a are part of cell layout design 201. In some embodiments, active region layout patterns 206b, 208a, 208b and 210a are part of cell layout design 203. In some embodiments, active region layout pattern 202b is part of a cell layout design different from cell layout design 201 or 203. In some embodiments, active region layout pattern 210b is part of another cell layout design different from cell layout design 201 or 203.

In some embodiments, set of active region layout patterns 202, 206 and 210 correspond to set of active regions 302, 306 and 310 of a first device type, and the set of active region layout patterns 204 and 208 correspond to set of active regions 304 and 308 of a second device type different from the first device type, respectively.

In some embodiments, the first device type is an n-type finFET and the second device type is a p-type finFET. For example, in some embodiments, active region layout patterns 202a, 202b, 206a, 206b, 210a and 210b correspond to active regions 302a, 302b, 306a, 306b, 310a and 310b of n-type finFET transistors, and active region layout patterns 204a, 204b, 208a and 208b correspond to active regions 304a, 304b, 308a and 308b of p-type finFET transistors, respectively. In some embodiments, at least active region layout pattern 202a, 202b, 206a, 206b, 210a and 210b is usable to manufacture corresponding active regions 302a, 302b, 306a, 306b, 310a and 310b (e.g., source and drain regions of n-type finFET transistors), and at least active region layout pattern 204a, 204b, 208a and 208b is usable to manufacture corresponding active regions 304a, 304b, 308a and 308b (e.g., source and drain regions of p-type finFET transistors).

In some embodiments, the first device type is a p-type finFET and the second device type is an n-type finFET. For example, in some embodiments, active region layout patterns 202a, 202b, 206a, 206b, 210a and 210b correspond to active regions 302a, 302b, 306a, 306b, 310a and 310b of p-type finFET transistors, and active region layout patterns 204a, 204b, 208a and 208b correspond to active regions 304a, 304b, 308a and 308b of n-type finFET transistors, respectively. In some embodiments, at least active region layout pattern 202a, 202b, 206a, 206b, 210a and 210b is usable to manufacture corresponding active regions 302a, 302b, 306a, 306b, 310a and 310b (e.g., source and drain regions of p-type finFET transistors), and at least active region layout pattern 204a, 204b, 208a and 208b is usable to manufacture corresponding active regions 304a, 304b, 308a and 308b (e.g., source and drain regions of n-type finFET transistors). In some embodiments, a different transistor type for at least the set of active region layout patterns 202, 204, 206, 208 or 210 or the set of active regions 302, 304, 306, 308 or 310 is within the scope of the present disclosure.

In some embodiments, at least active region layout pattern 202a, 202b, 204a, 204b, 208a, 208b, 210a or 210b is usable to manufacture fins 412a1, 412a2 and 412a3 of active region 412 (FIG. 4B). In some embodiments, at least active region layout pattern 206a or 206b is usable to manufacture fins 402a1 and 402a2 of active region 402 (FIG. 4A).

While the set of active region layout patterns 202, 204, 206, 208 and 210 of FIGS. 2A-2B, are described as being usable to manufacture fins of active regions 402 and 412 of FIGS. 4A-4B, it is understood that the fins of active region 402 or 412 can be replaced with corresponding nanosheets or nanowires. For example, in some embodiments, at least active region layout pattern 202a, 202b, 204a, 204b, 208a, 208b, 210a or 210b is usable to manufacture nanosheets (not shown) for active region 412 of a nanosheet transistor. For example, in some embodiments, at least active region layout pattern 206a or 206b is usable to manufacture nanosheets (not shown) for active region 402 of a nanosheet transistor. For example, in some embodiments, at least active region layout pattern 202a, 202b, 204a, 204b, 208a, 208b, 210a or 210b is usable to manufacture nanowire (not shown) for active region 412 of a nanowire transistor. For example, in some embodiments, at least active region layout pattern 206a or 206b is usable to manufacture nanowire (not shown) for active region 402 of a nanowire transistor.

Active region layout patterns 202a, 202b, 204a, 204b, 208a, 208b, 210a and 210b each have a width W2a in the second direction Y. In some embodiments, the width W2a of at least one of active region layout pattern 202a, 202b, 204a, 204b, 208a, 208b, 210a or 210b is different from the width W2b of at least another of active region layout pattern 202a, 202b, 204a, 204b, 208a, 208b, 210a or 210b.

Active region layout patterns 206a and 206b each have a width W2b in the second direction Y. In some embodiments, the widths W2b of active region layout patterns 206a and 206b are different from each other.

The width W2a is greater than the width W2b. In some embodiments, at least the width W2a of active region layout patterns 202a, 202b, 204a, 204b, 208a, 208b, 210a and 210b is directly related to the number of fin layout patterns (not shown) useable to manufacture corresponding fins in active region 412. In some embodiments, the width W2a of active region layout patterns 202a, 202b, 204a, 204b, 208a, 208b, 210a and 210b is related to the number of conducting devices (e.g., transistors) manufactured by the set of active region layout patterns 202, 204, 208 and 210 and the corresponding speed and driving strength of the conducting devices (e.g., transistors) in the active regions 302, 304, 308 and 310.

In some embodiments, at least the width W2b of active region layout patterns 206a and 206b is directly related to the number of fin layout patterns (not shown) useable to manufacture corresponding fins in active region 402. In some embodiments, the width W2b of active region layout patterns 206a and 206b is related to the number of conducting devices (e.g., transistors) manufactured by the set of active region layout patterns 206 and the corresponding speed and driving strength of the conducting devices (e.g., transistors) in the active regions 306.

For example, in some embodiments, an increase in the width W2a of active region layout patterns 202a, 202b, 204a, 204b, 208a, 208b, 210a and 210b or the width W2a of active region layout patterns 206a and 206b causes the number of fins and the number of conducting devices (e.g., transistors) manufactured by set of active region layout patterns 202, 204, 206, 208 and 210 to increase, and the corresponding speed and driving strength of the conducting devices (e.g., transistors) increases.

For example, in some embodiments, a decrease in the width W2a of active region layout patterns 202a, 202b, 204a, 204b, 208a, 208b, 210a and 210b or the width W2a of active region layout patterns 206a and 206b causes the number of fins and the number of conducting devices (e.g., transistors) manufactured by set of active region layout patterns 202, 204, 206, 208 and 210 to decrease, and the corresponding speed and driving strength of the conducting devices (e.g., transistors) decreases.

In some embodiments, since the width W2a is greater than the width W2b results in an asymmetric active region within cell layout design 201 or 203. For example, within cell layout design 201 or 203, the width W2a of active region layout patterns in the set of active region layout patterns 202, 204, 208 and 210 and the width W2b of active region layout patterns in the set of active region layout patterns 206 is different resulting in an asymmetric or mixed width active region and corresponding active region layout patterns.

In some embodiments, at least one of the active region layout patterns in the set of active region layout patterns 202, 204, 208 or 210 is useable to manufacture a corresponding set of active regions 302, 304, 308 or 310 having m fins, and at least one of the active region layout patterns in the set of active region layout patterns 206 is useable to manufacture a corresponding set of active regions 306 having n fins, where m is an integer and n is another integer. In some embodiments, integer m is not equal to integer n resulting in cell layout design 201 or 203 having asymmetric active region layout patterns or cell 301 or 303 having asymmetric active regions.

For example, in some embodiments, integer m is equal to 3 and integer n is equal to 2 in layout design 200 or integrated circuit 300, such that the set of active region layout patterns 202, 204, 208 and 210 are useable to manufacture corresponding set of active regions 302, 304, 308 and 310 having 3 fins, and the set of active region layout patterns 206 are useable to manufacture corresponding set of active regions 306 having 2 fins. Other values for at least integer m or integer n are within the scope of the present disclosure.

In some embodiments, in cell layout design 201 or 203, a sum of the widths of the set of active region layout patterns 202, 204, 206, 208 and 210 of the first device type is different from a sum of widths of the set of active region layout patterns 202, 204, 206, 208 and 210 of the second device type resulting in the first device type and the second device type having asymmetric active region layout patterns within cell layout design 201 or 203 or asymmetric active regions within cell 301 and 303.

For example, in some embodiments, the first device type is an n-type finFET and the second device type is a p-type finFET, and the sum of the widths of active region layout patterns 202a and 206a (which is equal to a sum of W2a and W2b) is less than the sum of the widths of active region layout patterns 204a and 204b (which is equal to 2*W2a), and thus for cell layout design 201, the strength of the n-type finFETs is less than the strength of the p-type finFETs. In these embodiments, for cell layout design 203 the strength of the n-type finFETs is less than the strength of the p-type finFETs for reasons similar to cell layout design 201, and are omitted for brevity.

For example, in some embodiments, the first device type is a p-type finFET and the second device type is an n-type finFET, and the sum of the widths of active region layout patterns 202a and 206a (which is equal to a sum of W2a and W2b) is less than the sum of the widths of active region layout patterns 204a and 204b (which is equal to 2*W2a), and thus for cell layout design 201, the strength of the p-type finFETs is less than the strength of the n-type finFETs. In these embodiments, for cell layout design 203 the strength of the p-type finFETs is less than the strength of the n-type finFETs for reasons similar to cell layout design 201, and are omitted for brevity.

In some embodiments, in cell layout design 201 or 203, a sum of a number of fins of the manufactured by the set of active region layout patterns 202, 204, 206, 208 or 210 of the first device type is different from a sum of a number of fins manufactured by the set of active region layout patterns 202, 204, 206, 208 or 210 of the second device type resulting in the first device type and the second device type having asymmetric active region layout patterns within cell layout design 201 or 203 or asymmetric active regions within cell 301 and 303.

For example, in some embodiments, the first device type is an n-type finFET and the second device type is a p-type finFET, and the sum of the fins of active region layout patterns 202a and 206a or active regions 302a and 306a (which is equal to 5 (e.g., a sum of 3 and 2)) is less than the sum of the fins of active region layout patterns 204a and 204b or active regions 304a and 304b (which is equal to 6 (e.g., a sum of 3 and 3)), and thus for cell layout design 201, the strength of the n-type finFETs is less than the strength of the p-type finFETs. In these embodiments, for cell layout design 203 the strength of the n-type finFETs is less than the strength of the p-type finFETs for reasons similar to cell layout design 201, and are omitted for brevity.

In these embodiments, if the first device type is an n-type finFET and the second device type is a p-type finFET, then a number of n-type finFETs manufactured by the set of active region layout patterns 202, 206 and 210 is less than or equal to a number of p-type finFETs manufactured by the set of active region layout patterns 204 and 208.

For example, in some embodiments, the first device type is a p-type finFET and the second device type is an n-type finFET, and the sum of the fins of active region layout patterns 202a and 206a or active regions 302a and 306a (which is equal to 5 (e.g., a sum of 3 and 2)) is less than the sum of the fins of active region layout patterns 204a and 204b or active regions 304a and 304b (which is equal to 6 (e.g., a sum of 3 and 3)), and thus for cell layout design 201, the strength of the p-type finFETs is less than the strength of the n-type finFETs. In these embodiments, for cell layout design 203 the strength of the p-type finFETs is less than the strength of the n-type finFETs for reasons similar to cell layout design 201, and are omitted for brevity.

In these embodiments, if the first device type is a p-type finFET and the second device type is an n-type finFET, then a number of p-type finFETs manufactured by the set of active region layout patterns 202, 206 and 210 is less than or equal to a number of n-type finFETs manufactured by the set of active region layout patterns 204 and 208.

Thus, asymmetric active region layout patterns and corresponding asymmetric active regions may result in a possible unbalanced device strength between the n-type finFET devices and the p-type finFET devices. However, by using the features of layout design 200, the widths W2a and W2b or number of fins (e.g., integer m or integer n) are selected or adjusted to better balance the n-type finFET and p-type finFET device strengths compared to other approaches resulting in better circuit performance than other approaches.

For example, in some embodiments, the location of n-type or p-type finFET devices (e.g., active region layout patterns 202a, 206a, 206b and 210a are positioned at cell boundaries (e.g., cell boundary 101a, 101b, 101c, 101d or 101e) to better balance any mismatch between the number of widths W2a and W2b or the number of fins in layout design 200 compared to other approaches.

In some embodiments, the first device type is an n-type finFET and the second device type is a p-type finFET, and the location of n-type finFETs (e.g., active region layout patterns 202a, 206a, 206b and 210a are positioned at cell boundaries (e.g., cell boundary 101a, 101b, 101c, 101d or 101e) to better balance the mismatch between the number of widths W2a and W2b or the number of fins in layout design 200 compared to other approaches.

In some embodiments, the first device type is a p-type finFET and the second device type is an n-type finFET, and the location of p-type finFETs (e.g., active region layout patterns 202a, 206a, 206b and 210a are positioned at cell boundaries (e.g., cell boundary 101a, 101b, 101c, 101d or 101e) to better balance the mismatch between the number of widths W2a and W2b or the number of fins in layout design 200 compared to other approaches.

In some embodiments, the set of active region layout patterns 202 is located on a first level. In some embodiments, the first level corresponds to an active level or an OD level of one or more of layout designs 100, 200, 500, 700, 900A-900C, 1000A-1000E or 1200B (FIG. 1, 2A-2B, 5A-5B, 7A-7B, 9A-9C, 10A-10E or 12B) or integrated circuit 300, 400A-400B, 600 or 800 (FIG. 3A-3B, 4A-4B, 6A-6B or 8A-8B).

Other configurations or quantities of patterns in at least set of active region layout patterns 202, 204, 206, 208 or 210 are within the scope of the present disclosure.

Layout design 200A further includes at least conductive feature layout patterns 220a, 220b, 220c, 220d or 220e (collectively referred to as a "set of conductive feature layout patterns 220") extending in the first direction X. In some embodiments, the set of conductive feature layout patterns 220 is also referred to as a set of power rail layout patterns.

The set of conductive feature layout patterns 220 is usable to manufacture the set of conductive structures 320 of integrated circuit 300 (FIGS. 3A-3B). In some embodiments, conductive feature layout patterns 220a, 220b, 220c, 220d and 220e are usable to manufacture corresponding conductive structures 320a, 320b, 320c, 320d and 320e of integrated circuit 300 (FIGS. 3A-3B).

In some embodiments, the set of conductive feature layout patterns 220 is over at least the set of active region layout patterns 202, 204, 206, 208 or 210. In some embodiments, each conductive feature layout pattern of the set of conductive feature layout patterns 220 is separated from an adjacent layout pattern of the set of conductive feature layout patterns 220 in at least the second direction Y.

Each conductive feature layout pattern of the set of conductive feature layout patterns 220 has a corresponding width $W_1$ in the second direction Y. In some embodiments, at least one conductive feature layout pattern of the set of conductive feature layout patterns 220 has a corresponding width $2*W_1$ in the second direction Y.

In some embodiments, each conductive feature layout pattern of the set of conductive feature layout patterns 220 has width W1. In some embodiments, at least one width W1 of a conductive feature layout pattern of the set of conductive feature layout patterns 220 differs from at least one width W1 of another conductive feature layout pattern of the set of conductive feature layout patterns 220.

Conductive feature layout pattern 220a is between active region layout pattern 202a and active region layout pattern 202b. Conductive feature layout pattern 220b is between active region layout pattern 204a and active region layout pattern 204b. Conductive feature layout pattern 220c is between active region layout pattern 206a and active region layout pattern 206b. Conductive feature layout pattern 220d is between active region layout pattern 208a and active region layout pattern 208b. Conductive feature layout pattern 220e is between active region layout pattern 210a and active region layout pattern 210b.

In some embodiments, conductive feature layout patterns 220a, 220c and 220e correspond to a first supply voltage, and conductive feature layout patterns 220b and 220d correspond to a second supply voltage different from the first supply voltage. In some embodiments, the first supply voltage is supply voltage VDD, and the second supply voltage is reference supply voltage VSS. In some embodiments, the first supply voltage is reference supply voltage VSS, and the second supply voltage is supply voltage VDD.

In some embodiments, the first device type or the second device type of the set of active region layout patterns 202, 204, 206, 208 and 210 determines whether conductive feature layout patterns 220a, 220b, 220c, 220d and 220e correspond to supply voltage VDD or reference supply voltage VSS. For example, if the set of active region layout patterns 202, 206 and 210 correspond to n-type finFETs (e.g., the first device type), and the set of active region layout patterns 204 and 208 correspond to p-type finFETs (e.g., the second device type), then the first supply voltage is reference supply voltage VSS, the second supply voltage is supply voltage VDD, conductive feature layout patterns 220a, 220c and 220e correspond to reference supply voltage VSS, and conductive feature layout patterns 220b and 220d correspond to supply voltage VDD.

For example, if the set of active region layout patterns 202, 206 and 210 correspond to p-type finFETs (e.g., the second device type), and the set of active region layout patterns 204 and 208 correspond to n-type finFETs (e.g., the first device type), then the first supply voltage is supply voltage VDD, the second supply voltage is reference supply voltage VSS, conductive feature layout patterns 220a, 220c and 220e correspond to supply voltage VDD, and conductive feature layout patterns 220b and 220d correspond to reference supply voltage VSS.

Conductive feature layout pattern 220a overlaps cell boundary 101a or 101c. Conductive feature layout pattern 220c overlaps cell boundary 101b or 101d. Conductive feature layout pattern 220e overlaps cell boundary 101c or 101e.

In some embodiments, conductive feature layout pattern 220b overlaps a mid-point in the second direction Y of cell layout design 201. In some embodiments, the mid-point in the second direction Y of layout design 201 is a mid-point between cell boundary 101a or 101c and cell boundary 101b or 101d in the second direction Y.

In some embodiments, conductive feature layout pattern 220d overlaps a first mid-point in the second direction Y of cell layout design 203. In some embodiments, the mid-point in the second direction Y of layout design 203 is a mid-point between cell boundary 101b or 101d and cell boundary 101c or 101e in the second direction Y.

In some embodiments, a center of conductive feature layout pattern 220a is aligned with cell boundary 101a or 101c. In some embodiments, the center of conductive feature layout pattern 220a is separated from the active region layout pattern 202b or 202a in the second direction Y by at least a corresponding distance d7 or d8.

In some embodiments, a center of conductive feature layout pattern 220b is aligned with the mid-point in the second direction Y of cell layout design 201. In some embodiments, the center of conductive feature layout pattern 220b is separated from the active region layout pattern 204a or 204b in the second direction Y by at least a corresponding distance d1 or d2.

In some embodiments, a center of conductive feature layout pattern 220c is aligned with cell boundary 101b or 101d. In some embodiments, the center of conductive feature layout pattern 220c is separated from the active region layout pattern 206a or 206b in the second direction Y by at least a corresponding distance d3 or d4.

In some embodiments, a center of conductive feature layout pattern 220d is aligned with the mid-point in the second direction Y of cell layout design 203. In some embodiments, the center of conductive feature layout pattern 220d is separated from the active region layout pattern 208a or 208b in the second direction Y by at least a corresponding distance d5 or d6.

In some embodiments, a center of conductive feature layout pattern 220e is aligned with cell boundary 101c or 101e. In some embodiments, the center of conductive feature layout pattern 220e is separated from the active region layout pattern 210a or 210b in the second direction Y by at least a corresponding distance d7 or d8.

In some embodiments, conductive feature layout patterns 220a, 220b, 220c, 220d and 220e are placed between corresponding set of active region layout patterns 202, 204, 206, 208 and 210 according to a set of design guidelines (described below in FIGS. 10A-10E).

In some embodiments, by placing conductive feature layout pattern 220a, 220b, 220c, 220d or 220e between corresponding set of active region layout patterns 202, 204, 206, 208 or 210, a difference between corresponding distances d7 and d8, d1 and d2, d3 and d4, d5 and d6, & d7 and d8 is reduced, resulting in a more balanced current resistance (IR) drop across the corresponding n-type or p-type finFETs and corresponding conductive structures 320a, 320b, 320c, 320d or 320e thereby yielding better performance than other approaches with unbalanced IR drops.

The set of conductive feature layout patterns 220 is on a second level different from the first level. In some embodiments, the second level corresponds to the metal zero (M0) level of one or more of layout designs 100, 200, 500, 700, 900A-900C, 1000A-1000E or 1200B (FIG. 1, 2A-2B, 5A-5B, 7A-7B, 9A-9C, 10A-10E or 12B) or integrated circuit 300, 400A-400B, 600 or 800 (FIG. 3A-3B, 4A-4B, 6A-6B or 8A-8B). Other levels, quantities or configurations of the set of conductive feature layout patterns 220 are within the scope of the present disclosure.

Layout design 200 further includes at least conductive feature layout patterns 230a, 230b, 230c, 230d, 230e or 230f (collectively referred to as a "set of conductive feature layout patterns 230") extending in the first direction X. In some embodiments, the set of conductive feature layout patterns 230 is also referred to as a first set of pin layout patterns.

The set of conductive feature layout patterns 230 are located on the second level. The set of conductive feature layout patterns 230 is usable to manufacture a corresponding set of conductive structures 330 (FIGS. 3A-3B) of integrated circuit 300. Conductive feature layout patterns 230a, 230b, 230c, 230d, 230e, 230f are usable to manufacture corresponding conductive structures 330a, 330b, 330c, 330d, 330e, 330f (FIGS. 3A-3B).

Each conductive feature layout pattern of the set of conductive feature layout patterns 230 is separated from an adjacent conductive feature layout pattern of the set of conductive feature layout patterns 230 or an adjacent conductive feature layout pattern of the set of conductive feature layout patterns 220 in the second direction Y by a same pitch (not labelled) and are therefore evenly distributed. In some embodiments, at least one conductive feature layout pattern of the set of conductive feature layout patterns 230 is separated from an adjacent conductive feature layout pattern of the set of conductive feature layout patterns 230 or an adjacent conductive feature layout pattern of the set of conductive feature layout patterns 220 in the second direction Y by a pitch different from the same pitch.

The set of conductive feature layout patterns 230 overlaps set of active region layout patterns 202, 204 and 206. Conductive feature layout pattern 230a, 230c, 230d, 230f overlaps corresponding active region layout pattern 202a, 204a, 204b, 206a.

Conductive feature layout patterns 230a, 230b and 230c are between conductive feature layout pattern 220a and conductive feature layout pattern 220b. Conductive feature layout patterns 230d, 230e and 230f are between conductive feature layout pattern 220b and conductive feature layout pattern 220c.

In some embodiments, the set of conductive feature layout patterns 230 overlaps other underlying layout patterns (not shown) of other layout levels (e.g., MD, or the like) of layout design 200. In some embodiments, each layout pattern 230a, 230b, 230c, 230d, 230e, 230f of the set of conductive feature layout patterns 230 has a width W3 in the second direction Y.

In some embodiments, each layout pattern 230a, 230b, 230c, 230d, 230e, 230f of the set of conductive feature layout patterns 230 overlaps a corresponding gridline (not shown) of a set of gridlines (not shown). In some embodiments, a center of each layout pattern 230a, 230b, 230c, 230d, 230e, 230f of the set of conductive feature layout patterns 230 is aligned in the first direction X with a corresponding gridline (not shown) of the set of gridlines (not shown).

In some embodiments, layout patterns 230a, 230b, 230c, 230d, 230e and 230f of the set of conductive feature layout patterns 230 correspond to 6 M0 routing tracks in cell layout design 201. Other numbers of routing tracks in the set of conductive feature layout patterns 230 are within the scope of the present disclosure.

The set of conductive feature layout patterns 230 is on the second level. Other levels, quantities or configurations of the set of conductive feature layout patterns 230 are within the scope of the present disclosure.

Layout design 200 further includes at least conductive feature layout patterns 232a, 232b, 232c, 232d, 232e or 232f (collectively referred to as a "set of conductive feature layout patterns 232") extending in the first direction X. In some embodiments, the set of conductive feature layout patterns 232 is also referred to as a second set of pin layout patterns.

The set of conductive feature layout patterns 232 is usable to manufacture a corresponding set of conductive structures 332 (FIGS. 3A-3B) of integrated circuit 300. Conductive feature layout patterns 232a, 232b, 232c, 232d, 232e, 232f are usable to manufacture corresponding conductive structures 332a, 332b, 332c, 332d, 332e, 332f (FIGS. 3A-3B).

Each conductive feature layout pattern of the set of conductive feature layout patterns 232 is separated from an adjacent conductive feature layout pattern of the set of conductive feature layout patterns 232 or an adjacent conductive feature layout pattern of the set of conductive feature layout patterns 220 in the second direction Y by a same pitch (not labelled) and are therefore evenly distributed. In some embodiments, at least one conductive feature layout pattern of the set of conductive feature layout patterns 232 is separated from an adjacent conductive feature layout pattern of the set of conductive feature layout patterns 232 or an adjacent conductive feature layout pattern of the set of conductive feature layout patterns 220 in the second direction Y by a pitch different from the same pitch.

The set of conductive feature layout patterns 232 overlaps set of active region layout patterns 206, 208 and 210. Conductive feature layout pattern 232a, 232c, 232d, 232f overlaps corresponding active region layout pattern 206b, 208a, 208b, 210a.

Conductive feature layout patterns 232a, 232b and 232c are between conductive feature layout pattern 220c and conductive feature layout pattern 220d. Conductive feature layout patterns 232d, 232e and 232f are between conductive feature layout pattern 220d and conductive feature layout pattern 220e.

In some embodiments, the set of conductive feature layout patterns 232 overlaps other underlying layout patterns (not shown) of other layout levels (e.g., MD, or the like) of layout design 200. In some embodiments, each layout pattern 232a, 232b, 232c, 232d, 232e, 232f of the set of conductive feature layout patterns 232 has a width W3 in the second direction Y.

In some embodiments, each layout pattern 232a, 232b, 232c, 232d, 232e, 232f of the set of conductive feature layout patterns 232 overlaps a corresponding gridline (not shown) of a set of gridlines (not shown). In some embodiments, a center of each layout pattern 232a, 232b, 232c, 232d, 232e, 232f of the set of conductive feature layout patterns 232 is aligned in the first direction X with a corresponding gridline (not shown) of the set of gridlines (not shown).

In some embodiments, layout patterns 232a, 232b, 232c, 232d, 232e and 232f of the set of conductive feature layout patterns 232 correspond to 6 M0 routing tracks in cell layout design 203. Other numbers of routing tracks in the set of conductive feature layout patterns 232 are within the scope of the present disclosure.

The set of conductive feature layout patterns 232 is on the second level. Other levels, quantities or configurations of the set of conductive feature layout patterns 232 are within the scope of the present disclosure.

FIGS. 3A-3B are diagrams of a top view of an integrated circuit 300, in accordance with some embodiments.

FIG. 3A is a diagram of a portion 300A of integrated circuit 300 of FIGS. 3A-3B, simplified for ease of illustration. For example, in comparison with FIG. 3B, portion 300A of FIG. 3A does not show a set of conductive structures 330 and 332 of FIG. 3B for ease of illustration.

In some embodiments, FIGS. 3A-3B show one or more features of integrated circuit 300 of the active region (OD) level and M0 level of integrated circuit 300 or layout design 200 for ease of illustration. In other words, in some embodiments, integrated circuit 300 does not show at least gates and contacts for ease of illustration.

Integrated circuit 300 is manufactured by layout design 200. Structural relationships including alignment, distances, lengths and widths, as well as configurations of at least integrated circuit 300 of FIGS. 3A-3B, 400A-400B of FIGS. 4A-4B, 600 of FIGS. 6A-6B, 800 of FIGS. 8A-8B are similar to the corresponding structural relationships and corresponding configurations of at least layout design 100 of FIG. 1, 200 of FIGS. 2A-2B, 500 of FIGS. 5A-5B, 700 of FIGS. 7A-7B, 900A-900C of FIGS. 9A-9C, 1000A-1000E of FIGS. 10A-10E or 1200B of FIG. 12B, and similar detailed description will not be described in FIGS. 1, 2A-2B, 3A-3B, 4A-4B, 5A-5B, 6A-6B, 7A-7B, 8A-8B, 9A-9B, 10A-10E and 12B for brevity.

Integrated circuit 300 has a height H3' in the second direction Y. Integrated circuit 300 includes a cell 301 and a cell 303. Cell 301 has a height H1' in the second direction Y, and cell 303 has a height H2' in the second direction Y. In some embodiments, the height H1' of cell 301 is different from the height H2' of cell 303.

Cell 301 is manufactured by layout design 102a of row 1 of layout design 100 or layout design 102b of row 3 of layout design 100. Cell 301 is manufactured by cell layout design 201. Cell 303 is manufactured by layout design 104a of row 2 of layout design 100 or layout design 104b of row 4 of layout design 100. Cell 303 is manufactured by cell layout design 203.

Integrated circuit 300 further includes at least active regions 302a and 302b (collectively referred to as a "set of active regions 302"), active regions 304a and 304b (collectively referred to as a "set of active regions 304"), active regions 306a and 306b (collectively referred to as a "set of active regions 306"), active regions 308a and 308b (collectively referred to as a "set of active regions 308") or active regions 310a and 310b (collectively referred to as a "set of active regions 310").

In some embodiments, the set of active regions 302, 304, 308 or 310 defines source or drain diffusion regions of integrated circuit 400B (FIG. 4B). In some embodiments, at least active region 302a, 302b, 304a, 304b, 308a, 308b, 310a or 310b includes active region 412 (FIG. 4B) of integrated circuit 400B. In some embodiments, at least active region 302a, 302b, 304a, 304b, 308a, 308b, 310a or 310b includes fins 412a1, 412a2 and 412a3 of active region 412 (FIG. 4B).

In some embodiments, the set of active regions 306 defines source or drain diffusion regions of integrated circuit 400A (FIG. 4A). In some embodiments, at least active region 306a or 306b includes active region 402 (FIG. 4A) of integrated circuit 400A. In some embodiments, at least active region 306a or 306b includes fins 402a1 and 402a2 of active region 402 (FIG. 4A).

In some embodiments, active regions 302a, 304a, 304b and 306a are part of cell 301. In some embodiments, active regions 306b, 308a, 308b and 310a are part of cell 303. In some embodiments, active region 302b is part of a cell different from cell 301 or 303. In some embodiments, active region 312b is part of another cell different from cell 301 or 303.

Active regions 302a, 302b, 304a, 304b, 308a, 308b, 310a and 310b each have a width W2a' in the second direction Y. In some embodiments, the width W2a' of at least one of active region 302a, 302b, 304a, 304b, 308a, 308b, 310a or 310b is different from the width W2a' of at least another of active region 302a, 302b, 304a, 304b, 308a, 308b, 310a or 310b.

Active regions 306a and 306b each have a width W2b' in the second direction Y. In some embodiments, the widths W2b' of active regions 306a and 306b are different from each other.

The width W2a' is greater than the width W2b'. In some embodiments, the relationship between at least the width W2a' of active regions 302a, 302b, 304a, 304b, 308a, 308b, 310a and 310b and the width W2b' of active regions 306a and 306b is similar to the width W2a of active region layout patterns 202a, 202b, 204a, 204b, 208a, 208b, 210a and 210b and the width W2b of active region layout patterns 206a and 206b of FIGS. 2A-2B, and similar detailed description is omitted for brevity.

In some embodiments, the relationship between at least the number of fins and resulting driving strength of active regions 302a, 302b, 304a, 304b, 308a, 308b, 310a and 310b and the number of fins and resulting driving strength of active regions 306a and 306b is similar to the corresponding number of fin layout patterns (not shown) and driving strength of width W2a of active region layout patterns 202a, 202b, 204a, 204b, 208a, 208b, 210a and 210b and the corresponding number of fin layout patterns (not shown) and driving strength of width W2b of active region layout patterns 206a and 206b, and similar detailed description is omitted for brevity.

In some embodiments, at least the width W2a' of active regions 302a, 302b, 304a, 304b, 308a, 308b, 310a and 310b is directly related to the number of corresponding fins in active region 412, and at least the width W2b' of active regions 306a and 306b is directly related to the number of corresponding fins in active region 402.

In some embodiments, an increase (or decrease) in the width W2a' of active regions 302a, 302b, 304a, 304b, 308a, 308b, 310a and 310b or the width W2a' of active regions 306a and 306b causes the number of fins and the number of conducting devices (e.g., transistors) in the set of active regions 302, 304, 306, 308 and 310 to increase (or decrease), and the corresponding speed and driving strength of the conducting devices (e.g., transistors) increases (or decreases).

In some embodiments, since the width W2a' is greater than the width W2b' results in an asymmetric active region within cell 301 or 303. For example, within cell 301 or 303, the width W2a' of active regions in the set of active regions 302, 304, 308 and 310 and the width W2b' of active regions in the set of active regions 306 is different resulting in an asymmetric or mixed width active region.

In some embodiments, in cell 301 or 303, a sum of the widths of the set of active regions 302, 304, 306, 308 and 310 of the first device type is different from a sum of widths of the set of active regions 302, 304, 306, 308 and 310 of the second device type resulting in the first device type and the second device type having asymmetric active regions with different corresponding device strengths within cell 301 or 303, and is similar to the asymmetric active region layout pattern description of FIGS. 2A-2B, and similar detailed description is omitted for brevity.

In some embodiments, in cell 301 or 303, a sum of the number of fins of the set of active regions 302, 304, 306, 308 and 310 of the first device type is different from a sum of the number of fins of the set of active regions 302, 304, 306, 308 and 310 of the second device type resulting in the first device type and the second device type having asymmetric active regions with different corresponding device strengths within cell 301 or 303, and is similar to the description of FIGS. 2A-2B of asymmetric active region layout patterns with different numbers of fins, and similar detailed description is omitted for brevity.

For example, in some embodiments, the first device type is an n-type finFET and the second device type is a p-type finFET, for cell 301 the strength of the n-type finFETs is less than the strength of the p-type finFETs for reasons similar to cell layout design 201, and for cell 303 the strength of the n-type finFETs is less than the strength of the p-type finFETs for reasons similar to cell layout design 203, and are omitted for brevity.

For example, in some embodiments, the first device type is a p-type finFET and the second device type is an n-type finFET, for cell 301 the strength of the p-type finFETs is less than the strength of the n-type finFETs for reasons similar to cell layout design 201, and for cell 303 the strength of the p-type finFETs is less than the strength of the n-type finFETs for reasons similar to cell layout design 203, and are omitted for brevity.

Asymmetric active regions may result in a possible unbalanced device strength between the n-type finFET devices and the p-type finFET devices. However, by using the features of integrated circuit 300, the widths W2a' and W2b' or number of fins (e.g., integer m or integer n) are selected or adjusted to better balance the n-type finFET and p-type finFET device strengths compared to other approaches resulting in better circuit performance than other approaches.

For example, in some embodiments, the location of n-type or p-type finFET devices (e.g., active regions 302a, 306a, 306b and 310a are positioned at cell boundaries (e.g., cell boundary 101a, 101b, 101c, 101d or 101e) to better balance any mismatch between the number of widths W2a' and W2b' or the number of fins in integrated circuit 300 compared to other approaches.

In some embodiments, the first device type is an n-type finFET and the second device type is a p-type finFET, and the location of n-type finFETs (e.g., active regions 302a, 306a, 306b and 310a are positioned at cell boundaries (e.g., cell boundary 101a, 101b, 101c, 101d or 101e) to better balance the mismatch between the number of widths W2a' and W2b' or the number of fins in integrated circuit 300 compared to other approaches.

In some embodiments, the first device type is a p-type finFET and the second device type is an n-type finFET, and the location of p-type finFETs (e.g., active regions 302a, 306a, 306b and 310a are positioned at cell boundaries (e.g., cell boundary 101a, 101b, 101c, 101d or 101e) to better balance the mismatch between the number of widths W2a' and W2b' or the number of fins in integrated circuit 300 compared to other approaches.

In some embodiments, the set of active regions 302 is located on the first level. Other configurations or quantities of patterns in at least set of active regions 302, 304, 306, 308 or 310 are within the scope of the present disclosure.

Integrated circuit 300 further includes at least conductive structure 320a, 320b, 320c, 320d or 320e (collectively referred to as a "set of conductive structures 320"), at least conductive structure 330a, 330b, 330c, 330d, 330e or 330f (collectively referred to as a "set of conductive structures 330") or at least conductive structure 332a, 332b, 332c, 332d, 332e or 332f (collectively referred to as a "set of conductive structures 332").

In some embodiments, the set of conductive structures 320 is over at least the set of active regions 302, 304, 306, 308 or 310. Each conductive structure of the set of conductive structures 320 has a corresponding width $W_{1'}$ in the second direction Y. In some embodiments, at least one conductive structure of the set of conductive structures 320 has a corresponding width $2*W_{1'}$ in the second direction Y. In some embodiments, at least one width W1' of a conductive structure of the set of conductive structures 320 differs from at least one width W1' of another conductive structure of the set of conductive structures 320.

In some embodiments, the set of conductive structures 320 is also referred to as a set of power rails. In some embodiments, conductive structures 320a, 320c and 320e are configured to supply the first supply voltage, and conductive structures 320b and 320d are configured to supply the second supply voltage. In some embodiments, the first supply voltage is supply voltage VDD, and the second supply voltage is reference supply voltage VSS. In some embodiments, the first supply voltage is reference supply voltage VSS, and the second supply voltage is supply voltage VDD.

In some embodiments, if the set of active regions 302, 306 and 310 correspond to n-type finFETs (e.g., the first device type), and the set of active regions 304 and 308 correspond to p-type finFETs (e.g., the second device type), then the first supply voltage is reference supply voltage VSS, the second supply voltage is supply voltage VDD, conductive structures 320a, 320c and 320e provide reference supply voltage VSS, and conductive structures patterns 320b and 320d provide supply voltage VDD.

In some embodiments, if the set of active regions 302, 306 and 310 correspond to p-type finFETs (e.g., the second device type), and the set of active regions 304 and 308 correspond to n-type finFETs (e.g., the first device type), then the second supply voltage is reference supply voltage VSS, the first supply voltage is supply voltage VDD, conductive structures 320a, 320c and 320e provide supply voltage VDD, and conductive structures patterns 320b and 320d provide reference supply voltage VSS.

In some embodiments, the center of conductive structure 320a is separated from the active region 302b or 302a in the second direction Y by at least a corresponding distance d7' or d8'. In some embodiments, the center of conductive structure 320b is separated from the active region 304a or 304b in the second direction Y by at least a corresponding distance d1' or d2'. In some embodiments, the center of conductive structure 320c is separated from the active region 306a or 306b in the second direction Y by at least a corresponding distance d3' or d4'. In some embodiments, the center of conductive structure 320d is separated from the active region 308a or 308b in the second direction Y by at least a corresponding distance d5' or d6'. In some embodiments, the center of conductive structure 320e is separated from the active region 310a or 310b in the second direction Y by at least a corresponding distance d7' or d8'.

In some embodiments, by placing conductive structure 320a, 320b, 320c, 320d or 320e between corresponding set of active regions 302, 304, 306, 308 or 310, a difference between corresponding distances d7' and d8', d1' and d2', d3' and d4', d5' and d6', & d7' and d8' is reduced, resulting in a more balanced IR drop across the corresponding n-type or p-type finFETs and corresponding conductive structures 320a, 320b, 320c, 320d or 320e thereby yielding better performance than other approaches with unbalanced IR drops.

Conductive structure 330a, 330c, 330d or 330f overlaps corresponding active region 302a, 304a, 304b or 306a.

Conductive structure 332a, 332c, 332d or 332f overlaps corresponding active region 306b, 308a, 308b or 310a.

In some embodiments, the set of conductive structures 330 or 332 overlaps other underlying structures (not shown) of other levels (e.g., MD, or the like) of integrated circuit 300.

In some embodiments, each conductive structure 330a, 330b, 330c, 330d, 330e, 330f of the set of conductive structures 330 or each conductive structure 332a, 332b, 332c, 332d, 332e, 332f of the set of conductive structures 332 has a width W3' in the second direction Y.

In some embodiments, each conductive structure of the set of conductive structures 330 is separated from an adjacent conductive structure of the set of conductive structures 330 or an adjacent conductive structure of the set of conductive structures 320 in the second direction Y by a same pitch (not labelled) and are therefore evenly distributed. In some embodiments, each conductive structure of the set of conductive structures 332 is separated from an adjacent conductive structure of the set of conductive structures 332 or an adjacent conductive structure of the set of conductive structures 320 in the second direction Y by a same pitch (not labelled) and are therefore evenly distributed.

In some embodiments, conductive structures 330a, 330b, 330c, 330d, 330e and 330f of the set of conductive structures 330 or conductive structures 332a, 332b, 332c, 332d, 332e and 332f of the set of conductive structures 332 correspond to 6 M0 routing tracks in cell 301. Other numbers of routing tracks in the set of conductive structures 330 or 332 are within the scope of the present disclosure.

The set of conductive structures 320, 330 or 332 is on the second level. Other levels, quantities or configurations of the set of conductive structures 320, 330 or 332 are within the scope of the present disclosure.

FIGS. 4A-4B are perspective views of finFETs 410 and 420, in accordance with some embodiments.

In some embodiments, active region 402 corresponds to active regions with 2 fins, and active region 412 corresponds to active regions with 3 fins. For example, in some embodiments, active region 402 corresponds to at least active region 306a or 306b in FIGS. 3A-3B. For example, in some embodiments, active region 412 corresponds to at least active region 302a, 302b, 304a, 304b, 308a, 308b, 310a or 310b in FIGS. 3A-3B.

In some embodiments, active region 402 corresponds to at least active region 606b or 608a in FIGS. 6A-6B. In some embodiments, active region 412 corresponds to at least active region 302a, 302b, 604a, 604b, 606a, 608b, 310a or 310b in FIGS. 6A-6B.

In some embodiments, active region 402 corresponds to at least active region 804b or 806a in FIGS. 8A-8B. In some embodiments, active region 412 corresponds to at least active region 302a, 302b, 804a, 806b, 308a, 308b, 310a or 310b in FIGS. 8A-8B.

In FIG. 4A, a finFET 410 is formed over two fin structures 402a1 and 402a2 in active region 402. The gate of finFET 410 is formed by gate 404 over fin structures 402a1 and 402a2. One of the source terminal or drain terminal of finFET 410 is formed by contact 406 over fin structures 402a1 and 402a2. The other of the source terminal or drain terminal of finFET 410 is formed by contact 408 over fin structures 402a1 and 402a2.

In FIG. 4B, a finFET 420 is formed over three fin structures 412a1, 412a2 and 412a3 in active region 412. The gate of finFET 420 is formed by gate 414 over fin structures 412a1, 412a2 and 412a3. One of the source terminal or drain terminal of finFET 420 is formed by contact 416 over fin structures 412a1, 412a2 and 412a3. The other of the source terminal or drain terminal of finFET 420 is formed by contact 418 over fin structures 412a1, 412a2 and 412a3.

In some embodiments, the number of fin structures in finFET 420 is greater than the number of fin structures in finFET 410. Other configurations or number of fin structures in active region 402 or 412 are within the scope of the present disclosure.

In some embodiments, the number of gates in finFET 420 is greater than the number of gates in finFET 410. Other configurations or number of gates for at least gate 404 or 424 are within the scope of the present disclosure.

FIGS. 5A-5B are diagrams of a layout design, in accordance with some embodiments.

FIGS. 5A-5B are diagrams of a layout design 500 of an integrated circuit 600 of FIGS. 6A-6B, in accordance with some embodiments.

FIG. 5A is a diagram of a portion 500A of layout design 500 of FIGS. 5A-5B, simplified for ease of illustration. For example, in comparison with FIG. 5B, portion 500A of FIG. 5A does not show a set of conductive feature layout patterns 230 and 232 of FIG. 5B for ease of illustration.

Layout design 500 is an embodiment of layout designs 102a and 104a of FIG. 1 or layout designs 102b and 104b of FIG. 1. Layout design 500 is usable to manufacture integrated circuit 600.

Layout design 500 is a variation of layout design 200 (FIGS. 2A-2B), and therefore similar detailed description is omitted. For example, layout design 500 illustrates an example where the location of the cells (e.g., cell layout designs 501 and 503) are shifted by a distance D1 in the second direction Y compared with the location of the cells (e.g., cell layout designs 201 and 203) of layout design 200. Stated differently, layout design 500 corresponds to layout design 200 shifted by distance D1 in the second direction Y, but the locations of cell layout designs 501 and 503 are in similar positions as the location of cell layout designs 201 and 203.

Layout design 500 includes cell layout designs 501 and 503. In comparison with layout design 200, cell layout designs 501 and 503 replace corresponding cell layout designs 201 and 203, and similar detailed description is therefore omitted. Cell layout design 501 or 503 is usable to manufacture corresponding cell 601 or 603 (FIGS. 6A-6B), in accordance with some embodiments. In comparison with cell layout designs 201 and 203, cell layout design 501 is a mirror image of cell layout design 503 with respect to at least cell boundary 101b or 101d.

Layout design 500 further includes set of active region layout patterns 202, a set of active region layout patterns 504, a set of active region layout patterns 506, a set of active region layout patterns 508, set of active region layout patterns 210, a set of conductive feature layout patterns 520, set of conductive feature layout patterns 230 and set of conductive feature layout patterns 232.

In comparison with layout design 200 of FIGS. 2A-2B, set of active region layout patterns 504 replaces set of active region layout patterns 204, set of active region layout patterns 506 replaces set of active region layout patterns 206, set of active region layout patterns 508 replaces set of active region layout patterns 208, and set of conductive feature layout patterns 520 replaces set of conductive feature layout patterns 220, and similar detailed description is therefore omitted.

The set of active region layout patterns 504 includes at least active region layout patterns 504a or 504b. Active region layout pattern 504a or 504b replaces corresponding active region layout pattern 204a or 204b of FIGS. 2A-2B, and similar detailed description is therefore omitted. In comparison with active region layout pattern 204a or 204b, active region layout pattern 504a or 504b corresponds to n-type finFET devices when active region layout patterns 204a or 204b correspond to p-type finFET devices, and therefore conductive feature layout pattern 520b corresponds to the reference supply voltage VSS instead of supply voltage VDD of FIGS. 2A-2B. Similarly, in comparison with active region layout pattern 204a or 204b, active region layout pattern 504a or 504b corresponds to p-type finFET devices when active region layout pattern 204a or 204b corresponds to n-type finFET devices respectively, and therefore conductive feature layout pattern 520b corresponds to the supply voltage VDD instead of reference supply voltage VSS of FIGS. 2A-2B.

The set of active region layout patterns 506 includes at least active region layout patterns 506a or 506b. Active region layout pattern 506a or 506b replaces corresponding active region layout pattern 206a or 206b of FIGS. 2A-2B, and similar detailed description is therefore omitted. In comparison with active region layout pattern 206a or 206b, active region layout pattern 506a or 506b corresponds to p-type finFET devices when active region layout patterns 206a or 206b correspond to n-type finFET devices, and therefore conductive feature layout pattern 520b corresponds to the supply voltage VDD instead of reference supply voltage VSS of FIGS. 2A-2B. Similarly, in comparison with active region layout pattern 206a or 206b, active region layout pattern 506a or 506b corresponds to n-type finFET devices when active region layout patterns 206a or 206b correspond to p-type finFET devices, and therefore conductive feature layout pattern 520b corresponds to the reference supply voltage VSS instead of supply voltage VDD of FIGS. 2A-2B. In comparison with active region layout pattern 206a, active region layout pattern 506a is useable to manufacture an active region 606a having 2 fins.

The set of active region layout patterns 508 includes at least active region layout patterns 508a or 508b. Active region layout pattern 508a or 508b replace corresponding active region layout pattern 208a or 208b of FIGS. 2A-2B, and similar detailed description is therefore omitted. In comparison with active region layout pattern 208a, active region layout pattern 508a is useable to manufacture an active region 608a having 2 fins.

In some embodiments, active region layout patterns 504a, 504b, 506a and 506b are part of cell layout design 501. In some embodiments, active region layout patterns 508a, 508b, 210a and 210b are part of cell layout design 503. In some embodiments, active region layout patterns 202a and 202b are part of a cell layout design different from cell layout design 501 or 503.

In some embodiments, at least active region layout pattern 504a, 504b, 506a, 506b, 508a or 508b is usable to manufacture at least corresponding active region 604a, 604b, 606a, 606b, 608a or 608b (e.g., source and drain regions of n-type or p-type finFET transistors).

In some embodiments, set of active region layout patterns 202, 504 and 210 correspond to active regions 302, 604 and 310 of the first device type, and the set of active region layout patterns 506 and 508 correspond to the set of active regions 606 and 608 of the second device type, respectively.

In some embodiments, the first device type is an n-type finFET and the second device type is a p-type finFET. For example, in some embodiments, active region layout patterns 202a, 202b, 504a, 504b, 210a and 210b correspond to active regions 302a, 302b, 604a, 604b, 310a and 310b of n-type finFET transistors, and active region layout patterns 506a, 506b, 508a and 508b correspond to active regions 606a, 606b, 608a and 608b of p-type finFET transistors, respectively. In some embodiments, at least active region layout pattern 202a, 202b, 504a, 504b, 210a or 210b is usable to manufacture corresponding active region 302a, 302b, 604a, 604b, 310a or 310b (e.g., source and drain regions of n-type finFET transistors), and at least active region layout pattern 506a, 506b, 508a or 508b is usable to manufacture corresponding active region 606a, 606b, 608a or 608b (e.g., source and drain regions of p-type finFET transistors).

In some embodiments, the first device type is an n-type finFET and the second device type is a p-type finFET. In these embodiments, if the first device type is an n-type finFET and the second device type is a p-type finFET, then a number of n-type finFETs of the set of active regions 604 and 310 manufactured by the corresponding set of active region layout patterns 504 and 210 is greater than a number of p-type finFETs of the set of active regions 606 and 608 manufactured by the corresponding set of active region layout patterns 506 and 508, and thus for at least cell layout design 501 or 503 (or cell 601 or 603), the strength of the n-type finFETs is greater than the strength of the p-type finFETs.

In some embodiments, the first device type is a p-type finFET and the second device type is an n-type finFET. For example, in some embodiments, active region layout patterns 202a, 202b, 504a, 504b, 210a and 210b correspond to active regions 302a, 302b, 604a, 604b, 310a and 310b of p-type finFET transistors, and active region layout patterns 506a, 506b, 508a and 508b correspond to active regions 606a, 606b, 608a and 608b of n-type finFET transistors, respectively. In some embodiments, at least active region layout pattern 202a, 202b, 504a, 504b, 210a or 210b is usable to manufacture corresponding active region 302a, 302b, 604a, 604b, 310a or 310b (e.g., source and drain regions of p-type finFET transistors), and at least active region layout pattern 506a, 506b, 508a or 508b is usable to manufacture corresponding active region 606a, 606b, 608a or 608b (e.g., source and drain regions of n-type finFET transistors).

In some embodiments, the first device type is a p-type finFET and the second device type is an n-type finFET. In these embodiments, if the first device type is a p-type finFET and the second device type is an n-type finFET, then a number of p-type finFETs of the set of active regions 604 and 310 manufactured by the corresponding set of active region layout patterns 504 and 210 is greater than a number of n-type finFETs of the set of active regions 606 and 608 manufactured by the corresponding set of active region layout patterns 506 and 508, and thus for at least cell layout design 501 or 503 (or cell 601 or 603), the strength of the p-type finFETs is greater than the strength of the n-type finFETs.

In some embodiments, a different transistor type for at least the set of active region layout patterns 202, 504, 506, 508 or 210 or the set of active regions 302, 604, 606, 608 or 310 is within the scope of the present disclosure.

In comparison with FIGS. 2A-2B, in some embodiments, at least active region layout pattern 504a, 504b, 506a or 508b is useable to manufacture corresponding active region 604a, 604b, 606a or 608b having m fins, and at least active region layout pattern 506b or 508a is useable to manufacture corresponding active region 606b or 608a having n fins, where m is an integer and n is another integer. For example, in some embodiments, integer m is equal to 3 and integer n is equal to 2 in layout design 500 or integrated circuit 600, such that the set of active region layout patterns 202, 504 and 210 are useable to manufacture corresponding set of active regions 302, 604 and 310 having 6 fins each, active region layout patterns 506a and 508b are useable to manufacture corresponding active regions 606a and 608b having 3 fins, and active region layout patterns 506b and 508a are useable to manufacture corresponding active regions 606b and 608a having 2 fins. Other values for at least integer m or integer n are within the scope of the present disclosure.

In some embodiments, by using the features of layout design 500, the widths W2a and W2b or number of fins (e.g., integer m or integer n) of the set of active region layout patterns 202, 504, 506, 508 and 210 are selected or adjusted to better balance the n-type finFET and p-type finFET device strengths compared to other approaches resulting in better circuit performance than other approaches.

In some embodiments, at least the set of active region layout patterns 504, 506 or 508 is located on the first level. Other configurations or quantities of patterns in at least set of active region layout patterns 504, 506 or 508 are within the scope of the present disclosure.

The set of conductive feature layout patterns 520 includes at least conductive feature layout pattern 220a, 520b, 520c, 220d or 220e. In comparison with FIGS. 2A-2B, conductive feature layout pattern 520b or 520c replaces corresponding conductive feature layout pattern 220b or 220c of FIGS. 2A-2B, and similar detailed description is therefore omitted.

In comparison with the set of conductive feature layout patterns 220 of FIGS. 2A-2B, in some embodiments, the set of conductive feature layout patterns 520 are shifted in the second direction Y by a distance D1.

In comparison with conductive feature layout pattern 220b, conductive feature layout pattern 520b corresponds to reference supply voltage VSS instead of supply voltage VDD of FIGS. 2A-2B, when active region layout pattern 504a or 504b corresponds to n-type finFET devices. Similarly, in comparison with conductive feature layout pattern 220b, conductive feature layout pattern 520b corresponds to supply voltage VDD instead of reference supply voltage VSS of FIGS. 2A-2B, when active region layout pattern 504a or 504b corresponds to p-type finFET devices.

In comparison with conductive feature layout pattern 220c, conductive feature layout pattern 520c corresponds to supply voltage VDD instead of reference supply voltage VSS of FIGS. 2A-2B, when active region layout pattern 506a or 506b corresponds to p-type finFET devices. Similarly, in comparison with conductive feature layout pattern 220c, conductive feature layout pattern 520c corresponds to reference supply voltage VSS instead of supply voltage VDD of FIGS. 2A-2B, when active region layout pattern 506a or 506b corresponds to n-type finFET devices.

In comparison with layout design 200 of FIGS. 2A-2B, the reference supply voltage VSS or supply voltage VDD in FIGS. 5A-5B are positioned in groups of 2 versus alternating in the second direction Y.

In some embodiments, the set of conductive feature layout patterns 520 is usable to manufacture the set of conductive structures 620. In some embodiments, at least conductive feature layout pattern 520b or 520c is usable to manufacture at least corresponding conductive structure 620b or 620c.

In some embodiments, at least one conductive feature layout pattern of the set of conductive feature layout patterns 520 does not overlap cell boundary 101a, 101b, 101c, 101d or 101e.

In some embodiments, by placing conductive feature layout pattern 220a, 520b, 520c, 220d or 220e between corresponding set of active region layout pattern 202, 504, 506, 508 or 210, a difference between corresponding distances d7 and d8, d1 and d2, d3 and d4, d5 and d6, & d7 and d8 is reduced, resulting in a more balanced IR drop across the corresponding n-type or p-type finFETs and corresponding conductive structures 320a, 620b, 620c, 320d or 320e thereby yielding better performance than other approaches with unbalanced IR drops.

The set of conductive feature layout patterns 520 is on the second level. Other levels, quantities or configurations of the set of conductive feature layout patterns 520 are within the scope of the present disclosure.

FIGS. 6A-6B are diagrams of a top view of an integrated circuit 600, in accordance with some embodiments.

FIG. 6A is a diagram of a portion 600A of integrated circuit 600 of FIGS. 6A-6B, simplified for ease of illustration. For example, in comparison with FIG. 6B, portion 600A of FIG. 6A does not show a set of conductive structures 330 and 332 of FIG. 6B for ease of illustration.

Integrated circuit 600 is manufactured by layout design 500.

Integrated circuit 600 is a variation of integrated circuit 300 (FIGS. 3A-3B), and therefore similar detailed description is omitted. For example, integrated circuit 600 illustrates an example where the location of the cells (e.g., cells 601 and 603) are shifted by a distance D1' in the second direction Y compared with the location of the cells (e.g., cells 301 and 303) of integrated circuit 300. Stated differently, integrated circuit 600 corresponds to integrated circuit 300 shifted by distance D1' in the second direction Y, but the locations of cells 601 and 603 are in similar positions as the location of cells 301 and 303.

Integrated circuit 600 includes cells 601 and 603. In comparison with integrated circuit 300, cells 601 and 603 replace corresponding cells 301 and 303, and similar detailed description is therefore omitted. In comparison with cells 301 and 303, cell 601 is a mirror image of cell 603 with respect to at least cell boundary 101b or 101d.

Integrated circuit 600 further includes set of active regions 302, a set of active regions 604, a set of active regions 606, a set of active regions 608, set of active regions 310, a set of conductive structures 620, set of conductive structures 330 and set of conductive structures 332.

In comparison with integrated circuit 300 of FIGS. 3A-3B, set of active regions 604 replaces set of active regions 304, set of active regions 606 replaces set of active regions 306, set of active regions 608 replaces set of active regions 308, and set of conductive structures 620 replaces set of conductive structures 320, and similar detailed description is therefore omitted.

The set of active regions 604 includes at least active regions 604a or 604b. Active region 604a or 604b replaces corresponding active region 304a or 304b of FIGS. 3A-3B, and similar detailed description is therefore omitted. In comparison with active region 304a or 304b, active region 604a or 604b corresponds to n-type finFET devices when active region 304a or 304b corresponds to n-type finFET devices, and therefore conductive structure 620b corresponds to the reference supply voltage VSS instead of supply voltage VDD of FIGS. 3A-3B. Similarly, in comparison with active region 304a or 304b, active region 604a or 604b corresponds to p-type finFET devices when active region 304a or 304b corresponds to n-type finFET devices respectively, and therefore conductive structure 620b corresponds to the supply voltage VDD instead of reference supply voltage VSS of FIGS. 3A-3B.

The set of active regions 606 includes at least active region 606a or 606b. Active region 606a or 606b replaces corresponding active region 306a or 306b of FIGS. 3A-3B, and similar detailed description is therefore omitted. In comparison with active region 306a or 306b, active region 606a or 606b corresponds to p-type finFET devices when active region 306a or 306b corresponds to n-type finFET devices, and therefore conductive structure 620b corresponds to the supply voltage VDD instead of reference supply voltage VSS of FIGS. 3A-3B. Similarly, in comparison with active region 306a or 306b, active region 606a or 606b corresponds to n-type finFET devices when active region 306a or 306b corresponds to p-type finFET devices, and therefore conductive structure 620b corresponds to the reference supply voltage VSS instead of supply voltage VDD of FIGS. 3A-3B. In comparison with active region 306a, active region 606a has 2 fins.

The set of active regions 608 includes at least active region 608a or 608b. Active region 608a or 608b replace corresponding active region 308a or 308b of FIGS. 3A-3B, and similar detailed description is therefore omitted. In comparison with active region 308a, active region 608a has 2 fins.

In some embodiments, active regions 604a, 604b, 606a and 606b are part of cell 601. In some embodiments, active regions 608a, 608b, 310a and 310b are part of cell 603. In some embodiments, active regions 302a and 302b are part of a cell different from cell 601 or 603. In some embodiments, active regions 310a and 310b are part of another cell different from cell 601 or 603.

In some embodiments, by using the features of integrated circuit 600, the widths W2a' and W2b' or number of fins (e.g., integer m or integer n) of the set of active regions 302, 604, 606, 608 and 210 are selected or adjusted to better balance the n-type finFET and p-type finFET device strengths compared to other approaches resulting in better circuit performance than other approaches.

In some embodiments, at least the set of active regions 604, 606 or 608 is located on the first level. Other configurations or quantities of patterns in at least set of active regions 604, 606 or 608 are within the scope of the present disclosure.

The set of conductive structures 620 includes at least conductive structure 320a, 620b, 620c, 320d or 320e. In comparison with FIGS. 3A-3B, conductive structure 620b or 620c replace corresponding conductive structure 320b or 320c of FIGS. 3A-3B, and similar detailed description is therefore omitted.

In comparison with the set of conductive structures 320 of FIGS. 3A-3B, in some embodiments, the set of conductive structures 620 are shifted in the second direction Y by a distance D1'.

In comparison with conductive structure 320b, conductive structure 620b corresponds to reference supply voltage VSS instead of supply voltage VDD of FIGS. 3A-3B, when active region 604a or 604b corresponds to n-type finFET devices. Similarly, in comparison with conductive structure 320b, conductive structure 620b corresponds to supply voltage VDD instead of reference supply voltage VSS of FIGS. 3A-3B, when active region 604a or 604b corresponds to p-type finFET devices.

In comparison with conductive structure 320c, conductive structure 620c corresponds to supply voltage VDD instead of reference supply voltage VSS of FIGS. 3A-3B, when active region 606a or 606b corresponds to p-type finFET devices. Similarly, in comparison with conductive structure 320c, conductive structure 620c corresponds to reference supply voltage VSS instead of supply voltage VDD of FIGS. 3A-3B, when active region 606a or 606b corresponds to n-type finFET devices.

In comparison with integrated circuit 300 of FIGS. 3A-3B, the reference supply voltage VSS or supply voltage VDD in FIGS. 6A-6B are positioned in groups of 2 versus alternating in the second direction Y.

In some embodiments, at least one conductive structure of the set of conductive structures 620 does not overlap cell boundary 101a, 101b, 101c, 101d or 101e.

In some embodiments, by placing conductive structure 320a, 620b, 620c, 320d or 320e between corresponding set of active regions 302, 604, 606, 608 or 310, a difference between corresponding distances d7' and d8', d1' and d2', d3' and d4', d5' and d6', & d7' and d8' is reduced, resulting in a more balanced IR drop across the corresponding n-type or p-type finFETs and corresponding conductive structures 320a, 620b, 620c, 320d or 320e thereby yielding better performance than other approaches with unbalanced IR drops.

The set of conductive structures 620 is on the second level. Other levels, quantities or configurations of the set of conductive structures 620 are within the scope of the present disclosure.

FIGS. 7A-7B are diagrams of a layout design, in accordance with some embodiments.

FIGS. 7A-7B are diagrams of a layout design 700 of an integrated circuit 800 of FIGS. 8A-8B, in accordance with some embodiments.

FIG. 7A is a diagram of a portion 700A of layout design 700 of FIGS. 7A-7B, simplified for ease of illustration. For example, in comparison with FIG. 5B, portion 700A of FIG. 7A does not show a set of conductive feature layout patterns 230 and 232 of FIG. 5B for ease of illustration.

Layout design 700 is an embodiment of layout designs 102a and 104a of FIG. 1 or layout designs 102b and 104b of FIG. 1. Layout design 700 is usable to manufacture integrated circuit 800.

Layout design 700 is a variation of layout design 200 (FIGS. 2A-2B), and therefore similar detailed description is omitted. For example, layout design 700 illustrates an example where the location of the cells (e.g., cell layout designs 701 and 703) are shifted by distance D1 in the second direction Y compared with the location of the cells (e.g., cell layout designs 201 and 203) of layout design 200. Stated differently, layout design 700 corresponds to layout design 200 shifted by distance D1 in the second direction Y, but the locations of cell layout designs 701 and 703 are in similar positions as the location of cell layout designs 201 and 203.

Layout design 700 includes cell layout designs 701 and 703. In comparison with layout design 200, cell layout designs 701 and 703 replace corresponding cell layout designs 201 and 203, and similar detailed description is therefore omitted. Cell layout design 701 or 703 is usable to manufacture corresponding cell 801 or 803 (FIGS. 8A-8B), in accordance with some embodiments.

In comparison with cell layout design 201, the set of active region layout patterns 704 and conductive feature layout pattern 220b are mirror images of the set of active region layout patterns 706 and conductive feature layout pattern 220c with respect to cell segment 770. In comparison with cell layout design 203, the set of active region layout patterns 208 and conductive feature layout pattern 220d are mirror images of the set of active region layout patterns 210 and conductive feature layout pattern 220e with respect to cell segment 772.

Layout design 700 further includes set of active region layout patterns 202, a set of active region layout patterns 704, a set of active region layout patterns 706, a set of active region layout patterns 208, set of active region layout patterns 210, a set of conductive feature layout patterns 220, set of conductive feature layout patterns 230 and set of conductive feature layout patterns 232.

In comparison with layout design 200 of FIGS. 2A-2B, set of active region layout patterns 704 replaces set of active region layout patterns 204, and set of active region layout patterns 706 replaces set of active region layout patterns 206, and similar detailed description is therefore omitted.

The set of active region layout patterns 704 includes at least active region layout pattern 704a or 704b. Active region layout pattern 704a or 704b replaces corresponding active region layout pattern 204a or 204b of FIGS. 2A-2B, and similar detailed description is therefore omitted. In comparison with active region layout pattern 204a or 204b, active region layout pattern 704a or 704b corresponds to n-type finFET devices when active region layout pattern 204a or 204b corresponds to p-type finFET devices, and therefore conductive feature layout pattern 220b corresponds to the reference supply voltage VSS instead of supply voltage VDD of FIGS. 2A-2B. Similarly, in comparison with active region layout pattern 204a or 204b, active region layout pattern 704a or 704b corresponds to p-type finFET devices when active region layout pattern 204a or 204b corresponds to n-type finFET devices respectively, and therefore conductive feature layout pattern 220b corresponds to the supply voltage VDD instead of reference supply voltage VSS of FIGS. 2A-2B. In comparison with active region layout pattern 204b, active region layout pattern 704b is useable to manufacture an active region 804b having 2 fins.

The set of active region layout patterns 706 includes at least active region layout pattern 706a or 706b. Active region layout pattern 706a or 706b replaces corresponding active region layout pattern 206a or 206b of FIGS. 2A-2B, and similar detailed description is therefore omitted. In comparison with active region layout pattern 206a or 206b, active region layout pattern 706a or 706b corresponds to p-type finFET devices when active region layout pattern 206a or 206b corresponds to n-type finFET devices, and therefore conductive feature layout pattern 220b corresponds to the supply voltage VDD instead of reference supply voltage VSS of FIGS. 2A-2B. Similarly, in comparison with active region layout pattern 206a or 206b, active region layout pattern 706a or 706b corresponds to n-type finFET devices when active region layout pattern 206a or 206b corresponds to p-type finFET devices, and therefore conductive feature layout pattern 220b corresponds to the reference supply voltage VSS instead of supply voltage VDD of FIGS. 2A-2B. In comparison with active region layout pattern 206a, active region layout pattern 706a is useable to manufacture an active region 806a having 2 fins.

In some embodiments, active region layout patterns 704a, 704b, 706a and 706b are part of cell layout design 701. In some embodiments, active region layout patterns 208a, 208b, 210a and 210b are part of cell layout design 703. In some embodiments, active region layout patterns 202a and 202b are part of a cell layout design different from cell layout design 701 or 703.

In some embodiments, at least active region layout pattern 704a, 704b, 706a or 706b is usable to manufacture at least corresponding active region 604a, 604b, 606a or 606b (e.g., source and drain regions of n-type or p-type finFET transistors).

In comparison with layout design 200 of FIGS. 2A-2B, the type of fins or finFETs of active regions 302, 308 and 310 manufactured by corresponding set of active region layout patterns 202, 208 and 210 in FIGS. 7A-7B, are swapped with the type of fins or finFET of active regions 302, 308 and 310 manufactured by corresponding set of active region layout patterns 202, 208 and 210 in FIGS. 2A-2B, and similar detailed description is therefore omitted. For example, in some embodiments, set of active region layout patterns 202, 706 and 210 correspond to active regions 302, 806 and 310 of the first device type, and the set of active region layout patterns 704 and 208 correspond to the set of active regions 804 and 308 of the second device type, respectively.

In some embodiments, the first device type is a p-type finFET and the second device type is an n-type finFET. For example, in some embodiments, active region layout pattern 202a, 202b, 706a, 706b, 210a or 210b corresponds to active region 302a, 302b, 806a, 806b, 310a or 310b of p-type finFET transistors, and active region layout pattern 704a, 704b, 208a or 208b corresponds to active region 804a, 804b, 308a or 308b of n-type finFET transistors, respectively.

In some embodiments, at least active region layout pattern 202a, 202b, 706a, 706b, 210a or 210b is usable to manufacture corresponding active region 302a, 302b, 806a, 806b, 310a or 310b (e.g., source and drain regions of p-type finFET transistors), and at least active region layout pattern 704a, 704b, 208a or 208b is usable to manufacture corresponding active region 804a, 804b, 308a or 308b (e.g., source and drain regions of n-type finFET transistors).

In some embodiments, the first device type is a p-type finFET and the second device type is an n-type finFET. In these embodiments, if the first device type is a p-type finFET and the second device type is an n-type finFET, then a number of p-type finFETs of the set of active regions 806 and 310 manufactured by the corresponding set of active region layout patterns 706 and 210 is equal to a number of n-type finFETs of the set of active regions 804 and 308 manufactured by the corresponding set of active region layout patterns 704 and 208, and thus for at least cell layout design 701 or 703 (or cell 801 or 803), the strength of the p-type finFETs is equal to the strength of the n-type finFETs.

In some embodiments, the first device type is an n-type finFET and the second device type is a p-type finFET. For example, in some embodiments, active region layout patterns 202a, 202b, 706a, 706b, 210a and 210b correspond to active regions 302a, 302b, 806a, 806b, 310a and 310b of n-type finFET transistors, and active region layout patterns 704a, 704b, 208a and 208b correspond to active regions 804a, 804b, 308a and 308b of p-type finFET transistors, respectively.

In some embodiments, at least active region layout pattern 202a, 202b, 706a, 706b, 210a or 210b is usable to manufacture corresponding active region 302a, 302b, 806a, 806b, 310a or 310b (e.g., source and drain regions of n-type finFET transistors), and at least active region layout pattern 704a, 704b, 208a or 208b is usable to manufacture corresponding active region 804a, 804b, 308a or 308b (e.g., source and drain regions of p-type finFET transistors).

In some embodiments, the first device type is an n-type finFET and the second device type is a p-type finFET. In these embodiments, if the first device type is an n-type finFET and the second device type is a p-type finFET, then a number of n-type finFETs of the set of active regions 806 and 310 manufactured by the corresponding set of active region layout patterns 706 and 210 is equal to a number of p-type finFETs of the set of active regions 804 and 308 manufactured by the corresponding set of active region layout patterns 704 and 208, and thus for at least cell layout design 701 or 703 (or cell 801 or 803), the strength of the n-type finFETs is equal to the strength of the p-type finFETs.

In some embodiments, a different transistor type for at least the set of active region layout patterns 202, 704, 706, 208 or 210 or the set of active regions 302, 804, 806, 308 or 310 is within the scope of the present disclosure.

In comparison with FIGS. 2A-2B, in some embodiments, at least active region layout patterns 704a, 706b, 208a or 208b is useable to manufacture corresponding active region 804a, 806b, 308a or 308b having m fins, and at least active region layout pattern 704b or 706a is useable to manufacture corresponding active region 804b or 806a having n fins, where m is an integer and n is another integer. For example, in some embodiments, integer m is equal to 3 and integer n is equal to 2 in layout design 700 or integrated circuit 800, such that the set of active region layout patterns 202, 208 and 210 are useable to manufacture corresponding set of active regions 302, 308 and 310 having 6 fins each, active region layout patterns 704a and 706b are useable to manufacture corresponding active regions 804a and 806b having 3 fins, and active region layout patterns 704b and 706a are useable to manufacture corresponding active regions 804b and 806a having 2 fins. Other values for at least integer m or integer n are within the scope of the present disclosure.

In some embodiments, by using the features of layout design 700, the widths W2a and W2b or number of fins (e.g., integer m or integer n) of the set of active region layout patterns 202, 704, 706, 208 and 210 are selected or adjusted to better balance the n-type finFET and p-type finFET device strengths compared to other approaches resulting in better circuit performance than other approaches.

In some embodiments, at least the set of active region layout patterns 704 or 706 is located on the first level. Other configurations or quantities of patterns in at least set of active region layout patterns 704 or 706 are within the scope of the present disclosure.

The set of conductive feature layout patterns 220 includes at least conductive feature layout pattern 220a, 220b, 220c, 220d or 220e. In comparison with FIGS. 2A-2B, the set of conductive feature layout patterns 220 of FIGS. 7A-7B are similar to the set of conductive feature layout patterns 220 of FIGS. 2A-2B, and therefore similar detailed description is omitted.

In comparison with the set of conductive feature layout patterns 220 of FIGS. 2A-2B, in some embodiments, the set of conductive feature layout patterns 220 of FIGS. 7A-7B are shifted in the second direction Y by distance D1.

In comparison with layout design 200 of FIGS. 2A-2B, the voltage supply (e.g., voltage supply VDD or reference voltage supply VSS) of at least conductive structure 320a, 320b, 320c, 320d or 320e in FIGS. 8A-8B manufactured by corresponding conductive feature layout pattern 220a, 220b, 220c, 220d or 220e in FIGS. 7A-7B, are swapped with the voltage supply (e.g., reference voltage supply VSS or voltage supply VDD) of at least conductive structure 320a, 320b, 320c, 320d or 320e in FIGS. 3A-3B manufactured by corresponding conductive feature layout pattern 220a, 220b, 220c, 220d or 220e in FIGS. 2A-2B, and similar detailed description is therefore omitted.

In some embodiments, at least one conductive feature layout pattern of the set of conductive feature layout patterns 220 of FIGS. 7A-7B does not overlap cell boundary 101a, 101b, 101c, 101d or 101e.

In some embodiments, by placing conductive feature layout pattern 220a, 220b, 220c, 220d or 220e between corresponding set of active region layout patterns 202, 704, 706, 208 or 210, a difference between corresponding distances d7 and d8, d1 and d2, d3 and d4, d5 and d6, & d7 and d8 is reduced, resulting in a more balanced IR drop across the corresponding n-type or p-type finFETs and corresponding conductive structure 320a, 320b, 320c, 320d or 320e thereby yielding better performance than other approaches with unbalanced IR drops.

The set of conductive feature layout patterns 220 in FIGS. 7A-7B is on the second level. Other levels, quantities or configurations of the set of conductive feature layout patterns 220 in FIGS. 7A-7B are within the scope of the present disclosure.

FIGS. 8A-8B are diagrams of a top view of an integrated circuit 800, in accordance with some embodiments.

FIG. 8A is a diagram of a portion 800A of integrated circuit 800 of FIGS. 8A-8B, simplified for ease of illustration. For example, in comparison with FIG. 8B, portion 800A of FIG. 8A does not show a set of conductive structures 330 and 332 of FIG. 8B for ease of illustration.

Integrated circuit 800 is manufactured by integrated circuit 800.

Integrated circuit 800 is a variation of integrated circuit 300 (FIGS. 3A-3B), and therefore similar detailed description is omitted. For example, integrated circuit 800 illustrates an example where the location of the cells (e.g., cells 801 and 803) are shifted by a distance D1' in the second direction Y compared with the location of the cells (e.g., cells 301 and 303) of integrated circuit 300. Stated differently, integrated circuit 800 corresponds to integrated circuit 300 shifted by distance D1' in the second direction Y, but the locations of cells 801 and 803 are in similar positions as the location of cells 301 and 303.

Integrated circuit 800 includes cells 801 and 803. In comparison with integrated circuit 300, cells 801 and 803 replace corresponding cells 301 and 303, and similar detailed description is therefore omitted.

In comparison with cell 301, the set of active regions 804 and conductive structures 320b are mirror images of the set of active regions 806 and conductive structure 320c with respect to cell segment 870. In comparison with cell 303, the set of active regions 308 and conductive structure 320d are mirror images of the set of active regions 310 and conductive structure 320e with respect to cell segment 872.

Integrated circuit 800 further includes set of active regions 302, a set of active regions 804, a set of active regions 806, set of active regions 308, set of active regions 310, set of conductive structures 320, set of conductive structures 330 and set of conductive structures 332.

In comparison with integrated circuit 300 of FIGS. 3A-3B, set of active regions 804 replaces set of active regions 304, and set of active regions 806 replaces set of active regions 306, and similar detailed description is therefore omitted.

The set of active regions 804 includes at least active region 804a or 804b. Active region 804a or 804b replaces corresponding active region 304a or 304b of FIGS. 3A-3B, and similar detailed description is therefore omitted. In comparison with active region 304a or 304b, active region 804a or 804b corresponds to n-type finFET devices when active region 304a or 304b corresponds to p-type finFET devices, and therefore conductive structure 320b corresponds to the reference supply voltage VSS instead of supply voltage VDD of FIGS. 3A-3B. Similarly, in comparison with active region 304a or 304b, active region 804a or 804b corresponds to p-type finFET devices when active region 304a or 304b corresponds to n-type finFET devices respectively, and therefore conductive structure 320b corresponds to the supply voltage VDD instead of reference supply voltage VSS of FIGS. 3A-3B. In comparison with active region 304b, active region 804b has 2 fins.

The set of active regions 806 includes at least active region 806a or 806b. Active region 806a or 806b replaces corresponding active region 306a or 306b of FIGS. 3A-3B, and similar detailed description is therefore omitted. In comparison with active region 306a or 306b, active region 806a or 806b corresponds to p-type finFET devices when active region 306a or 306b corresponds to n-type finFET devices, and therefore conductive structure 320b corresponds to the supply voltage VDD instead of reference supply voltage VSS of FIGS. 3A-3B. Similarly, in comparison with active region 306a or 306b, active region 806a or 806b corresponds to n-type finFET devices when active region 306a or 306b corresponds to p-type finFET devices, and therefore conductive structure 320b corresponds to the reference supply voltage VSS instead of supply voltage VDD of FIGS. 3A-3B. In comparison with active region 306a, active region 806a has 2 fins. In comparison with active region 306b, active region 806b has 3 fins.

In some embodiments, active regions 804a, 804b, 806a and 806b are part of cell 801. In some embodiments, active regions 308a, 308b, 310a and 310b are part of cell 803. In some embodiments, active regions 302a and 302b are part of a cell different from cell 801 or 803.

In some embodiments, by using the features of integrated circuit 800, the widths W2a' and W2b' or number of fins (e.g., integer m or integer n) of the set of active regions 302, 804, 806, 308 and 310 are selected or adjusted to better balance the n-type finFET and p-type finFET device strengths compared to other approaches resulting in better circuit performance than other approaches. For example, in some embodiments, within cell 801 or 803, the sum of the number of fins in the n-type finFETs is equal to the number of fins in the p-type finFETs, thereby causing the strength of the n-type finFETs to be equal to the strength of the p-type finFETs and thus being balanced resulting in better circuit performance than other approaches.

In some embodiments, at least the set of active regions 804 or 806 is located on the first level. Other configurations or quantities of patterns in at least set of active regions 804 or 806 are within the scope of the present disclosure.

The set of conductive structures 320 includes at least conductive structure 320a, 320b, 320c, 320d or 320e. In comparison with FIGS. 3A-3B, the set of conductive structures 320 of FIGS. 7A-7B are similar to the set of conductive structures 320 of FIGS. 3A-3B, and therefore similar detailed description is omitted.

In comparison with the set of conductive structures 320 of FIGS. 3A-3B, in some embodiments, the set of conductive structures 320 of FIGS. 7A-7B are shifted in the second direction Y by distance D1'.

In comparison with integrated circuit 300 of FIGS. 3A-3B, the voltage supply (e.g., voltage supply VDD or reference voltage supply VSS) of at least conductive structure 320a, 320b, 320c, 320d or 320e in FIGS. 8A-8B are swapped with the voltage supply (e.g., reference voltage supply VSS or voltage supply VDD) of at least conductive structure 320a, 320b, 320c, 320d or 320e in FIGS. 3A-3B, and similar detailed description is therefore omitted.

In some embodiments, at least one conductive structure of the set of conductive structures 320 of FIGS. 8A-8B does not overlap cell boundary 101a, 101b, 101c, 101d or 101e.

In some embodiments, by placing conductive structure 320a, 320b, 320c, 320d or 320e between corresponding set of active regions 302, 804, 806, 308 or 310, a difference between corresponding distances d7' and d8', d1' and d2', d3' and d4', d5' and d6', & d7' and d8' is reduced, resulting in a more balanced IR drop across the corresponding n-type or p-type finFETs and corresponding conductive structure 320a, 320b, 320c, 320d or 320e thereby yielding better performance than other approaches with unbalanced IR drops.

The set of conductive structures 320 in FIGS. 8A-8B is on the second level. Other levels, quantities or configurations of the set of conductive structures 320 in FIGS. 8A-8B are within the scope of the present disclosure.

In some embodiments, at least one structure of the set of conductive structures 320, 330, 332, 620 or at least contact 406, 408, 416 or 418 includes one or more layers of metal materials, such as Al, Cu, W, Ti, Ta, TiN, TaN, NiSi, CoSi, other suitable conductive materials, or combinations thereof.

Figure 9A:
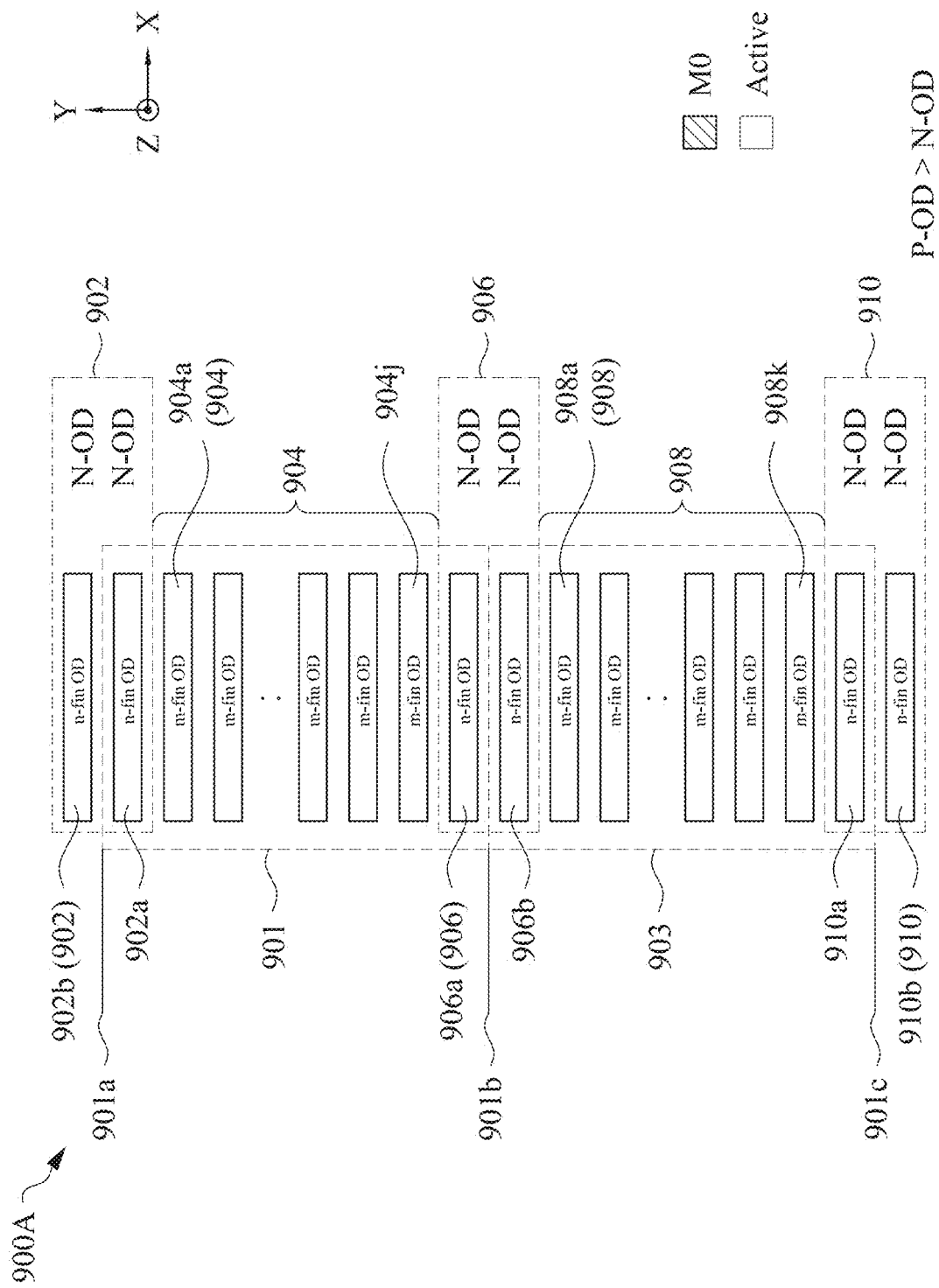
FIGS. 9A-9C are schematic views of layout designs of integrated circuits, in accordance with some embodiments.
Figure 9B:
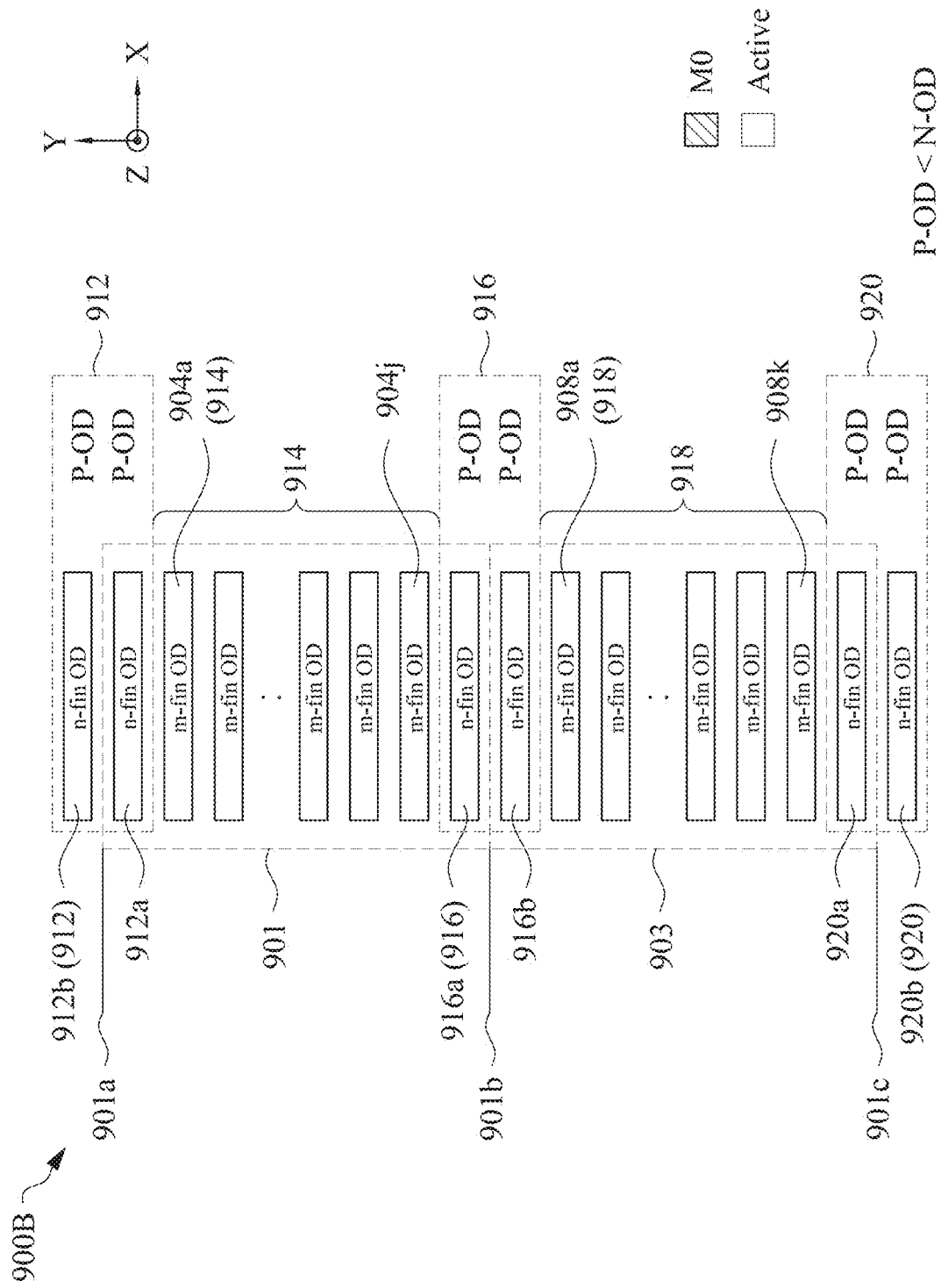
Figure 9C:
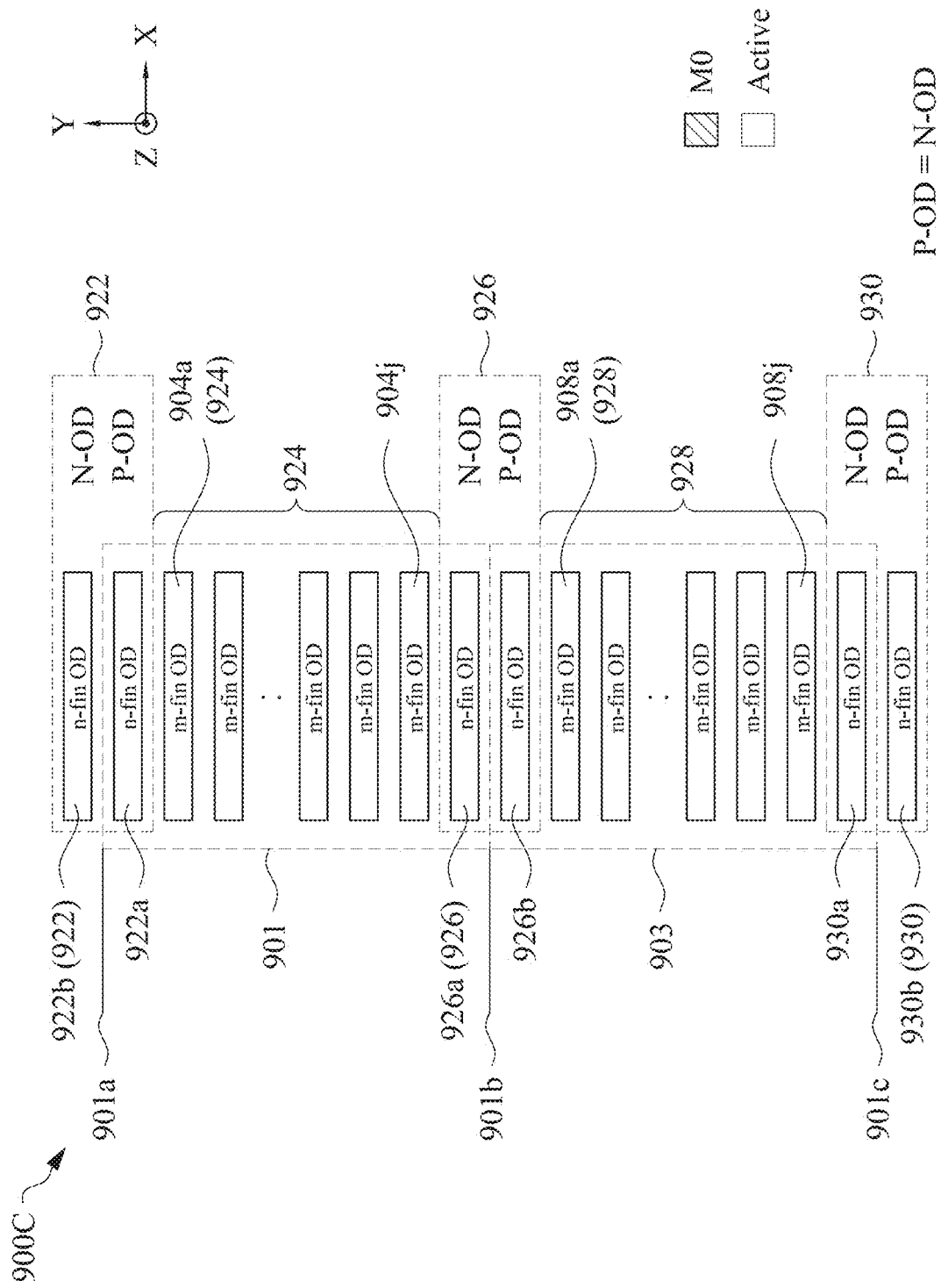

FIGS. 9A-9C are schematic views of layout designs 900A-900C of integrated circuits, in accordance with some embodiments. In some embodiments, layout designs 900A-900C are corresponding layout designs after execution of one or more operations of method 1102 of FIG. 11.

Figure 11:
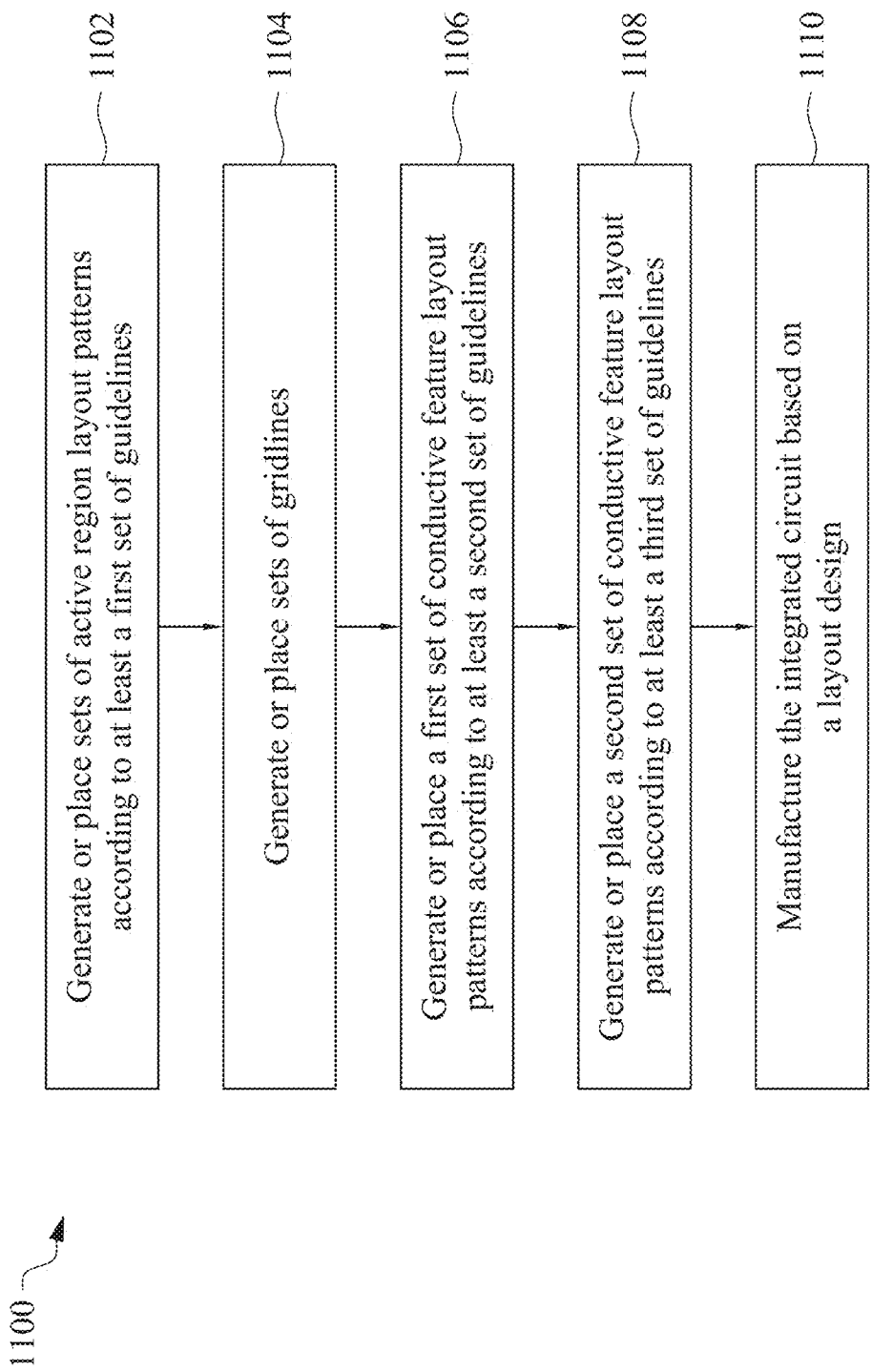
FIG. 11 is a functional flow chart of at least a portion of an integrated circuit design and manufacturing flow, in accordance with some embodiments.

FIG. 9A is a schematic view of a layout design 900A of sets of active region layout patterns 902, 904, 906, 908 and 910. In some embodiments, layout design 900A is a layout design after execution of operation 1102 of method 1100 (FIG. 11). For example, in some embodiments, layout design 900A illustrates the design guideline of operation 1102 of method 1100 when the strength of the p-type fin FET devices is greater than the strength of the n-type finFET devices.

In some embodiments, layout design 900A is a variation of layout design 200 of FIGS. 2A-2B. For example, in some embodiments, layout design 900A is similar to layout design 200 when the first device type is an n-type finFET and the second device type is a p-type finFET, and a number of n-type finFETs manufactured by the set of active region layout patterns 202, 206 and 210 is less than a number of p-type finFETs manufactured by the set of active region layout patterns 204 and 208, and similar detailed description is therefore omitted.

Layout design 900A includes cell layout designs 901 and 903. In comparison with layout design 200, cell layout designs 901 and 903 replace corresponding cell layout designs 201 and 203, and similar detailed description is therefore omitted. In some embodiments, cell layout design 901 or 903 is usable to manufacture corresponding cells 301, 601 and 801 or 303, 603 and 803, in accordance with some embodiments.

Cell boundary 901a is similar to corresponding cell boundary 101a or 101c, cell boundary 901b is similar to corresponding cell boundary 101b or 101d, cell boundary 901c is similar to corresponding cell boundary 101c or 101e, and similar detailed description is therefore omitted.

Layout design 900A further includes sets of active region layout patterns 902, 904, 906, 908 and 910.

The set of active region layout patterns 902 includes at least active region layout patterns 902a or 902b. Active region layout pattern 902a or 902b are similar to corresponding active region layout pattern 202b or 202a for when the first device type is an n-type finFET, and similar detailed description is therefore omitted. In some embodiments, active region layout pattern 902a or 902b is useable to manufacture a corresponding active region having n fins, where n is an integer.

The set of active region layout patterns 906 includes at least active region layout patterns 906a or 906b. Active region layout pattern 906a or 906b are similar to corresponding active region layout pattern 206a or 206b for when the first device type is an n-type finFET, and similar detailed description is therefore omitted. In some embodiments, active region layout pattern 906a or 906b is useable to manufacture a corresponding active region having n fins, where n is an integer.

The set of active region layout patterns 910 includes at least active region layout patterns 910a or 910b. Active region layout pattern 910a or 910b are similar to corresponding active region layout pattern 210a or 210b for when the first device type is an n-type finFET, and similar detailed description is therefore omitted. In some embodiments, active region layout pattern 910a or 910b is useable to manufacture a corresponding active region having n fins, where n is an integer.

The set of active region layout patterns 904 includes at least active region layout patterns 904a, 904b, . . . , 904j where j is an integer corresponding to a number of devices having m fins in the set of active region layout patterns 904. The set of active region layout patterns 904 is similar to at least the set of active region layout pattern 204 or 208, and similar detailed description is therefore omitted. In some embodiments, each of active region layout pattern 904a, 904b, 904j is useable to manufacture a corresponding active region having m fins, where m is an integer.

The set of active region layout patterns 908 includes at least active region layout patterns 908a, 908b, . . . , 908k where k is an integer corresponding to a number of devices having m fins in the set of active region layout patterns 908. The set of active region layout patterns 908 is similar to at least the set of active region layout pattern 204 or 208, and similar detailed description is therefore omitted. In some embodiments, each of active region layout pattern 908a, 908b, . . . , 908k is useable to manufacture a corresponding active region having m fins, where m is an integer. In some embodiments, integer j is equal to integer k. In some embodiments, integer j is different from integer k.

In some embodiments, at least active region layout pattern 904a, 904b, . . . , 904g or 904j or at least active region layout pattern 908a, 908b, . . . , 908k can include n-type finFETs (e.g., the first device type) or p-type finFETs (e.g., the second device type) provided that the strength of the p-type fin FET devices in layout design 900A is greater than the strength of the n-type finFET devices.

In some embodiments, the set of active region layout patterns 902, 906 and 910 are placed at corresponding cell boundaries 901a, 901b and 901c in accordance with the design guidelines of operation 1102 of method 100 to offset the stronger device strength of the p-type devices. By using the features of layout design 900A-900C, the positions of at least the set of active region layout patterns 902, 906, 910, 912, 916, 920, 922, 926 or 930 are selected or adjusted to better balance the n-type finFET and p-type finFET device strengths compared to other approaches resulting in better circuit performance than other approaches.

FIG. 9B is a schematic view of a layout design 900B of sets of active region layout patterns 912, 904, 916, 908 and 920. In some embodiments, layout design 900B is a layout design after execution of operation 1102 of method 1100 (FIG. 11). For example, in some embodiments, layout design 900B illustrates the design guideline of operation 1102 of method 1100 when the strength of the n-type fin FET devices is greater than the strength of the p-type finFET devices.

In some embodiments, layout design 900B is a variation of layout design 200 of FIGS. 2A-2B or layout design 900A of FIG. 9A. For example, in some embodiments, layout design 900B is similar to layout design 200 when the first device type is a p-type finFET and the second device type is an n-type finFET, and a number of p-type finFETs manufactured by the set of active region layout patterns 202, 206 and 210 is less than a number of n-type finFETs manufactured by the set of active region layout patterns 204 and 208, and similar detailed description is therefore omitted.

In comparison with layout design 900B, set of active region layout patterns 902, 906, 910 of layout design 900A is replaced with corresponding set of active region layout patterns 912, 916, 920, and similar detailed description is therefore omitted. In some embodiments, set of active region layout patterns 912, 916, 920 are similar to corresponding set of active region layout patterns 902, 906, 910, but the set of active region layout patterns 912, 916, 920 correspond to when the first device type is p-type finFETs.

The set of active region layout patterns 912 includes at least active region layout patterns 912a or 912b. Active region layout pattern 912a or 912b is similar to corresponding active region layout pattern 202b or 202a for when the first device type is a p-type finFET, and similar detailed description is therefore omitted. In some embodiments, active region layout pattern 912a or 912b is useable to manufacture a corresponding active region having n fins, where n is an integer.

The set of active region layout patterns 916 includes at least active region layout patterns 916a or 916b. Active region layout pattern 916a or 916b is similar to corresponding active region layout pattern 206a or 206b for when the first device type is a p-type finFET, and similar detailed description is therefore omitted. In some embodiments, active region layout pattern 916a or 916b is useable to manufacture a corresponding active region having n fins, where n is an integer.

The set of active region layout patterns 920 includes at least active region layout patterns 920a or 920b. Active region layout pattern 920a or 920b is similar to corresponding active region layout pattern 210a or 210b for when the first device type is a p-type finFET, and similar detailed description is therefore omitted. In some embodiments, active region layout pattern 920a or 920b is useable to manufacture a corresponding active region having n fins, where n is an integer.

In some embodiments, at least active region layout pattern 904a, 904b, . . . , 904g or 904j or at least active region layout pattern 908a, 908b, . . . , 908k can include n-type finFETs (e.g., the first device type) or p-type finFETs (e.g., the second device type) provided that the strength of the n-type fin FET devices in layout design 900B is greater than the strength of the p-type finFET devices.

In some embodiments, the set of active region layout patterns 912, 916 and 920 are placed at corresponding cell boundaries 901a, 901b and 901c in accordance with the design guidelines of operation 1102 of method 100 to offset the stronger device strength of the n-type devices.

FIG. 9C is a schematic view of a layout design 900C of sets of active region layout patterns 922, 904, 926, 908 and 930. In some embodiments, layout design 900C is a layout design after execution of operation 1102 of method 1100 (FIG. 11). For example, in some embodiments, layout design 900C illustrates the design guideline of operation 1102 of method 1100 when the strength of the n-type fin FET devices is equal to the strength of the p-type finFET devices.

In some embodiments, layout design 900C is a variation of layout design 200 of FIGS. 2A-2B, layout design 900A of FIG. 9A or layout design 900B of FIG. 9B.

For example, in some embodiments, layout design 900C is similar to layout design 200 when the active region layout patterns 202b, 206a and 210a are n-type finFETs, and active region layout patterns 202a, 206b and 210b are p-type finFETs, and the number of p-type finFETs manufactured by the set of active region layout patterns 202, 204, 206, 208 and 210 is equal to the number of n-type finFETs manufactured by the set of active region layout patterns 202, 204, 206, 208 and 210, and similar detailed description is therefore omitted.

Layout design 900C incorporates aspects of each of layout designs 900A and 900B. In comparison with layout designs 900A-900B, set of active region layout patterns 922, 926, 930 replaces corresponding set of active region layout patterns 902, 906, 910 of layout design 900A or corresponding set of active region layout patterns 912, 916, 920 of layout design 900B, and similar detailed description is therefore omitted.

The set of active region layout patterns 922 includes at least active region layout patterns 922a or 922b. Active region layout pattern 922a is similar to active region layout pattern 912a, and corresponds to a p-type finFET with n fins, and similar detailed description is therefore omitted. Active region layout pattern 922b is similar to active region layout pattern 902b, and corresponds to an n-type finFET with n fins, and similar detailed description is therefore omitted. In some embodiments, active region layout pattern 922a or 922b is useable to manufacture a corresponding active region having n fins, where n is an integer.

The set of active region layout patterns 926 includes at least active region layout patterns 926a or 926b. Active region layout pattern 926a is similar to active region layout pattern 906a, and corresponds to an n-type finFET with n fins, and similar detailed description is therefore omitted. Active region layout pattern 926b is similar to active region layout pattern 916b, and corresponds to a p-type finFET with n fins, and similar detailed description is therefore omitted. In some embodiments, active region layout pattern 926a or 926b is useable to manufacture a corresponding active region having n fins, where n is an integer.

The set of active region layout patterns 930 includes at least active region layout patterns 930a or 930b. Active region layout pattern 930a is similar to active region layout pattern 910a, and corresponds to an n-type finFET with n fins, and similar detailed description is therefore omitted. Active region layout pattern 930b is similar to active region layout pattern 920b, and corresponds to a p-type finFET with n fins, and similar detailed description is therefore omitted. In some embodiments, active region layout pattern 930a or 930b is useable to manufacture a corresponding active region having n fins, where n is an integer.

In some embodiments, at least active region layout pattern 904a, 904b, . . . , 904g or 904j or at least active region layout pattern 908a, 908b, . . . , 908k can include n-type finFETs (e.g., the first device type) or p-type finFETs (e.g., the second device type) provided that the strength of the n-type fin FET devices in layout design 900C is equal to the strength of the p-type finFET devices.

In some embodiments, the set of active region layout patterns 922, 926 and 930 are placed at corresponding cell boundaries 901a, 901b and 901c in accordance with the design guidelines of operation 1102 of method 100 to balance the device strength of the n-type devices and the p-type devices.

FIGS. 10A-10E are schematic views of layout designs 1000A-1000E of integrated circuits, in accordance with some embodiments. In some embodiments, layout designs 1000A-1000E are corresponding layout designs after execution of one or more operations of method 1100 of FIG. 11.

FIG. 10A is a schematic view of a layout design 1000A of a set of active region layout patterns 1002 and conductive feature layout pattern 1020.

The set of active region layout patterns 1002 includes at least active region layout patterns 1002a or 1002b. Active region layout pattern 1002a or 1002b are similar to corresponding active region layout pattern 206a or 206b, and similar detailed description is therefore omitted. In some embodiments, active region layout pattern 1002a or 1002b is useable to manufacture an active region having n fins, where n is an integer.

Conductive feature layout pattern 1020 is similar to conductive feature layout pattern 220c, and similar detailed description is therefore omitted. Distances d10 and d11 are similar to corresponding distance d3 and d4, and similar detailed description is therefore omitted.

Conductive feature layout pattern 1020 is between active region layout pattern 1002a and active region layout pattern 1002b.

In some embodiments, layout design 1000A is a layout design after execution of operation 1106 of method 1100 (FIG. 11). For example, in some embodiments, layout design 1000A illustrates the placement of conductive feature layout pattern 1020 between active region layout patterns with n fins (e.g., active region layout patterns 1002a and 1002b) in satisfying a design guideline of operation 1106. For example, in some embodiments, layout design 1000A illustrates the placement of conductive feature layout pattern 1020 between the set of active region layout patterns 1002 in satisfying a design guideline of operation 1106.

FIG. 10B is a schematic view of a layout design 1000B of a set of active regions 1004 and conductive feature layout pattern 1022.

The set of active region layout patterns 1004 includes at least active region layout patterns 1004a or 1004b. Active region layout pattern 1004a or 1004b are similar to corresponding active region layout pattern 508a or 508b or corresponding active region layout pattern 706a or 706b, and similar detailed description is therefore omitted. In some embodiments, active region layout pattern 1004a is useable to manufacture an active region having n fins, and active region layout pattern 1004b is useable to manufacture an active region having m fins, where n and m are integers.

Conductive feature layout pattern 1022 is similar to conductive feature layout pattern 220d in FIGS. 5A-5B or conductive feature layout pattern 220c in FIGS. 7A-7B, and similar detailed description is therefore omitted. Distances d10 and d11 are similar to corresponding distance d5 and d6 in FIGS. 5A-5B or distances d3 and d4 in FIGS. 7A-7B, and similar detailed description is therefore omitted.

Conductive feature layout pattern 1022 is between active region layout pattern 1004a and active region layout pattern 1004b.

In some embodiments, layout design 1000B is a layout design after execution of operation 1106 of method 1100 (FIG. 11). For example, in some embodiments, layout design 1000B illustrates the placement of conductive feature layout pattern 1022 between active region layout patterns with n fins (e.g., active region layout pattern 1004a) and active region layout patterns with m fins (e.g., active region layout pattern 1004b) in satisfying a design guideline of operation 1106. For example, in some embodiments, layout design 1000B illustrates the placement of conductive feature layout pattern 1022 between the set of active region layout patterns 1004 in satisfying a design guideline of operation 1106.

FIG. 10C is a schematic view of a layout design 1000C of a set of active regions 1006 and conductive feature layout pattern 1024.

The set of active region layout patterns 1006 includes at least active region layout patterns 1006a or 1006b. Active region layout pattern 1006a or 1006b are similar to corresponding active region layout pattern 506a or 506b or corresponding active region layout pattern 704a or 704b, and similar detailed description is therefore omitted. In some embodiments, active region layout pattern 1006a is useable to manufacture an active region having m fins, and active region layout pattern 1006b is useable to manufacture an active region having n fins, where n and m are integers.

Conductive feature layout pattern 1024 is similar to conductive feature layout pattern 520c in FIGS. 5A-5B or conductive feature layout pattern 220b in FIGS. 7A-7B, and similar detailed description is therefore omitted. Distances d10 and d11 are similar to corresponding distance d3 and d4 in FIGS. 5A-5B or distances d1 and d2 in FIGS. 7A-7B, and similar detailed description is therefore omitted.

Conductive feature layout pattern 1024 is between active region layout pattern 1006a and active region layout pattern 1006b.

In some embodiments, layout design 1000C is a layout design after execution of operation 1106 of method 1100 (FIG. 11). For example, in some embodiments, layout design 1000C illustrates the placement of conductive feature layout pattern 1024 between active region layout patterns with m fins (e.g., active region layout pattern 1006a) and active region layout patterns with n fins (e.g., active region layout pattern 1006b) in satisfying a design guideline of operation 1106. For example, in some embodiments, layout design 1000C illustrates the placement of conductive feature layout pattern 1024 between the set of active region layout patterns 1006 in satisfying a design guideline of operation 1106.

FIG. 10D is a schematic view of a layout design 1000D of a set of active regions 1008 and conductive feature layout pattern 1026.

The set of active region layout patterns 1008 includes at least active region layout patterns 1008a or 1008b. Active region layout pattern 1008a or 1008b are similar to corresponding active region layout pattern 204a or 204b, and similar detailed description is therefore omitted. In some embodiments, active region layout pattern 1008a or 1008b is useable to manufacture an active region having m fins, where m is an integer. In some embodiments, the set of active region layout patterns 1008 is similar to other set of active region layout patterns in the present disclosure having m fins, and similar detailed description is therefore omitted.

Conductive feature layout pattern 1026 is similar to conductive feature layout pattern 220b, and similar detailed description is therefore omitted. Distances d10 and d11 are similar to corresponding distance d1 and d2, and similar detailed description is therefore omitted.

Conductive feature layout pattern 1026 is between active region layout pattern 1008a and active region layout pattern 1008b.

In some embodiments, layout design 1000D is a layout design after execution of operation 1106 of method 1100 (FIG. 11). For example, in some embodiments, layout design 1000D illustrates the placement of conductive feature layout pattern 1026 between active region layout patterns with m fins (e.g., active region layout patterns 1008a and 1008b) in satisfying a design guideline of operation 1106. For example, in some embodiments, layout design 1000D illustrates the placement of conductive feature layout pattern 1026 between the set of active region layout patterns 1008 in satisfying a design guideline of operation 1106.

In some embodiments, by placing conductive feature layout pattern 1020, 1022, 1024 or 1026 between the corresponding set of active region layout patterns 1002, 1004, 1006 or 1008, a difference between distance d10 and d11 is reduced, thereby causing a distance travelled by corresponding current I1, I2, I3 or I4 to the corresponding set of active region layout patterns 1002, 1004, 1006 or 1008 to be reduced, resulting in a more balanced IR profile of the corresponding set of active region layout patterns 1002, 1004, 1006 or 1008 and the corresponding conductive feature layout pattern 1020, 1022, 1024 or 1026, thereby yielding better performance than other approaches with unbalanced IR profiles or drops.

Figure 10E:
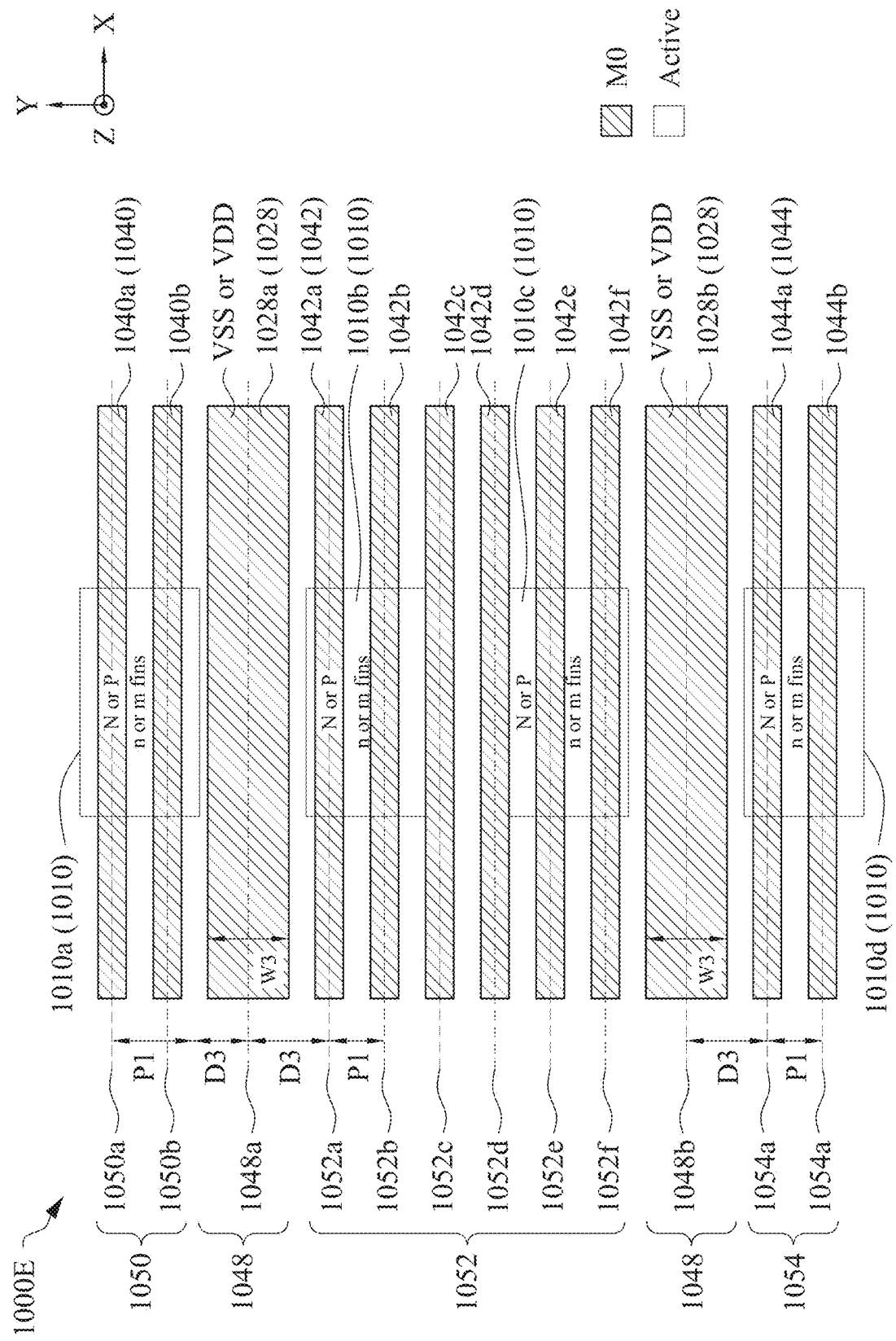

FIG. 10E is a schematic view of a layout design 1000E after execution of operation 1108 of method 1100 (FIG. 11).

Layout design 1000E includes set of gridlines 1048, 1050, 1052 and 1054, a set of active regions 1010, a set of conductive feature layout patterns 1028, and sets of conductive feature layout patterns 1040, 1042 and 1044.

The set of active region layout patterns 1010 includes at least active region layout patterns 1010a, 1010b, 1010c or 1010d. Active region layout pattern 1010a, 1010b, 1010c or 1010d are similar to corresponding active region layout patterns 204a, 204b, 206a or 206b, and similar detailed description is therefore omitted. In some embodiments, each of active region layout patterns 1010a, 1010b, 1010c or 1010d is useable to manufacture an active region having n or m fins, where n and m are different integers.

The set of conductive feature layout patterns 1028 includes at least conductive feature region layout patterns 1028a or 1028b. Conductive feature layout pattern 1028a or 1028b is similar to corresponding conductive feature layout pattern 220b or 220c, and similar detailed description is therefore omitted. Each conductive feature layout pattern of the set of conductive feature layout patterns 1028 has a corresponding width W3 in the second direction Y. In some embodiments, width W3 is different from width W1. In some embodiments, width W3 is equal to 2*W1.

The set of conductive feature layout patterns 1040 includes at least conductive feature region layout patterns 1040a or 1040b. Conductive feature layout pattern 1040a or 1040b is similar to corresponding conductive feature layout pattern 230b or 230c, and similar detailed description is therefore omitted.

The set of conductive feature layout patterns 1042 includes at least conductive feature region layout patterns 1042a, 1042b, 1042c, 1042d, 1042e or 1042f. Conductive feature layout pattern 1042a, 1042b, 1042c, 1042d, 1042e or 1042f is similar to corresponding conductive feature layout pattern 230d, 230e, 230f, 232a, 232b or 232c, and similar detailed description is therefore omitted.

The set of conductive feature layout patterns 1044 includes at least conductive feature region layout patterns 1044a or 1044b. Conductive feature layout pattern 1044a or 1044b is similar to corresponding conductive feature layout pattern 232d or 232e, and similar detailed description is therefore omitted.

Each of the set of gridlines 1048, 1050, 1052 and 1054 extends in the first direction X.

The set of gridlines 1048 includes at least gridline 1048a or 1048b. Gridlines 1048a and 1048b are separated from each other in the second direction Y by a pitch (not labelled). In some embodiments, each gridline 1048a or 1048b defines a region where corresponding conductive feature layout pattern 1028a or 1028b is positioned.

The set of gridlines 1050 includes at least gridline 1050a or 1050b. Gridlines 1050a and 1050b are separated from each other in the second direction Y by a pitch P1. In some embodiments, each gridline 1050a or 1050b defines a region where corresponding conductive feature layout pattern 1040a or 1040b is positioned.

The set of gridlines 1052 includes at least gridline 1052a, 1052b, 1052c, 1052d, 1052e or 1052f. Each gridline 1052a, 1052b, 1052c, 1052d, 1052e or 1052f is separated from an adjacent gridline 1052a, 1052b, 1052c, 1052d, 1052e or 1052f in the second direction Y by pitch P1. In some embodiments, each gridline 1052a, 1052b, 1052c, 1052d, 1052e or 1052f defines a region where corresponding conductive feature layout pattern 1042a, 1042b, 1042c, 1042d, 1042e or 1042f is positioned.

The set of gridlines 1054 includes at least gridline 1054a or 1054b. Gridlines 1054a and 1054b are separated from each other in the second direction Y by pitch P1. In some embodiments, each gridline 1054a or 1054b defines a region where corresponding conductive feature layout pattern 1044a or 1044b is positioned.

In some embodiments, gridline 1048a is separated from each of gridlines 1050b and 1052a in the second direction Y by a distance D3. In some embodiments, gridline 1048b is separated from each of gridlines 1052f and 1054a in the second direction Y by distance D3. In some embodiments, each of the set of gridlines 1048, 1050, 1052 or 1054 is also referred to as a corresponding set of routing M0 tracks. In some embodiments, pitch P1 is equal to distance D3. In some embodiments, pitch P1 is different from distance D3.

In some embodiments, layout design 1000E is a layout design after execution of operation 1108 of method 1100 (FIG. 11). For example, in some embodiments, layout design 1000E illustrates the placement of the set of conductive feature layout patterns 1040, 1042 and 1044 in satisfying a design guideline of operation 1108. For example, in some embodiments, layout design 1000E illustrates that the placement of each conductive feature layout pattern of the set of conductive feature layout patterns 1042 is evenly distributed between the set of conductive feature layout patterns 1028 in satisfying a design guideline of operation 1108. Similarly, for example, in some embodiments, layout design 1000E illustrates that the placement of the set of conductive feature layout patterns 1040 or 1044 is evenly distributed between a conductive feature layout pattern of the set of conductive feature layout patterns 1028 and a conductive feature layout pattern of another set of conductive feature layout patterns (not shown) in satisfying a design guideline of operation 1108.

FIG. 11 is a functional flow chart of at least a portion of an integrated circuit design and manufacturing flow 1100, in accordance with some embodiments.

Figure 12A:
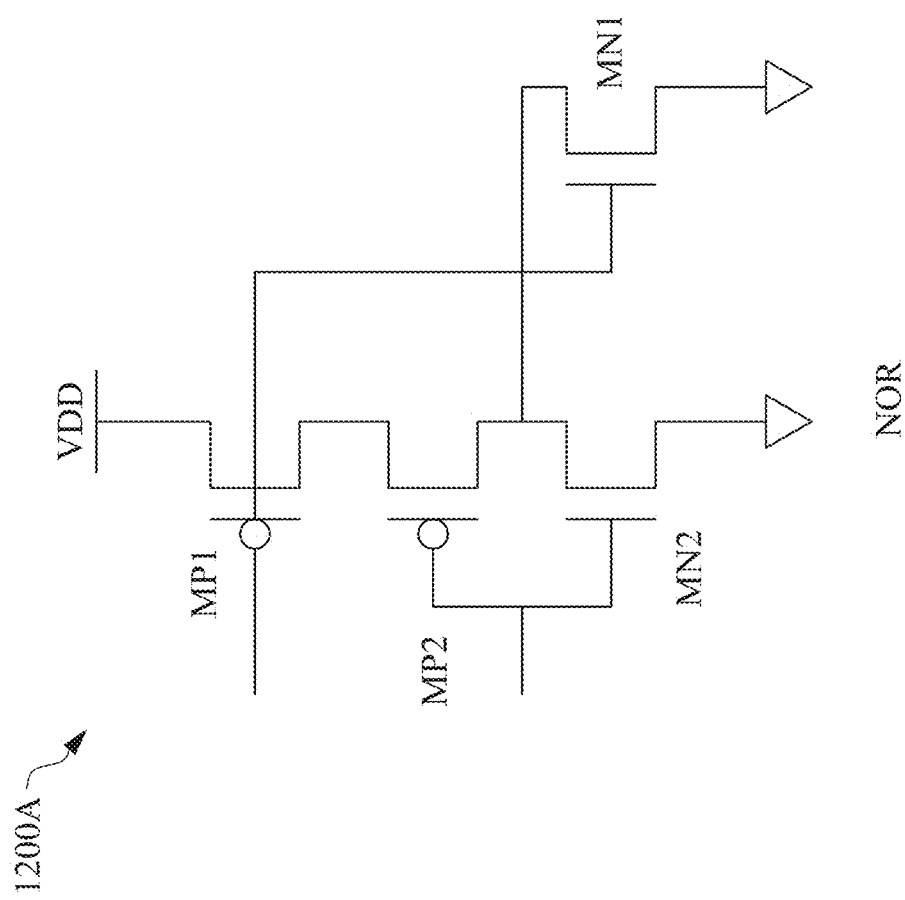
FIG. 12A is a circuit diagram of an integrated circuit, in accordance with some embodiments.

It is understood that additional operations may be performed before, during, and/or after the method 1100 depicted in FIG. 11, and that some other processes may only be briefly described herein. In some embodiments, the method 1100 is usable to at least generate or place one or more layout patterns of layout design 100 (FIG. 1), 200 (FIGS. 2A-2B), 500 (FIGS. 5A-5B), 700 (FIGS. 7A-7B), 900A-900C (FIGS. 9A-9C), 1000A-1000E (FIGS. 10A-10E), or 1200B (FIG. 12B) of an integrated circuit, such as integrated circuit 300 (FIGS. 3A-3B), 600 (FIGS. 6A-6B), 800 (FIGS. 8A-8B) or 1200A (FIG. 12A). In some embodiments, the method 1100 is usable to manufacture an integrated circuit, such as integrated circuit 300 (FIGS. 3A-3B), integrated circuit 600 (FIGS. 6A-6B), integrated circuit 800 (FIGS. 8A-8B) or integrated circuit 1200 (FIG. 12A).

In operation 1102 of method 1100, a set of active region layout patterns is generated or placed on a first level of a layout design. In some embodiments, the layout design of method 1100 includes at least layout design 100, 102a, 102b, 104a, 104b, 200, 500, 700, 900A-900C, 1000A-1000E or 1200B. In some embodiments, the first level of method 1100 corresponds to the OD level. In some embodiments, the first level of method 1100 corresponds to the first level described in the specification.

In some embodiments, the set of active region layout patterns of method 1100 includes at least one or more layout patterns of at least the set of active region layout patterns 202, 204, 206, 208, 210, 504, 506, 508, 704, 706, 902, 904, 906, 908, 910, 912, 916, 920, 922, 926, 930, 1002, 1004, 1006, 1008 or 1010.

In some embodiments, the set of active region layout patterns of method 1100 correspond to fabricating a set of active regions of the integrated circuit. In some embodiments, the set of active regions of method 1100 includes at least one or more regions of the set of active regions 302, 304, 306, 308, 310, 402, 412, 604, 606, 608, 804 or 806.

In some embodiments, operation 1102 includes generating or placing the set of active region layout patterns according to a first set of guidelines or design rules.

The first set of design guidelines of operation 1102 is described with respect to FIGS. 9A-9C, but is applicable to each of the layout designs of the present disclosure.

In some embodiments, the first set of design guidelines of method 1100 includes placing the set of active region layout patterns of the first device type and the second device type thereby reducing the device strength mismatch between the n-type finFETs and the p-type finFETs.

In some embodiments, the first set of design guidelines of operation 1102 includes placing the set of active region layout patterns of the first device type at cell boundaries 901a, 901b and 901c to offset the stronger device strength of the second device type. For example, in some embodiments, if the first device type is n-type finFETs and the second device type is p-type finFETs, and the device strength of the n-type finFETs in the layout design is less than the device strength of the p-type finFETs, then the design guideline of operation 1102 includes placing the set of active region layout patterns 902, 906 and 908 of the n-type finFETs at corresponding cell boundaries 901a, 901b and 901c.

For example, in some embodiments, if the first device type is p-type finFETs and the second device type is n-type finFETs, and the device strength of the p-type finFETs in the layout design is less than the device strength of the n-type finFETs, then the design guideline of operation 1102 includes placing the set of active region layout patterns 912, 916 and 918 of the p-type finFETs at corresponding cell boundaries 901a, 901b and 901c.

In some embodiments, the first set of design guidelines of operation 1102 includes placing the set of active region layout patterns of the first device type and the second device type at cell boundaries 901a, 901b and 901c to balance the device strength of the first device type and the second device type. For example, in some embodiments, if the first device type is n-type finFETs and the second device type is p-type finFETs, and the device strength of the n-type finFETs in the layout design is equal to the device strength of the p-type finFETs, then the design guideline of operation 1102 includes placing n-type finFETs of active region layout patterns 922b, 926a and 930a, and placing p-type finFETs of active region layout patterns 922a, 92ba and 930b at corresponding cell boundaries 901a, 901b and 901c.

In some embodiments, if a number of active region layout patterns in the set of active region layout patterns 904 and 908 of the first device type is greater than a number of active region layout patterns in the set of active region layout patterns 902, 906 and 910 of the second device type, then the first set of design guidelines of operation 1102 includes placing each of the set of active region layout patterns 902, 904 and 906 at corresponding cell boundary 901a, 901b or 901c.

In some embodiments, if a number of fins in active region layout patterns in the set of active region layout patterns 904 and 908 of the first device type is greater than a number of fins in active region layout patterns in the set of active region layout patterns 902, 906 and 910 of the second device type, then each of the set of active region layout patterns 902, 906 and 910 are placed at corresponding cell boundary 901a, 901b or 901c.

In operation 1104 of method 1100, a set of gridlines is generated or placed on the layout design. In some embodiments, the set of gridlines of method 1100 includes at least one or more gridlines of at least the set of gridlines 1048, 1050, 1052 or 1054. In some embodiments, the inclusion of one or more elements from the gridlines set of gridlines of method 1100 corresponds to including further sets and/or sub-sets of the set of gridlines.

In operation 1106 of method 1100, a first set of conductive feature layout patterns is generated or placed on the layout design on a second level of the layout design. In some embodiments, the second level is different from the first level. In some embodiments, the second level of method 1100 corresponds to the M0 level. In some embodiments, the second level of method 1100 corresponds to the second level described in the specification.

In some embodiments, the first set of conductive feature layout patterns of method 1100 includes at least one or more layout patterns of at least the set of conductive feature layout patterns 220, 520, 1020, 1022, 1024, 1026 or 1028. In some embodiments, the inclusion of one or more elements from the first set of conductive feature layout patterns of method 1100 corresponds to including further sets and/or sub-sets of the first set of conductive feature layout patterns.

In some embodiments, the first set of conductive feature layout patterns of method 1100 corresponds to fabricating a first set of conductive structures of the integrated circuit. In some embodiments, the first set of conductive structures of method 1100 includes at least one or more conductive structures of the set of conductive structures 320 or 620. In some embodiments, the first set of conductive feature layout patterns of method 1100 is also referred to as a set of power rail layout patterns.

In some embodiments, operation 1106 includes generating or placing the first set of conductive feature layout patterns according to a second set of guidelines or design rules.

The second set of design guidelines of operation 1106 is described with respect to FIGS. 10A-10D, but is applicable to each of the layout designs of the present disclosure.

In some embodiments, the second set of design guidelines of method 1100 includes placing conductive feature layout patterns 1020, 1022, 1024 or 1026 between the set of active region layout patterns 1002, 1004, 1006 or 1008 reducing the difference between distance d10 and d11, thereby causing a distance travelled by corresponding current I1, I2, I3 or I4 to the corresponding set of active region layout patterns 1002, 1004, 1006 or 1008 to be reduced, which results in a more balanced IR profile of the corresponding set of active region layout patterns 1002, 1004, 1006 or 1008 and the corresponding conductive feature layout pattern 1020, 1022, 1024 or 1026, thereby yielding better performance than other approaches with unbalanced IR profiles or drops.

In operation 1108 of method 1100, a second set of conductive feature layout patterns is generated or placed on layout design on the second level.

In some embodiments, the second set of conductive feature layout patterns of method 1100 includes at least one or more layout patterns of at least the set of conductive feature layout patterns 230, 232, 1040, 1042 or 1044. In some embodiments, the inclusion of one or more elements from the second set of conductive feature layout patterns of method 1100 corresponds to including further sets and/or sub-sets of the second set of conductive feature layout patterns.

In some embodiments, the second set of conductive feature layout patterns of method 1100 corresponds to fabricating a second set of conductive structures of the integrated circuit. In some embodiments, the second set of conductive structures of method 1100 includes at least one or more conductive structures of the set of conductive structures 330 or 332. In some embodiments, the second set of conductive feature layout patterns of method 1100 is also referred to as a set of pin layout patterns.

In some embodiments, operation 1108 includes generating or placing the second set of conductive feature layout patterns according to a third set of guidelines or design rules.

The third set of design guidelines of operation 1108 is described with respect to FIG. 10E, but is applicable to each of the layout designs of the present disclosure. In some embodiments, the third set of design guidelines of method 1100 includes uniformly placing the set of conductive feature layout patterns 1042 between the set of conductive feature layout patterns 1028. In some embodiments, the third set of design guidelines of method 1100 includes uniformly placing the set of conductive feature layout patterns 1040 or 1044 between a conductive feature layout pattern of the set of conductive feature layout patterns 1028 and a conductive feature layout pattern of another set of conductive feature layout patterns (not shown).

In operation 1110 of method 1100, the integrated circuit is fabricated according to the layout design. In some embodiments, the integrated circuit of method 1100 is fabricated by system 1300 or IC manufacturing system 1400. In some embodiments, operation 1110 of method 1100 comprises manufacturing at least one mask based on the layout design, and manufacturing the integrated circuit based on the at least one mask.

In some embodiments, one or more of the operations of method 1100 is performed to generate or place a first layout pattern on the layout design of method 1100, and then one or more of the operations of method 1100 is repeated to generate or place additional layout patterns on the design of method 1100. In some embodiments, one or more of the operations of method 1100 is performed to generate or place a first layout design on the layout design of method 1100, and then one or more of the operations of method 1100 is repeated to generate or place additional layout designs on the design of method 1100.

Figure 13:
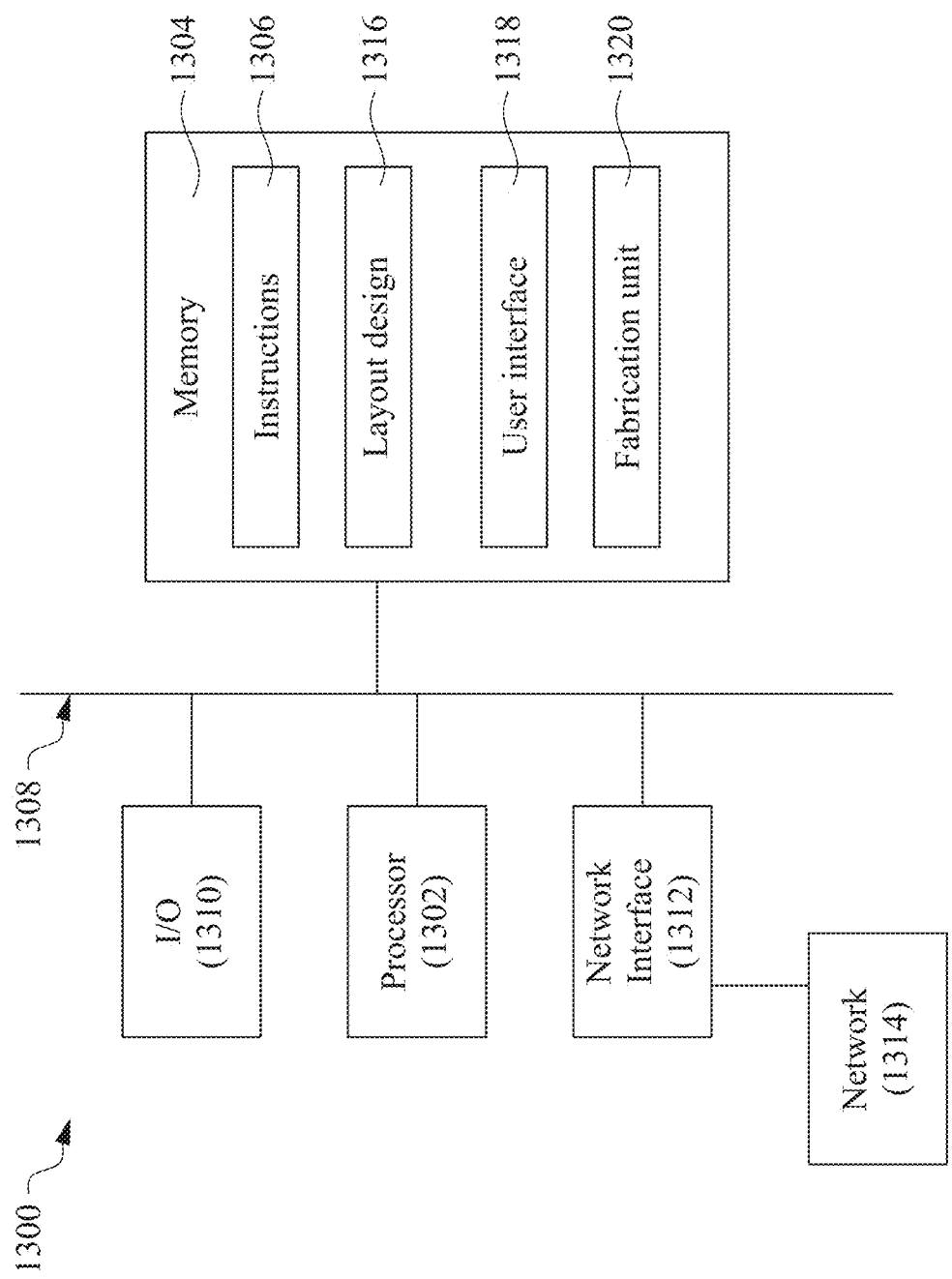
FIG. 13 is a schematic view of a system for designing an IC layout design and manufacturing an IC in accordance with some embodiments.

In some embodiments, at least one or more operations of method 1100 is performed by an EDA tool, such as system 1300 of FIG. 13. In some embodiments, at least one method(s), such as method 1100 discussed above, is performed in whole or in part by at least one EDA system, including system 1300. In some embodiments, an EDA system is usable as part of a design house of an IC manufacturing system 1400 of FIG. 14.

In some embodiments, one or more of the operations of method 1100 (e.g., 1102-1110) is not performed. One or more of the operations of method 1100 is performed by a processing device configured to execute instructions for manufacturing the integrated circuit of method 1100. In some embodiments, one or more operations of method 1100 is performed using a same processing device as that used in a different one or more operations of method 1100. In some embodiments, a different processing device is used to perform one or more operations of method 1100 from that used to perform a different one or more operations of method 1100.

FIG. 12A is a circuit diagram of an integrated circuit 1200, in accordance with some embodiments. In some embodiments, integrated circuit 1200 is a NOR gate circuit. A NOR gate circuit is used for illustration, other types of circuits including other configurations for NOR gate circuits are within the scope of the present disclosure.

Integrated circuit 1200 includes P-type metal oxide semiconductor (PMOS) transistors MP1 and MP2, and N-type metal oxide semiconductor (NMOS) transistors MN1 and MN2.

Each of a gate terminal of PMOS transistor MP1 and a gate terminal of NMOS transistor MN1 are configured as an input node (not labelled) and are coupled together. Each of a gate terminal of PMOS transistor MP2 and a gate terminal of NMOS transistor MN2 are configured as another input node (not labelled) and are coupled together.

A source terminal of PMOS transistor MP1 is coupled to the voltage supply VDD. A drain terminal of PMOS transistor MP1 is coupled to a source terminal of PMOS transistor MP2. Each of a drain terminal of PMOS transistor MP2, a drain terminal of NMOS transistor MN1 and a drain terminal of NMOS transistor MN2 are coupled together. A source terminal of NMOS transistor MN1 and a source terminal of NMOS transistor MN2 are each coupled to a reference voltage supply VSS.

Other circuits, other types of transistors, and/or quantities of transistors are within the scope of various embodiments.

Figure 12B:
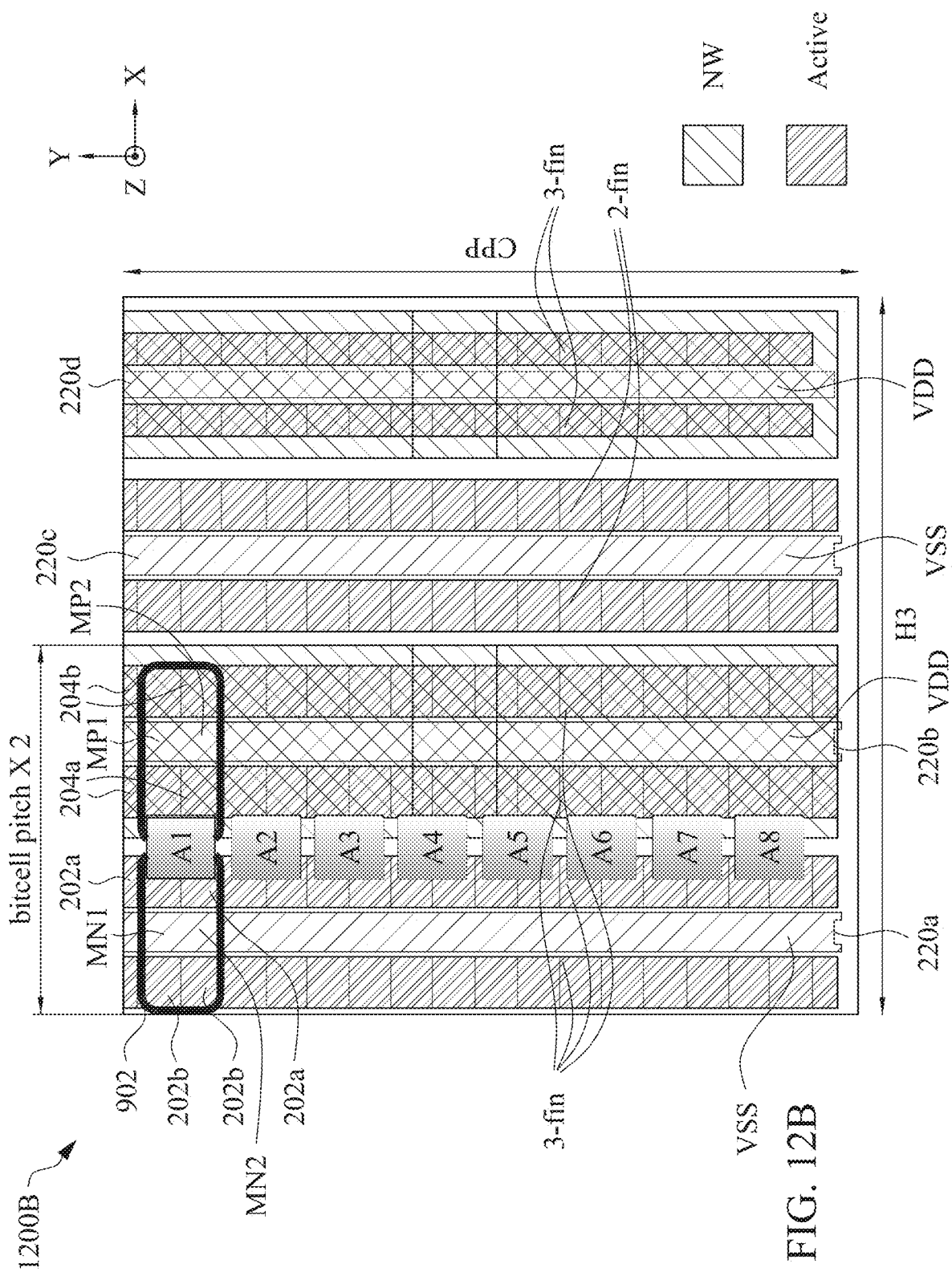
FIG. 12B is a circuit diagram of an integrated circuit, in accordance with some embodiments.

FIG. 12B is a circuit diagram of an integrated circuit 1200, in accordance with some embodiments.

Layout design 1200B is a layout diagram of integrated circuit 1200A. Layout design 1200B is usable to manufacture integrated circuit 1200A.

Layout design 1200B is an embodiment of layout designs 102a and 104a of FIG. 1 or layout designs 102b and 104b of FIG. 1. In some embodiments, layout design 1200B is an embodiment of at least layout design 200, 500, 700, 900A-900C or 1000A-1000E.

Layout design 1200B includes active region layout patterns 202a, 202b, 204a and 204b from FIGS. 2A-2B, and conductive feature layout patterns 220a, 220b, 220c, 220d from FIGS. 2A-2B.

A first row of active region layout patterns 202a and 202b correspond to NMOS transistor MN1, a second row of active region layout patterns 202a and 202b correspond to NMOS transistor MN2, the first row of active region layout patterns 204a and 204b correspond to PMOS transistor MP1, and the second row of active region layout patterns 204a and 204b correspond to PMOS transistor MP2.

In FIG. 12B, NMOS transistors MN1 and MN2 and PMOS transistors MP1 and MP2 are grouped together as element A1. Similarly, other NMOS transistors and PMOS transistors similar to element A1 are grouped together and labelled as elements A2-A8, and similar detailed description is therefore omitted.

FIG. 13 is a schematic view of a system 1300 for designing an IC layout design and manufacturing an IC circuit in accordance with some embodiments. In some embodiments, system 1300 generates or places one or more IC layout designs described herein. System 1300 includes a hardware processor 1302 and a non-transitory, computer readable storage medium 1304 (e.g., memory 1304) encoded with, i.e., storing, the computer program code 1306, i.e., a set of executable instructions 1306. Computer readable storage medium 1304 is configured for interfacing with manufacturing machines for producing the integrated circuit. The processor 1302 is electrically coupled to the computer readable storage medium 1304 via a bus 1308. The processor 1302 is also electrically coupled to an I/O interface 1310 by bus 1308. A network interface 1312 is also electrically connected to the processor 1302 via bus 1308. Network interface 1312 is connected to a network 1314, so that processor 1302 and computer readable storage medium 1304 are capable of connecting to external elements via network 1314. The processor 1302 is configured to execute the computer program code 1306 encoded in the computer readable storage medium 1304 in order to cause system 1300 to be usable for performing a portion or all of the operations as described in method 1100.

In some embodiments, the processor 1302 is a central processing unit (CPU), a multi-processor, a distributed processing system, an application specific integrated circuit (ASIC), and/or a suitable processing unit.

In some embodiments, the computer readable storage medium 1304 is an electronic, magnetic, optical, electromagnetic, infrared, and/or a semiconductor system (or apparatus or device). For example, the computer readable storage medium 1304 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1304 includes a compact disk-read only memory (CD-ROM), a compact disk-read/write (CD-R/W), and/or a digital video disc (DVD).

In some embodiments, the storage medium 1304 stores the computer program code 1306 configured to cause system 1300 to perform method 1100. In some embodiments, the storage medium 1304 also stores information needed for performing method 1100 as well as information generated during performing method 1100, such as layout design 1316, user interface 1318 and fabrication unit 1320, and/or a set of executable instructions to perform the operation of method 1100. In some embodiments, layout design 1316 comprises one or more of layout patterns of layout design 100, 200, 500, 700, 900A-900C, 1000A-1000E or 1200B.

In some embodiments, the storage medium 1304 stores instructions (e.g., computer program code 1306) for interfacing with manufacturing machines. The instructions (e.g., computer program code 1306) enable processor 1302 to generate manufacturing instructions readable by the manufacturing machines to effectively implement method 1100 during a manufacturing process.

System 1300 includes I/O interface 1310. I/O interface 1310 is coupled to external circuitry. In some embodiments, I/O interface 1310 includes a keyboard, keypad, mouse, trackball, trackpad, and/or cursor direction keys for communicating information and commands to processor 1302.

System 1300 also includes network interface 1312 coupled to the processor 1302. Network interface 1312 allows system 1300 to communicate with network 1314, to which one or more other computer systems are connected. Network interface 1312 includes wireless network interfaces such as BLUETOOTH, WIFI, WIMAX, GPRS, or WCDMA; or wired network interface such as ETHERNET, USB, or IEEE-1394. In some embodiments, method 1100 is implemented in two or more systems 1300, and information such as layout design, and user interface are exchanged between different systems 1300 by network 1314.

System 1300 is configured to receive information related to a layout design through I/O interface 1310 or network interface 1312. The information is transferred to processor 1302 by bus 1308 to determine a layout design for producing integrated circuit 300, 400A-400B, 600, 800 or 1200A. The layout design is then stored in computer readable medium 1304 as layout design 1316. System 1300 is configured to receive information related to a user interface through I/O interface 1310 or network interface 1312. The information is stored in computer readable medium 1304 as user interface 1318. System 1300 is configured to receive information related to a fabrication unit through I/O interface 1310 or network interface 1312. The information is stored in computer readable medium 1304 as fabrication unit 1320. In some embodiments, the fabrication unit 1320 includes fabrication information utilized by system 1300. In some embodiments, the fabrication unit 1320 corresponds to mask fabrication 1434 of FIG. 14.

In some embodiments, method 1100 is implemented as a standalone software application for execution by a processor. In some embodiments, method 1100 is implemented as a software application that is a part of an additional software application. In some embodiments, method 1100 is implemented as a plug-in to a software application. In some embodiments, method 1100 is implemented as a software application that is a portion of an EDA tool. In some embodiments, method 1100 is implemented as a software application that is used by an EDA tool. In some embodiments, the EDA tool is used to generate a layout of the integrated circuit device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, method 1100 is implemented by a manufacturing device to manufacture an integrated circuit using a set of masks manufactured based on one or more layout designs generated by system 1300. In some embodiments, system 1300 a manufacturing device to manufacture an integrated circuit using a set of masks manufactured based on one or more layout designs of the present disclosure. In some embodiments, system 1300 of FIG. 13 generates layout designs of an integrated circuit that are smaller than other approaches. In some embodiments, system 1300 of FIG. 13 generates layout designs of integrated circuit structure that occupy less area and provide better routing resources than other approaches.

Figure 14:
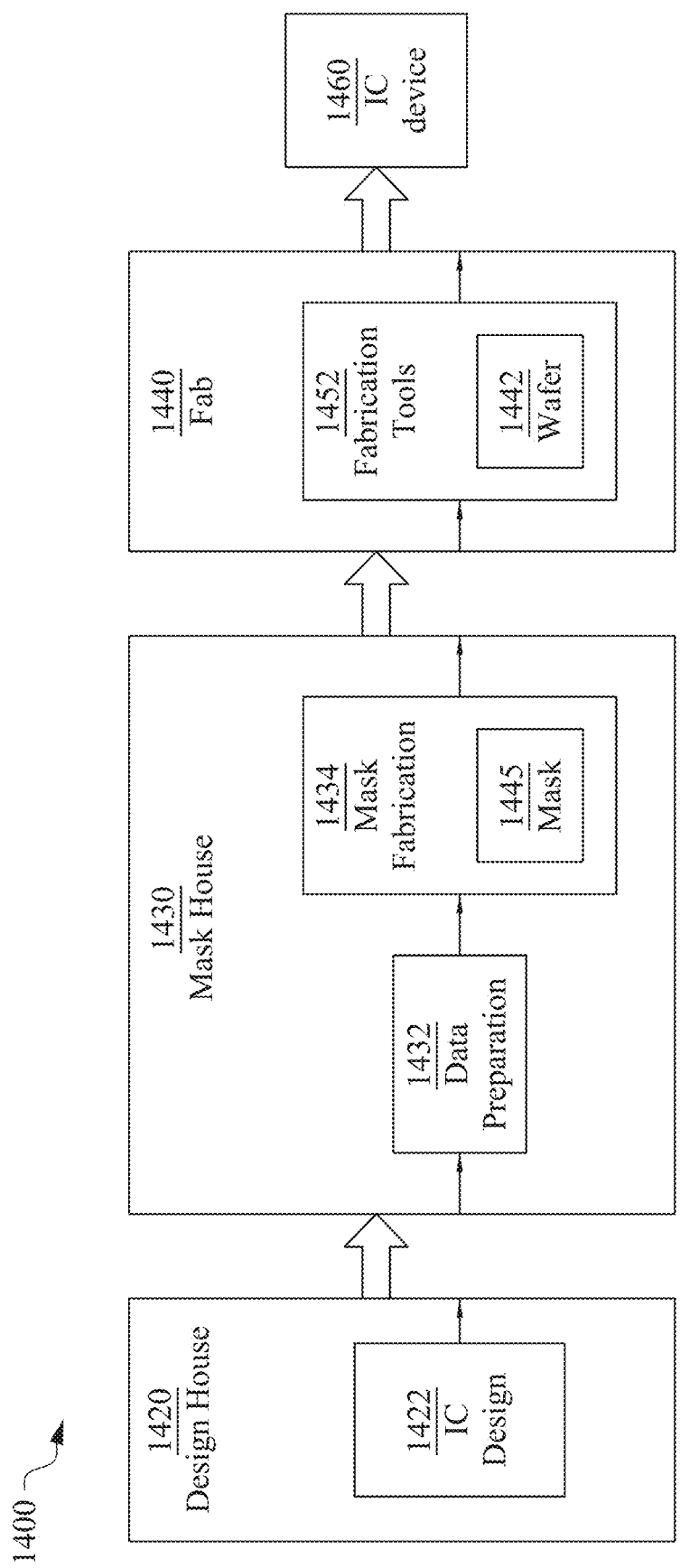
FIG. 14 is a block diagram of an integrated circuit (IC) manufacturing system, and an IC manufacturing flow associated therewith, in accordance with some embodiments.

FIG. 14 is a block diagram of an integrated circuit (IC) manufacturing system 1400, and an IC manufacturing flow associated therewith, in accordance with at least one embodiment of the present disclosure. In some embodiments, based on a layout diagram, at least one of (A) one or more semiconductor masks or (B) at least one component in a layer of a semiconductor integrated circuit is fabricated using manufacturing system 1400.

In FIG. 14, IC manufacturing system 1400 (hereinafter "system 1400") includes entities, such as a design house 1420, a mask house 1430, and an IC manufacturer/fabricator ("fab") 1440, that interact with one another in the design, development, and manufacturing cycles and/or services related to manufacturing an IC device 1460. The entities in system 1400 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, one or more of design house 1420, mask house 1430, and IC fab 1440 is owned by a single larger company. In some embodiments, one or more of design house 1420, mask house 1430, and IC fab 1440 coexist in a common facility and use common resources.

Design house (or design team) 1420 generates an IC design layout 1422. IC design layout 1422 includes various geometrical patterns designed for an IC device 1460. The geometrical patterns correspond to patterns of metal, oxide, or semiconductor layers that make up the various components of IC device 1460 to be fabricated. The various layers combine to form various IC features. For example, a portion of IC design layout 1422 includes various IC features, such as an active region, gate electrode, source electrode and drain electrode, metal lines or vias of an interlayer interconnection, and openings for bonding pads, to be formed in a semiconductor substrate (such as a silicon wafer) and various material layers disposed on the semiconductor substrate. Design house 1420 implements a proper design procedure to form IC design layout 1422. The design procedure includes one or more of logic design, physical design or place and route. IC design layout 1422 is presented in one or more data files having information of the geometrical patterns. For example, IC design layout 1422 can be expressed in a GDSII file format or DFII file format.

Mask house 1430 includes data preparation 1432 and mask fabrication 1434. Mask house 1430 uses IC design layout 1422 to manufacture one or more masks 1445 to be used for fabricating the various layers of IC device 1460 according to IC design layout 1422. Mask house 1430 performs mask data preparation 1432, where IC design layout 1422 is translated into a representative data file ("RDF"). Mask data preparation 1432 provides the RDF to mask fabrication 1434. Mask fabrication 1434 includes a mask writer. A mask writer converts the RDF to an image on a substrate, such as a mask (reticle) 1445 or a semiconductor wafer 1442. The design layout 1422 is manipulated by mask data preparation 1432 to comply with particular characteristics of the mask writer and/or requirements of IC fab 1440. In FIG. 14, mask data preparation 1432 and mask fabrication 1434 are illustrated as separate elements. In some embodiments, mask data preparation 1432 and mask fabrication 1434 can be collectively referred to as mask data preparation.

In some embodiments, mask data preparation 1432 includes optical proximity correction (OPC) which uses lithography enhancement techniques to compensate for image errors, such as those that can arise from diffraction, interference, other process effects and the like. OPC adjusts IC design layout 1422. In some embodiments, mask data preparation 1432 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1432 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1434, which may undo part of the modifications performed by OPC in order to meet mask creation rules.

In some embodiments, mask data preparation 1432 includes lithography process checking (LPC) that simulates processing that will be implemented by IC fab 1440 to fabricate IC device 1460. LPC simulates this processing based on IC design layout 1422 to create a simulated manufactured device, such as IC device 1460. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1422.

It should be understood that the above description of mask data preparation 1432 has been simplified for the purposes of clarity. In some embodiments, data preparation 1432 includes additional features such as a logic operation (LOP) to modify the IC design layout according to manufacturing rules. Additionally, the processes applied to IC design layout 1422 during data preparation 1432 may be executed in a variety of different orders.

After mask data preparation 1432 and during mask fabrication 1434, a mask 1445 or a group of masks 1445 are fabricated based on the modified IC design layout 1422. In some embodiments, mask fabrication 1434 includes performing one or more lithographic exposures based on IC design 1422. In some embodiments, an electron-beam (e-beam) or a mechanism of multiple e-beams is used to form a pattern on a mask (photomask or reticle) 1445 based on the modified IC design layout 1422. The mask 1445 can be formed in various technologies. In some embodiments, the mask 1445 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary version of mask 1445 includes a transparent substrate (e.g., fused quartz) and an opaque material (e.g., chromium) coated in the opaque regions of the binary mask. In another example, the mask 1445 is formed using a phase shift technology. In the phase shift mask (PSM) version of mask 1445, various features in the pattern formed on the mask are configured to have proper phase difference to enhance the resolution and imaging quality. In various examples, the phase shift mask can be attenuated PSM or alternating PSM. The mask(s) generated by mask fabrication 1434 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1440 is an IC fabrication entity that includes one or more manufacturing facilities for the fabrication of a variety of different IC products. In some embodiments, IC Fab 1440 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 1440 includes wafer fabrication tools 1452 (hereinafter "fabrication tools 1452") configured to execute various manufacturing operations on semiconductor wafer 1442 such that IC device 1460 is fabricated in accordance with the mask(s), e.g., mask 1445. In various embodiments, fabrication tools 1452 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1440 uses mask(s) 1445 fabricated by mask house 1430 to fabricate IC device 1460. Thus, IC fab 1440 at least indirectly uses IC design layout 1422 to fabricate IC device 1460. In some embodiments, a semiconductor wafer 1442 is fabricated by IC fab 1440 using mask(s) 1445 to form IC device 1460. In some embodiments, the IC fabrication includes performing one or more lithographic exposures based at least indirectly on IC design 1422. Semiconductor wafer 1442 includes a silicon substrate or other proper substrate having material layers formed thereon. Semiconductor wafer 1442 further includes one or more of various doped regions, dielectric features, multilevel interconnects, and the like (formed at subsequent manufacturing steps).

System 1400 is shown as having design house 1420, mask house 1430 or IC fab 1440 as separate components or entities. However, it is understood that one or more of design house 1420, mask house 1430 or IC fab 1440 are part of the same component or entity.

Details regarding an integrated circuit (IC) manufacturing system (e.g., system 1400 of FIG. 14), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to a method of forming an integrated circuit. In some embodiments, the method includes placing, by a processor, a first cell layout design of the integrated circuit on a layout design, and manufacturing the integrated circuit based on the layout design. In some embodiments, the first cell layout design has a first cell boundary and a second cell boundary extending in a first direction. In some embodiments, the second cell boundary is separated from the first cell boundary in a second direction different from the first direction. In some embodiments, placing the first cell layout design includes placing a first active region layout pattern according to a first set of guidelines adjacent to the first cell boundary. In some embodiments, the first active region layout pattern corresponds to transistors of a first type, extending in the first direction, and being in a first layout level, and having a first width in the first direction. In some embodiments, placing the first cell layout design further includes placing a second active region layout pattern according to the first set of guidelines adjacent to the second cell boundary. In some embodiments, the second active region layout pattern corresponds to transistors of the first type, extending in the first direction, being in the first layout level, and being separated from the first active region layout pattern in the second direction and having a second width different from the first width. In some embodiments, placing the first cell layout design further includes placing a first set of active region layout patterns according to the first set of guidelines between the first active region layout pattern and the second active region layout pattern. In some embodiments, the first set of active region layout patterns extends in the first direction and is in the first layout level. In some embodiments, for at least the first cell layout design, the first set of guidelines includes selecting transistors of a first type with a first driving strength and transistors of a second type with a second driving strength different from the first driving strength, the second type being different from the first type.

Another aspect of this description relates to a method of forming an integrated circuit. In some embodiments, the method includes generating, by a processor, a first cell layout design of the integrated circuit and manufacturing the integrated circuit based on at least the first cell layout design. In some embodiments, the first cell layout design has a first cell boundary and a second cell boundary extending in a first direction. In some embodiments, the second cell boundary is separated from the first cell boundary in a second direction different from the first direction. In some embodiments, generating the first cell layout design includes generating a first active region layout pattern corresponding to a first set of transistors of a first type, generating a second active region layout pattern corresponding to a second set of transistors of the first type, generating a third active region layout pattern corresponding to a third set of transistors of a second type different from the first type, generating a fourth active region layout pattern corresponding to a fourth set of transistors of the second type. In some embodiments, the first active region layout pattern extends in the first direction, is in a first layout level, and is adjacent to the first cell boundary. In some embodiments, the second active region layout pattern extends in the first direction, is in the first layout level, is adjacent to the first active region layout pattern, and is separated from the first active region layout pattern in the second direction. In some embodiments, the third active region layout pattern extends in the first direction, is in the first layout level, and is adjacent to the second active region layout pattern. In some embodiments, the fourth active region layout pattern extends in the first direction, is in the first layout level, is adjacent to the second cell boundary, and is separated from the third active region layout pattern in the second direction. In some embodiments, at least the first, second, third or fourth active region layout pattern satisfies a first set of guidelines. In some embodiments, the first set of guidelines including balancing a first driving strength of the first set of transistors and the second set of transistors with a second driving strength of the third set of transistors and the fourth set of transistors. In some embodiments, the second driving strength is equal to the first driving strength. In some embodiments, the first set of transistors include a first number of fins, the second set of transistors include a second number of fins, the third set of transistors include a third number of fins, and the fourth set of transistors include a fourth number of fins. In some embodiments, a sum of the third number of fins and the fourth number of fins is equal to a sum of the first number of fins and the second number of fins.

Yet another aspect of this description relates to an integrated circuit. In some embodiments, the integrated circuit includes a first active region of the first set of transistors of a first type, the second active region of the second set of transistors of the first type, the third active region of a third set of transistors of the first type, a fourth active region of a fourth set of transistors of the first type, a fifth active region of a fifth set of transistors of a second type, and a sixth active region of a sixth set of transistors of the second type. In some embodiments, the second type is different from the first type. In some embodiments, the first active region extends in a first direction, is in a first level, is adjacent to a first boundary and has a first width in a second direction different from the first direction. In some embodiments, the second active region extends in the first direction, is in the first level, is adjacent to the first boundary, and is separated from the first active region in the second direction, and has and has the first width in the second direction. In some embodiments, the third active region extends in the first direction, is in the first level, and is adjacent to a second boundary, and has a second width different from the first width in the second direction. In some embodiments, the fourth active region extends in the first direction, is in the first level, is adjacent to the second boundary, and is separated from the third active region in the second direction, and has the second width. In some embodiments, the fifth active region extends in the first direction, is in the first level, is between the second active region and the third active region, and has the first width. In some embodiments, the sixth active region extends in the first direction, is in the first level, and is between the second active region and the third active region. In some embodiments, a sum of a first driving strength of the first set of transistors, the second set of transistors, the third set of transistors and the fourth set of transistors is less than a sum of a second driving strength of the fifth set of transistors and the sixth set of transistors, the second driving strength is different from the first driving strength.

A number of embodiments have been described. It will nevertheless be understood that various modifications may be made without departing from the spirit and scope of the disclosure. For example, various transistors being shown as a particular dopant type (e.g., N-type or P-type Metal Oxide Semiconductor (NMOS or PMOS)) are for illustration purposes. Embodiments of the disclosure are not limited to a particular type. Selecting different dopant types for a particular transistor is within the scope of various embodiments. The low or high logical value of various signals used in the above description is also for illustration. Various embodiments are not limited to a particular logical value when a signal is activated and/or deactivated. Selecting different logical values is within the scope of various embodiments. In various embodiments, a transistor functions as a switch. A switching circuit used in place of a transistor is within the scope of various embodiments. In various embodiments, a source of a transistor can be configured as a drain, and a drain can be configured as a source. As such, the term source and drain are used interchangeably. Various signals are generated by corresponding circuits, but, for simplicity, the circuits are not shown.

Various figures show capacitive circuits using discrete capacitors for illustration. Equivalent circuitry may be used. For example, a capacitive device, circuitry or network (e.g., a combination of capacitors, capacitive elements, devices, circuitry, or the like) can be used in place of the discrete capacitor. The above illustrations include exemplary operations or steps, but the steps are not necessarily performed in the order shown. Steps may be added, replaced, changed order, and/or eliminated as appropriate, in accordance with the spirit and scope of disclosed embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated circuit (IC), the method comprising:
    placing, by a processor, a first cell layout design of the integrated circuit on a layout design, the first cell layout design having a first cell boundary and a second cell boundary extending in a first direction, the second cell boundary being separated from the first cell boundary in a second direction different from the first direction, wherein placing the first cell layout design comprises:
        placing a first active region layout pattern according to a first set of guidelines adjacent to the first cell boundary, the first active region layout pattern corresponding to transistors of a first type, extending in the first direction, and being in a first layout level, and having a first width in the first direction;
        placing a second active region layout pattern according to the first set of guidelines adjacent to the second cell boundary, the second active region layout pattern corresponding to transistors of the first type, extending in the first direction, being in the first layout level, and being separated from the first active region layout pattern in the second direction and having a second width different from the first width; and
        placing a first set of active region layout patterns according to the first set of guidelines between the first active region layout pattern and the second active region layout pattern, the first set of active region layout patterns corresponding to transistors of a second type different from the first type, and extending in the first direction and being in the first layout level,
    wherein, for at least the first cell layout design, the first set of guidelines includes selecting transistors of the first type with a first driving strength and selecting transistors of the second type with a second driving strength different from the first driving strength; and
    manufacturing the integrated circuit based on the layout design.

2. The method of claim 1, wherein each layout pattern of the first set of active region layout patterns has the first width.

3. The method of claim 2, wherein
the transistors of the first type include:
    a first number of fins of the first type; and
    a second number of fins of the first type,
the transistors of the second type include
    a third number of fins of the second type.

4. The method of claim 3, wherein the third number of fins of the second type is greater than a sum of the first number of fins of the first type and the second number of fins of the first type.

5. The method of claim 1, further comprising:
    placing a third active region layout pattern according to the first set of guidelines adjacent to the first cell boundary, the third active region layout pattern corresponding to the transistors of the first type, extending in the first direction, being in the first layout level, being separated from the first active region layout pattern in the second direction, and having the first width; and
    placing a fourth active region layout pattern according to the first set of guidelines adjacent to the second cell boundary, the fourth active region layout pattern corresponding to transistors of the first type, extending in the first direction, being in the first layout level, and being separated from the second active region layout pattern in the second direction, and having the second width.

6. The method of claim 5, further comprising:
    placing a first power rail layout pattern according to a second set of guidelines between the first active region layout pattern and the third active region layout pattern, the first power rail layout pattern extending in the first direction, having a third width in the second direction, and being in a second layout level different from the first layout level, the third width being different from the first width and the second width; and
    placing a second power rail layout pattern according to the second set of guidelines between the second active region layout pattern and the fourth active region layout pattern, the second power rail layout pattern extending in the first direction, having the third width in the second direction, and being in the second layout level, wherein the second set of guidelines includes:
        balancing a first design voltage drop across the first and third active region layout patterns with a second design voltage drop across the first power rail layout pattern; and
        balancing a third design voltage drop across the second and fourth active region layout patterns with a fourth design voltage drop across the second power rail layout pattern.

7. The method of claim 6, wherein
the balancing the first design voltage drop across the first and third active region layout patterns with the second design voltage drop across the first power rail layout pattern includes:
    placing a midpoint of the first power rail layout pattern in the first direction to be aligned in the first direction with a midpoint between the first and third active region layout patterns in the first direction; and
the balancing the third design voltage drop across the second and fourth active region layout patterns with the fourth design voltage drop across the second power rail layout pattern includes:
    placing a midpoint of the second power rail layout pattern in the first direction to be aligned in the first direction with a midpoint between the second and fourth active region layout patterns in the first direction.

8. The method of claim 6, further comprising:
placing a first set of conductive feature layout patterns according to a third set of guidelines between the first power rail layout pattern and the second power rail layout pattern, the first set of conductive feature layout patterns overlapping a first set of gridlines extending in the first direction, a center of each conductive feature layout pattern of the first set of conductive feature layout patterns is aligned with a corresponding gridline of the first set of gridlines; and
each gridline of the first set of gridlines being separated from an adjacent grid line of the first set of gridlines by a first pitch in the second direction.

9. A method of forming an integrated circuit (IC), the method comprising:
generating, by a processor, a first cell layout design of the integrated circuit, the first cell layout design having a first cell boundary and a second cell boundary extending in a first direction, the second cell boundary being separated from the first cell boundary in a second direction different from the first direction, wherein generating the first cell layout design comprises:
generating a first active region layout pattern corresponding to a first set of transistors of a first type, the first active region layout pattern extending in the first direction, being in a first layout level, and being adjacent to the first cell boundary;
generating a second active region layout pattern corresponding to a second set of transistors of the first type, the second active region layout pattern extending in the first direction, being in the first layout level, being adjacent to the first active region layout pattern, and being separated from the first active region layout pattern in the second direction;
generating a third active region layout pattern corresponding to a third set of transistors of a second type different from the first type, the third active region layout pattern extending in the first direction, being in the first layout level, and being adjacent to the second active region layout pattern;
generating a fourth active region layout pattern corresponding to a fourth set of transistors of the second type, the fourth active region layout pattern extending in the first direction, being in the first layout level, being adjacent to the second cell boundary, and being separated from the third active region layout pattern in the second direction;
wherein at least the first, second, third or fourth active region layout pattern satisfies a first set of guidelines, the first set of guidelines including balancing a first driving strength of the first set of transistors and the second set of transistors with a second driving strength of the third set of transistors and the fourth set of transistors, the second driving strength being equal to the first driving strength; and
manufacturing the integrated circuit based on at least the first cell layout design.

10. The method of claim 9, wherein
the first set of transistors include a first number of fins;
the second set of transistors include a second number of fins;
the third set of transistors include a third number of fins; and
the fourth set of transistors include a fourth number of fins.

11. The method of claim 10, wherein a sum of the third number of fins and the fourth number of fins is equal to a sum of the first number of fins and the second number of fins.

12. The method of claim 9, further comprising:
generating a fifth active region layout pattern corresponding to a fifth set of transistors of the second type, the fifth active region layout pattern extending in the first direction, being in the first layout level, and being adjacent to the first active region layout pattern and the first cell boundary; and
generating a sixth active region layout pattern corresponding to a sixth set of transistors of the second type, the sixth active region layout pattern extending in the first direction, being in the first layout level, and being adjacent to the fifth active region layout pattern, and being separated from the fifth active region layout pattern in the second direction.

13. The method of claim 12, wherein
the first set of transistors include a first number of fins;
the second set of transistors include a second number of fins;
the third set of transistors include a third number of fins;
the fourth set of transistors include a fourth number of fins;
the fifth set of transistors include a fifth number of fins; and
the sixth set of transistors include a sixth number of fins.

14. The method of claim 12, wherein
at least the first active region layout pattern, the fourth active region layout pattern, the fifth active region layout pattern or the sixth active region layout pattern has a first width; and
at least the second active region layout pattern or the third active region layout pattern has a second width different from the first width.

15. The method of claim 9, further comprising:
generating a second cell layout design of the integrated circuit, the second cell layout design having a third cell boundary and a fourth cell boundary extending in the first direction, the fourth cell boundary being separated from the third cell boundary in the second direction, the third cell boundary corresponding to the second cell boundary, wherein generating the second cell layout design comprises:
generating a fifth active region layout pattern corresponding to a fifth set of transistors of the first type, the fifth active region layout pattern extending in the first direction, being in the first layout level, and being adjacent to the third cell boundary;
generating a sixth active region layout pattern corresponding to a sixth set of transistors of the first type, the sixth active region layout pattern extending in the first direction, being in the first layout level, being adjacent to the fifth active region layout pattern, and being separated from the fifth active region layout pattern in the second direction;
generating a seventh active region layout pattern corresponding to a seventh set of transistors of the second type, the seventh active region layout pattern extending in the first direction, being in the first layout level, and being adjacent to the sixth active region layout pattern; and
generating an eighth active region layout pattern corresponding to an eighth set of transistors of the second type, the eighth active region layout pattern extending in the first direction, being in the first layout level, being adjacent to the fourth cell boundary, and being separated from the seventh active region layout pattern in the second direction;

wherein at least the fifth active region layout pattern, the sixth active region layout pattern, the seventh active region layout pattern or the eighth active region layout pattern further satisfies the first set of guidelines, the first set of guidelines further including balancing a third driving strength of the fifth set of transistors and the sixth set of transistors with a fourth driving strength of the seventh set of transistors and the eighth set of transistors, the third driving strength being equal to the fourth driving strength.

16. The method of claim 15, further comprising:

placing a first power rail layout pattern according to a second set of guidelines between the first active region layout pattern and the second active region layout pattern, the first power rail layout pattern extending in the first direction, having a first width in the second direction, and being in a second layout level different from the first layout level;

placing a second power rail layout pattern according to the second set of guidelines between the third active region layout pattern and the fourth active region layout pattern, the second power rail layout pattern extending in the first direction, having the first width in the second direction, and being in the second layout level;

placing a third power rail layout pattern according to the second set of guidelines between the fifth active region layout pattern and the sixth active region layout pattern, the third power rail layout pattern extending in the first direction, having the first width in the second direction, and being in the second layout level; and placing a fourth power rail layout pattern according to the second set of guidelines between the seventh active region layout pattern and the eighth active region layout pattern, the fourth power rail layout pattern extending in the first direction, having the first width in the second direction, and being in the second layout level.

17. A method of forming an integrated circuit (IC), the method comprising:

generating, by a processor, a first cell layout design of the integrated circuit, the first cell layout design having a first cell boundary and a second cell boundary extending in a first direction, the second cell boundary being separated from the first cell boundary in a second direction different from the first direction, wherein generating the first cell layout design comprises:

placing a first active region layout pattern according to a first set of guidelines adjacent to the first cell boundary, the first active region layout pattern corresponding to a first set of transistors of a first type, extending in the first direction, and being in a first layout level, and having a first width in the first direction;

placing a second active region layout pattern according to the first set of guidelines adjacent to the second cell boundary, the second active region layout pattern corresponding to a second set of transistors of the first type, extending in the first direction, being in the first layout level, and being separated from the first active region layout pattern in the second direction and having a second width different from the first width; and placing a first set of active region layout patterns according to the first set of guidelines between the first active region layout pattern and the second active region layout pattern, the first set of active region layout patterns corresponding to transistors of a second type different from the first type, and extending in the first direction and being in the first layout level, wherein, for at least the first cell layout design, the first set of guidelines includes selecting the first set and second set of transistors of the first type with a first driving strength and selecting the transistors of the second type with a second driving strength different from the first driving strength; and manufacturing the integrated circuit based on at least the first cell layout design.

18. The method of claim 17, wherein placing the first set of active region layout patterns according to the first set of guidelines comprises:

placing a third active region layout pattern according to the first set of guidelines, the third active region layout pattern corresponding to the transistors of the second type, extending in the first direction, being in the first layout level, being separated from the first active region layout pattern in the second direction, and having the first width; and placing a fourth active region layout pattern according to the first set of guidelines, the fourth active region layout pattern corresponding to transistors of the second type, extending in the first direction, being in the first layout level, and being separated from the second active region layout pattern in the second direction, and having the first width.

19. The method of claim 18, further comprising:

placing a fifth active region layout pattern according to the first set of guidelines adjacent to the first cell boundary and the first active region layout pattern, the fifth active region layout pattern corresponding to the first set of transistors of the first type, extending in the first direction, being in the first layout level, being separated from the first active region layout pattern in the second direction, and having the first width; and placing a sixth active region layout pattern according to the first set of guidelines adjacent to the second cell boundary and the second active region layout pattern, the sixth active region layout pattern corresponding to the second set of transistors of the first type, extending in the first direction, being in the first layout level, and being separated from the second active region layout pattern in the second direction, and having the second width, wherein the fifth active region layout pattern is between the first active region layout pattern and the third active region layout pattern, and the sixth active region layout pattern is between the fourth active region layout pattern and the second active region layout pattern.

20. The method of claim 19, further comprising:

placing a first power rail layout pattern according to a second set of guidelines between the first active region layout pattern and the fifth active region layout pattern, the first power rail layout pattern extending in the first direction, having a third width in the second direction, and being in a second layout level different from the first layout level, the third width being different from the first width and the second width;

placing a second power rail layout pattern according to the second set of guidelines between the second active region layout pattern and the sixth active region layout pattern, the second power rail layout pattern extending in the first direction, having the third width in the second direction, and being in the second layout level; and placing a third power rail layout pattern according to the second set of guidelines between the third active region layout pattern and the fifth active region layout pattern, the third power rail layout pattern extending in the first direction, having the third width in the second direction, and being in the second layout level, wherein the second set of guidelines includes:
- balancing a first design voltage drop across the first and fifth active region layout patterns with a second design voltage drop across the first power rail layout pattern;
- balancing a third design voltage drop across the second and sixth active region layout patterns with a fourth design voltage drop across the second power rail layout pattern; and
- balancing a fifth design voltage drop across the third and fourth active region layout patterns with a sixth design voltage drop across the third power rail layout pattern.

* * * * *